(12) United States Patent
Kim

(10) Patent No.: US 11,172,773 B2
(45) Date of Patent: Nov. 16, 2021

(54) DRINK CONTAINERS

(71) Applicant: Tom Kim, Los Angeles, CA (US)

(72) Inventor: Tom Kim, Los Angeles, CA (US)

( * ) Notice: Subject to any disclaimer, the term of this patent is extended or adjusted under 35 U.S.C. 154(b) by 0 days.

(21) Appl. No.: 16/709,886

(22) Filed: Dec. 10, 2019

(65) Prior Publication Data
US 2020/0113360 A1 Apr. 16, 2020

Related U.S. Application Data

(63) Continuation-in-part of application No. 15/816,851, filed on Nov. 17, 2017, now abandoned, and a continuation-in-part of application No. 15/662,198, filed on Jul. 27, 2017, now abandoned, application No. 16/709,886, which is a continuation-in-part of application No. 15/615,082, filed on Jun. 6, 2017, now abandoned, application No. 16/709,886, which is a continuation-in-part of application No. 15/615,629, filed on Jun. 6, 2017, now abandoned, application No. 16/709,886, which is a continuation-in-part of application No. 15/816,851, filed on Nov. 17, 2017, (Continued)

(51) Int. Cl.
| | | |
|---|---|---|
| A61H 19/00 | (2006.01) | |
| A47G 19/22 | (2006.01) | |
| B65D 35/46 | (2006.01) | |
| B67D 1/00 | (2006.01) | |
| B65D 81/36 | (2006.01) | |
| B65D 35/14 | (2006.01) | |
| A45F 3/18 | (2006.01) | |
| B65D 47/20 | (2006.01) | |
| B65D 47/04 | (2006.01) | |
| B65D 83/00 | (2006.01) | |
| A45F 3/20 | (2006.01) | |
| B29L 31/00 | (2006.01) | |

(52) U.S. Cl.
CPC ............ *A47G 19/2227* (2013.01); *A45F 3/18* (2013.01); *A45F 3/20* (2013.01); *A61H 19/44* (2013.01); *B65D 35/14* (2013.01); *B65D 35/46* (2013.01); *B65D 47/04* (2013.01); *B65D 47/2018* (2013.01); *B65D 81/365* (2013.01); *B65D 83/0055* (2013.01); *B67D 1/001* (2013.01); *A61H 2201/013* (2013.01); *A61H 2201/0111* (2013.01); *B29L 2031/7158* (2013.01); *B65D 2205/02* (2013.01)

(58) Field of Classification Search
CPC ........ A61H 19/00; A61H 19/30; A61H 19/40; A61H 19/44; A61H 19/50; A61H 21/00; A47G 19/22; A47G 19/2227; A45F 3/16
See application file for complete search history.

(56) References Cited

U.S. PATENT DOCUMENTS

| | | | | |
|---|---|---|---|---|
| 2,133,411 A | * | 10/1938 | Ludwig | ............... A61J 11/0005 |
| | | | | 215/11.1 |
| 5,747,083 A | * | 5/1998 | Raymond | ............... A61J 9/001 |
| | | | | 215/11.3 |

(Continued)

*Primary Examiner* — John P Lacyk
(74) *Attorney, Agent, or Firm* — Payam Moradian

(57) ABSTRACT

Provided is a multi-use container. The container can be used for drinking a liquid by sucking a nipple to actuate one-way valve. Alternatively, the container can be used as a dildo by using a glans shaped cap. The container can be used to drink liquids from all sorts of angles. The container can also include a piston.

18 Claims, 53 Drawing Sheets

Related U.S. Application Data now abandoned, and a continuation of application No. 16/102,687, filed on Aug. 13, 2018.

(60) Provisional application No. 62/473,220, filed on Mar. 17, 2017, provisional application No. 62/423,301, filed on Nov. 17, 2016, provisional application No. 62/656,356, filed on Apr. 12, 2018, provisional application No. 62/777,751, filed on Dec. 10, 2018, provisional application No. 62/891,259, filed on Aug. 23, 2019.

(56) References Cited

U.S. PATENT DOCUMENTS

| | | | |
|---|---|---|---|
| 6,695,770 B1* | 2/2004 | Choy | A61H 19/44 600/38 |
| 2004/0045841 A1* | 3/2004 | Segovia, Jr. | B65D 81/3266 206/219 |
| 2005/0027162 A1* | 2/2005 | Paled | A61H 19/32 600/38 |
| 2015/0305530 A1* | 10/2015 | Winthrop | B65D 47/06 206/457 |

* cited by examiner

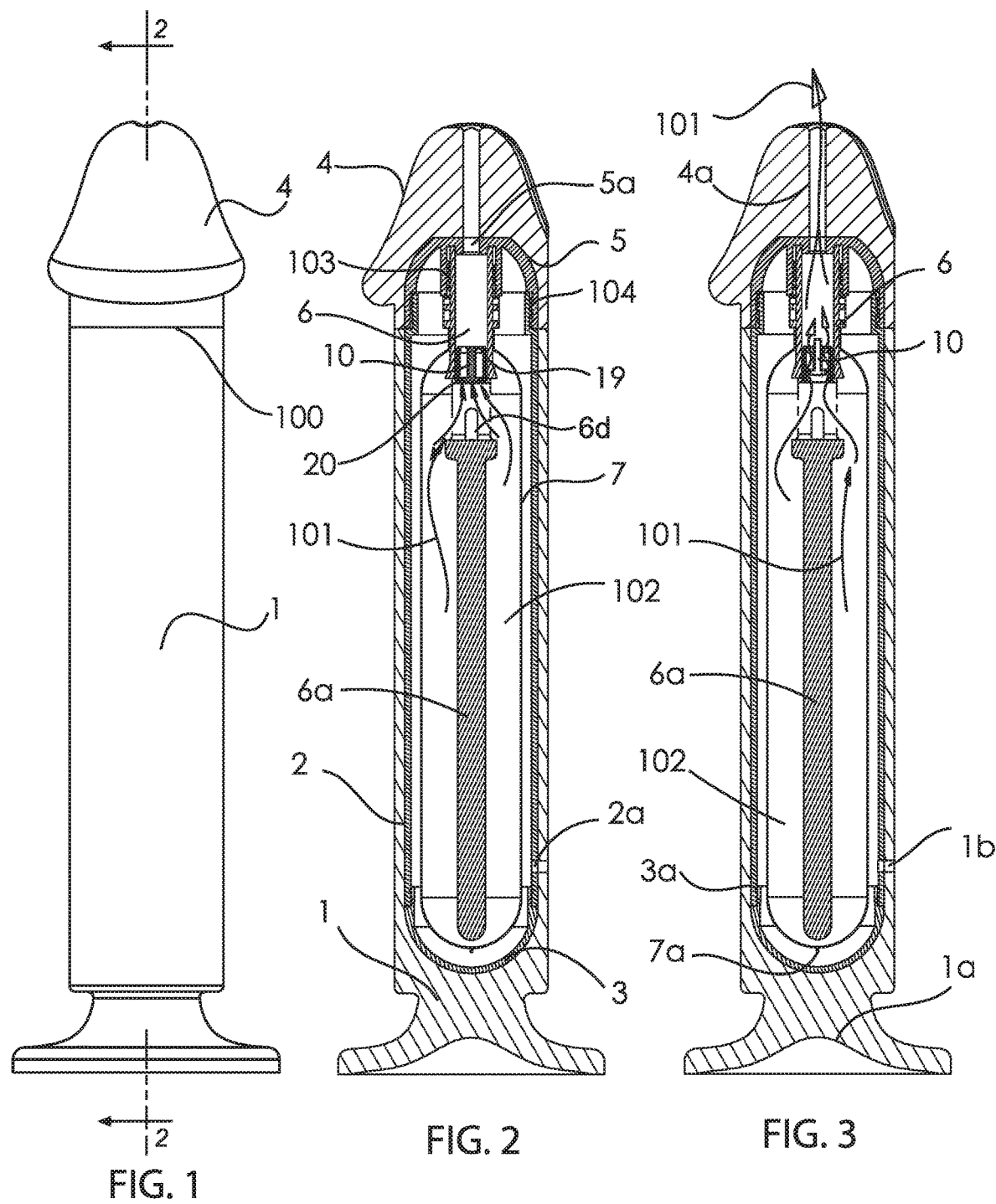

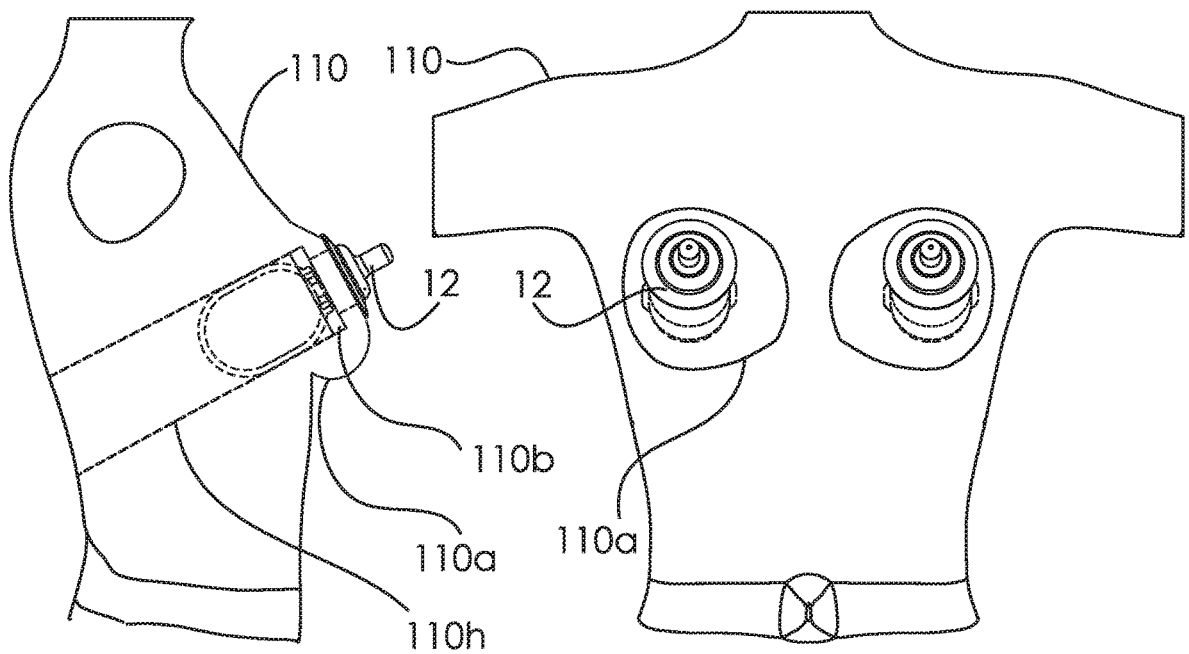
FIG. 12
FIG. 13
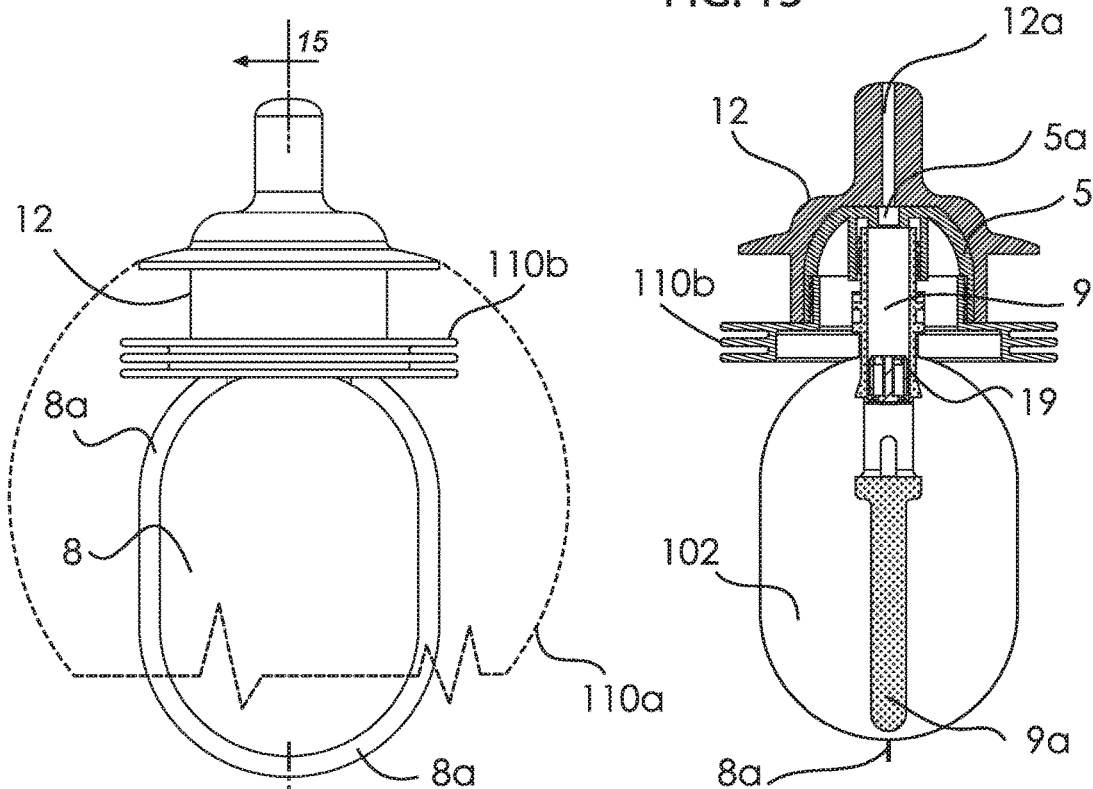
FIG. 14
FIG. 15

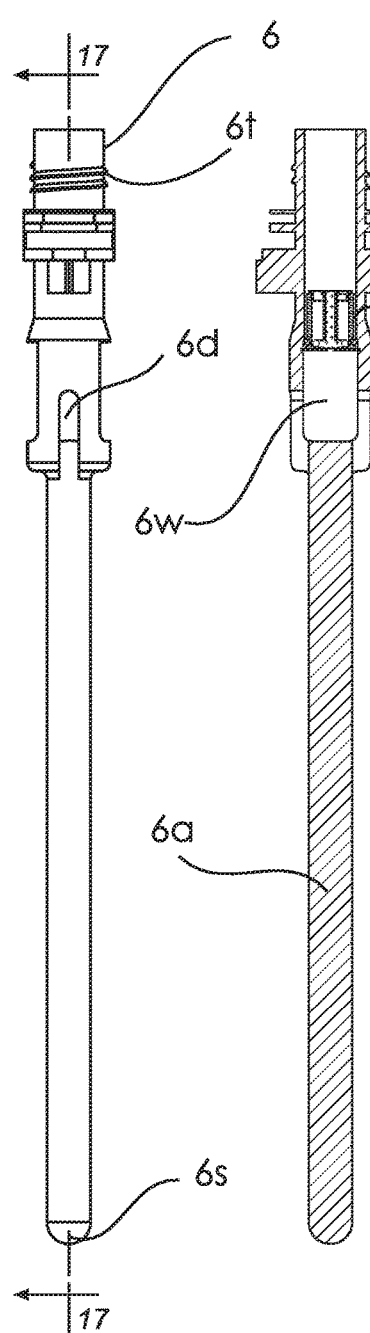
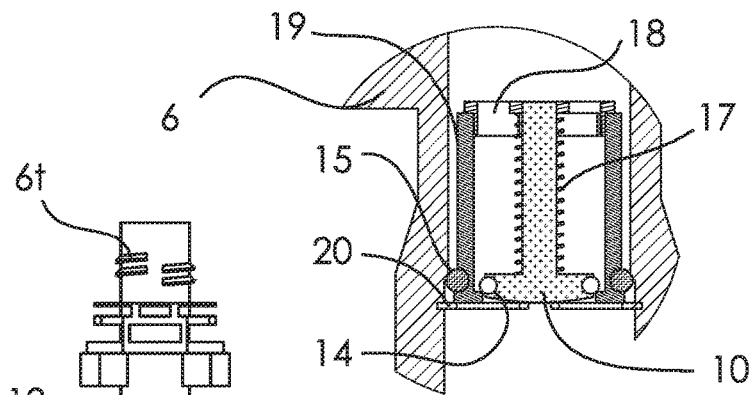
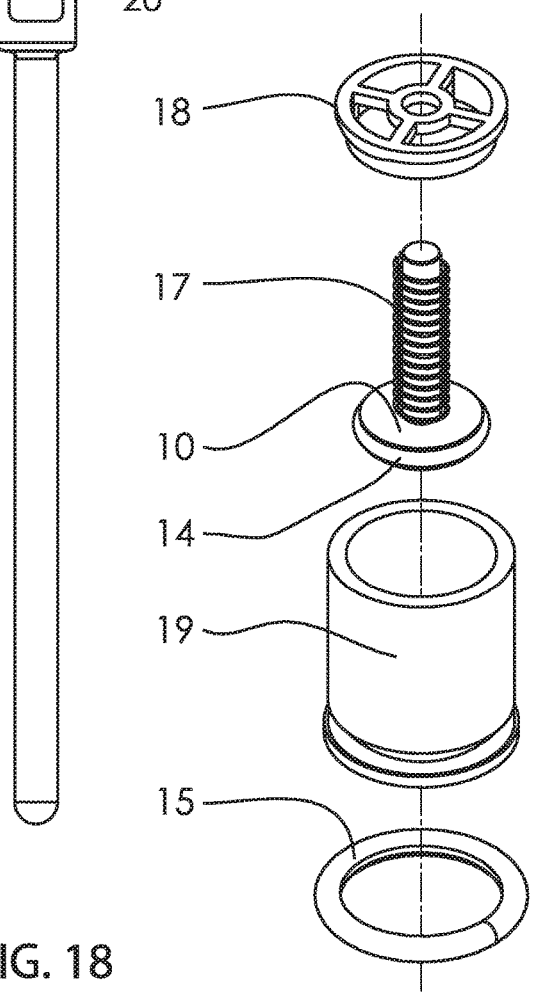
FIG. 16　FIG. 17　FIG. 18
FIG. 19
FIG. 20

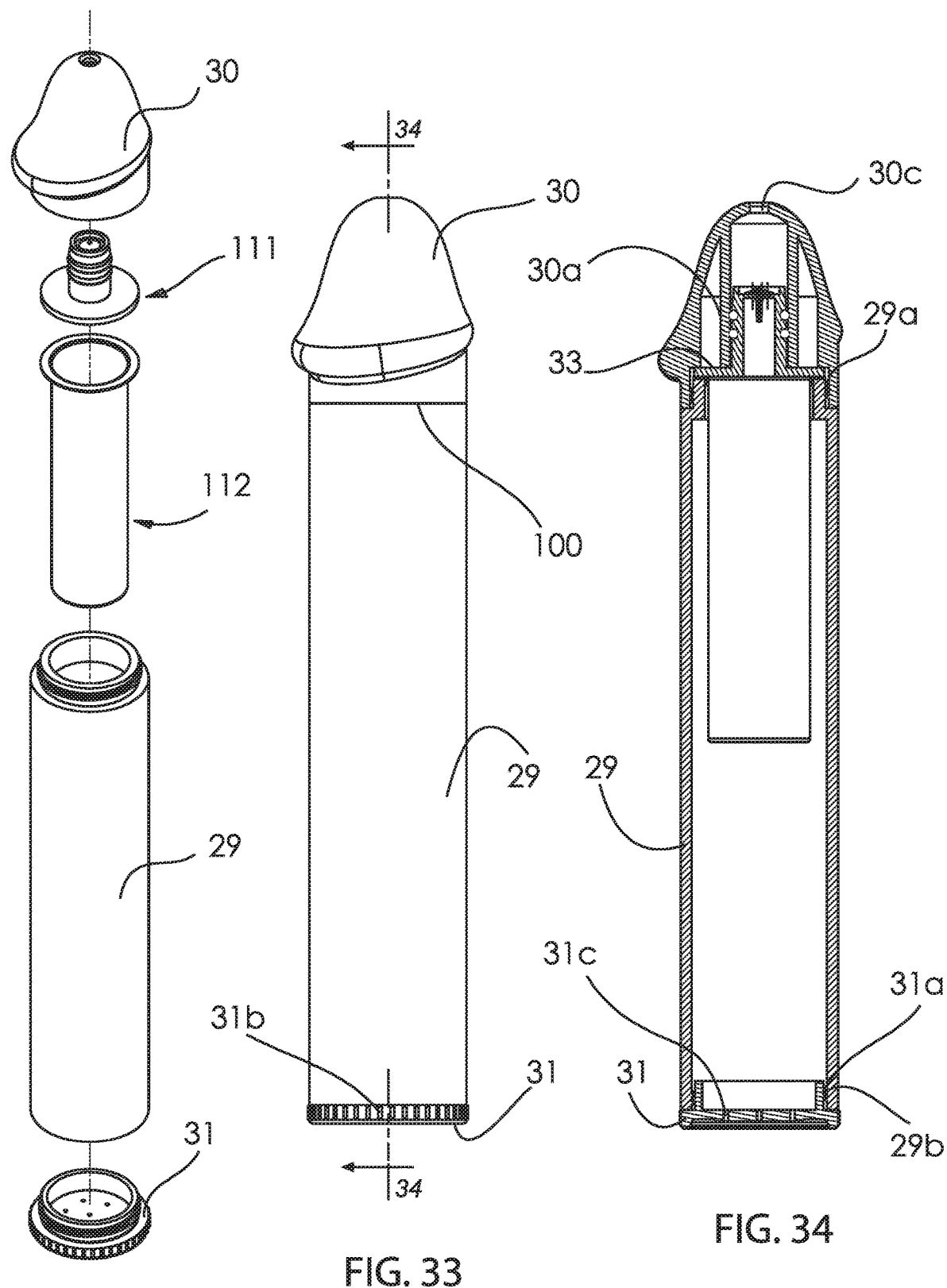

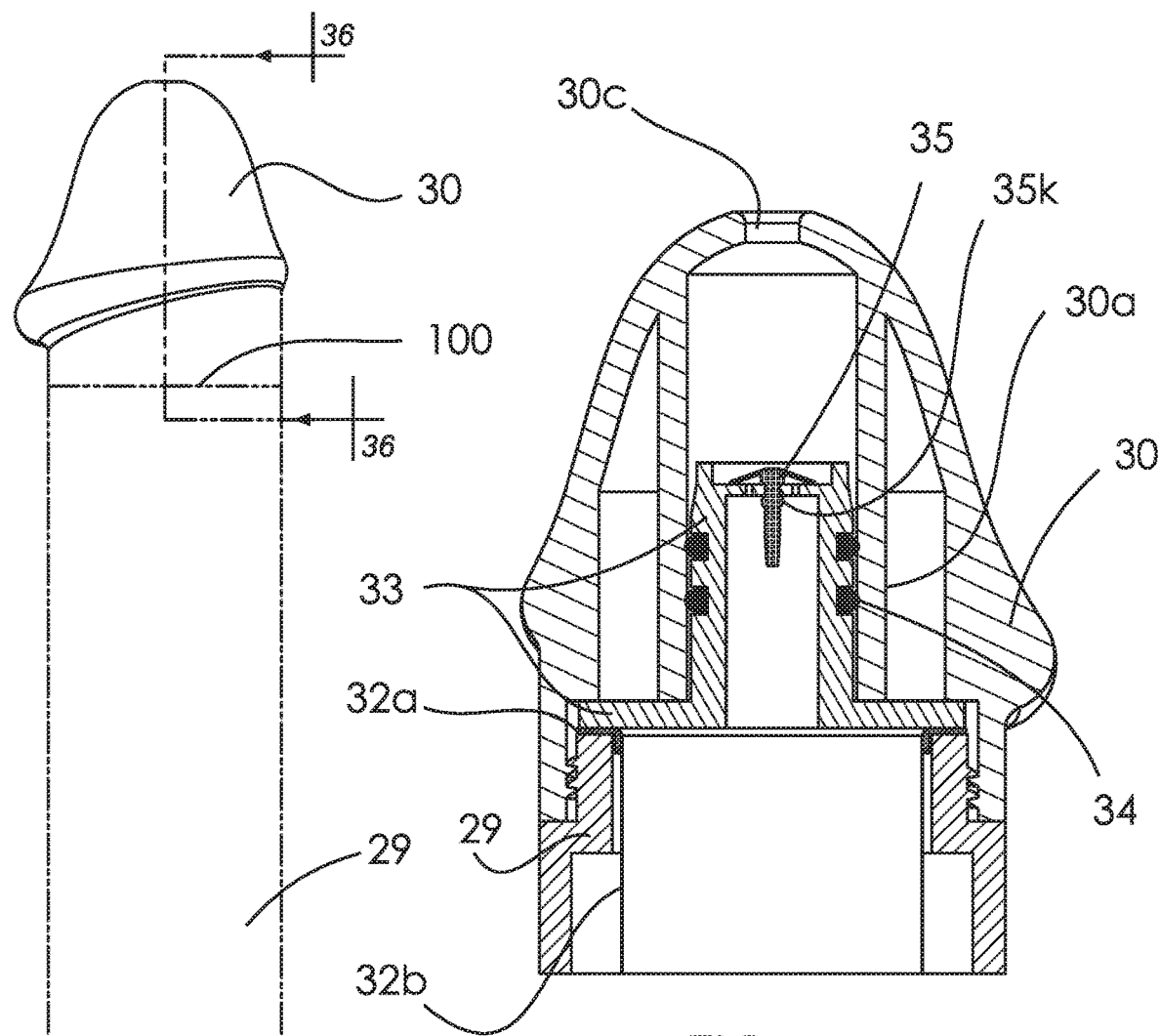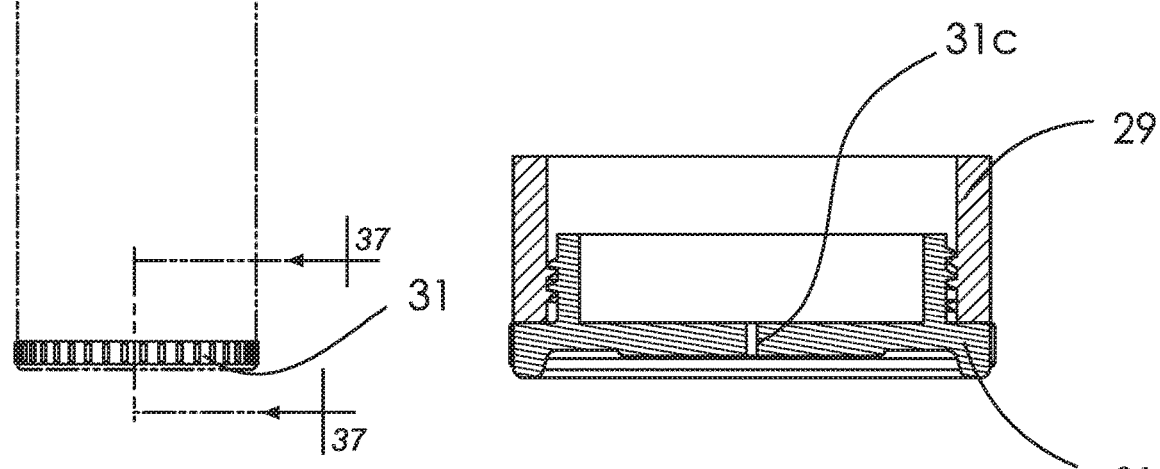
FIG. 35  FIG. 36  FIG. 37

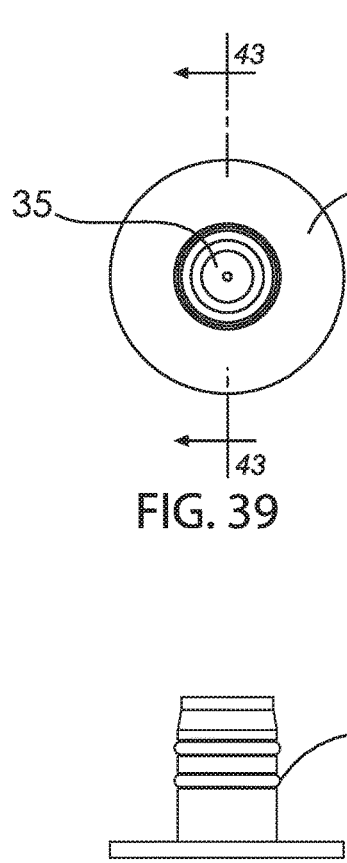
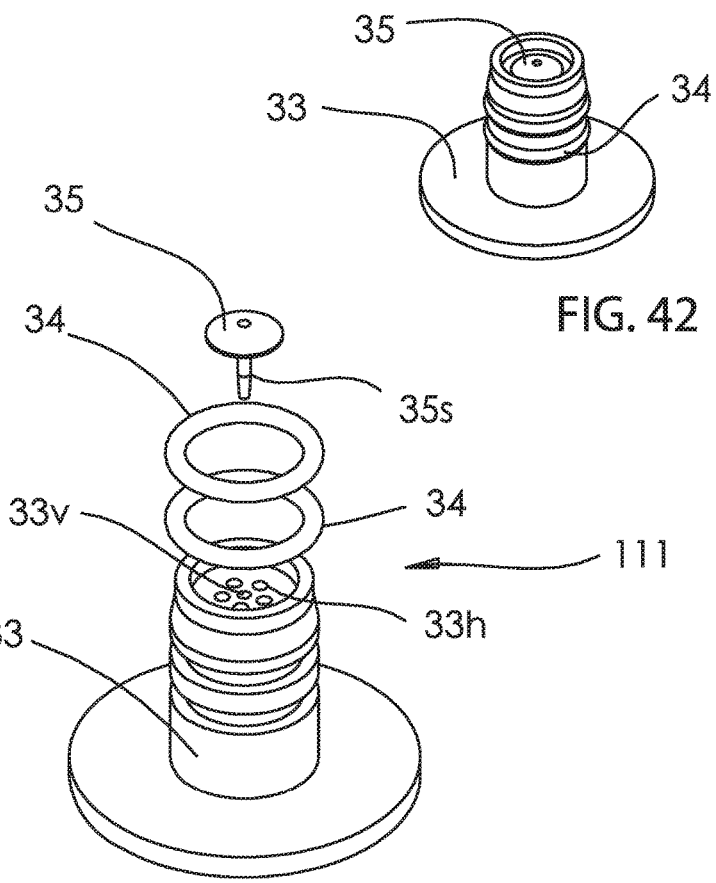
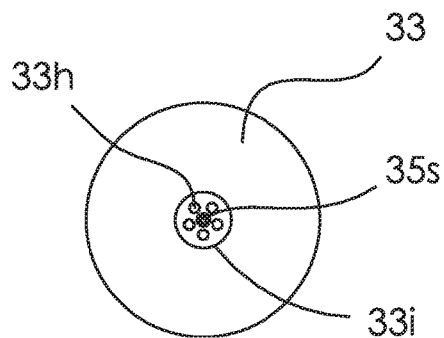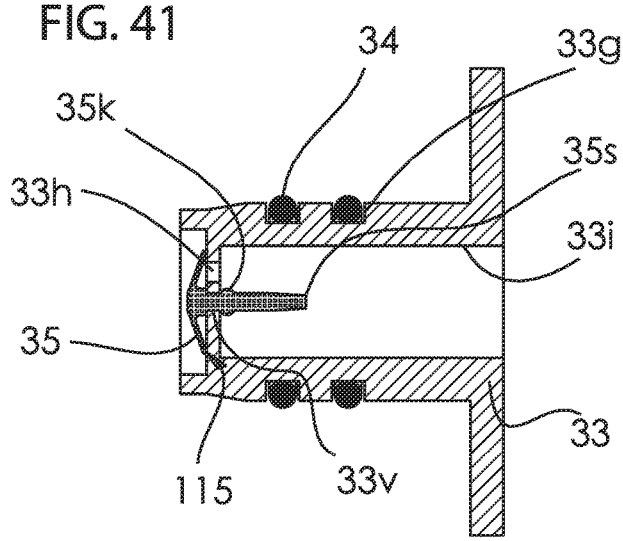

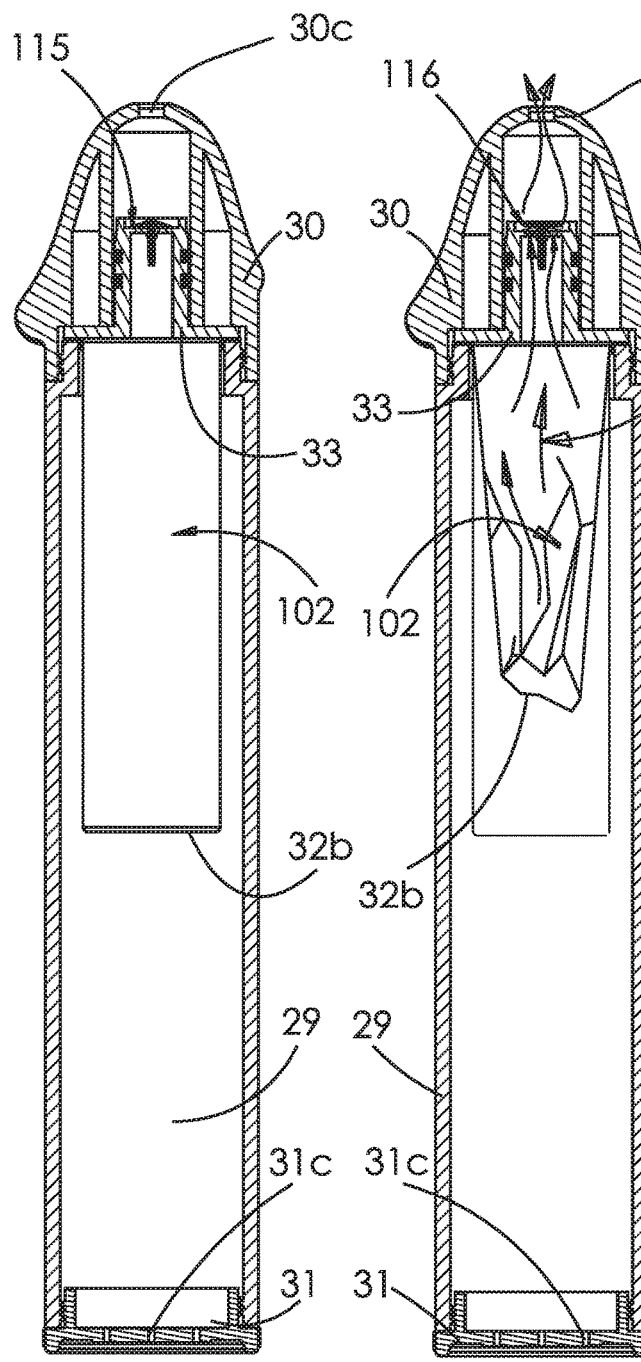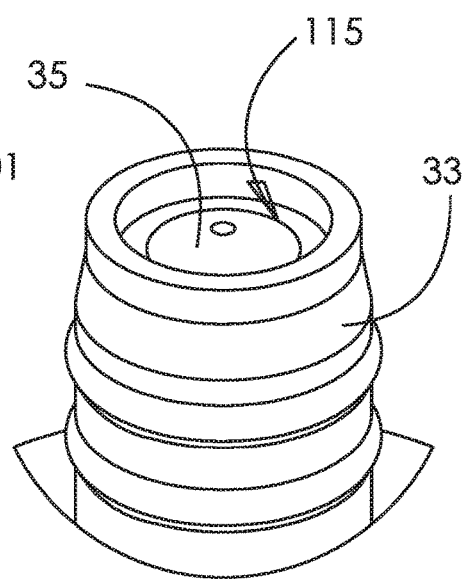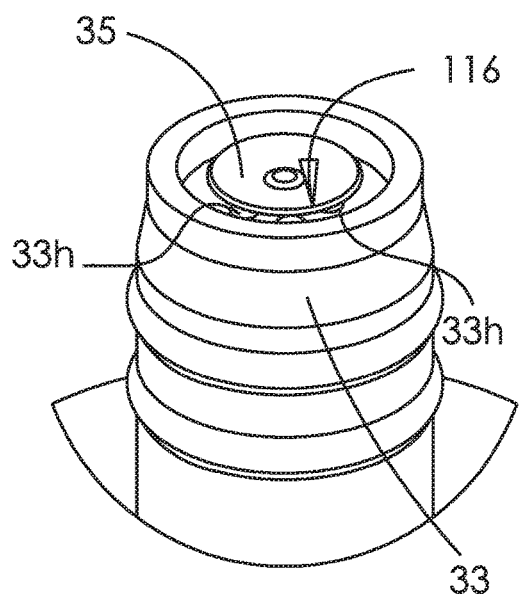
FIG. 44
FIG. 45
FIG. 46
FIG. 47

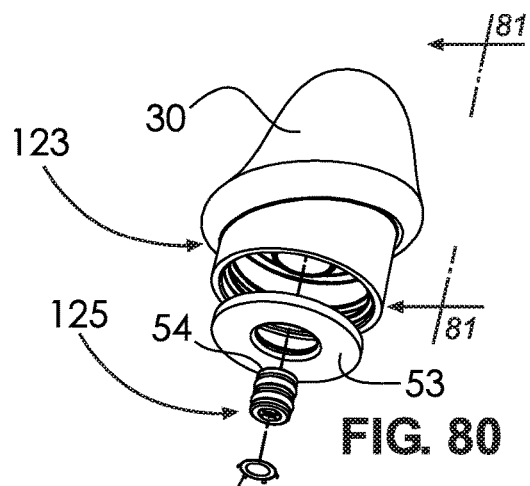
FIG. 80
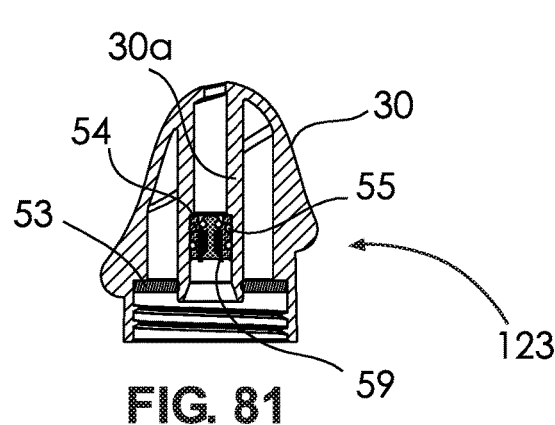
FIG. 81
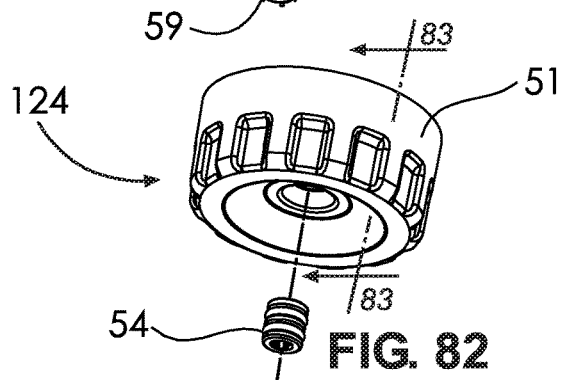
FIG. 82
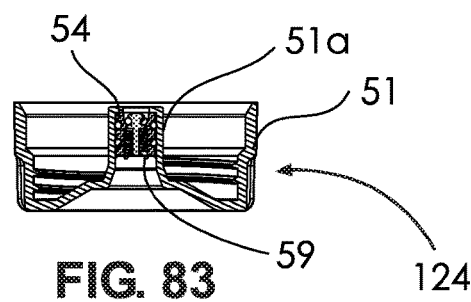
FIG. 83
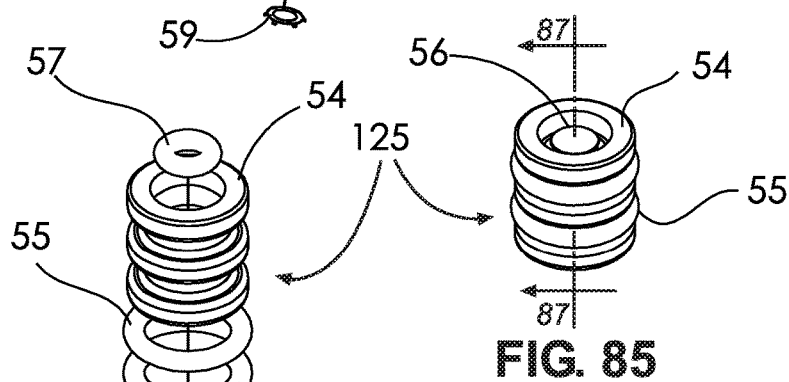
FIG. 84    FIG. 85
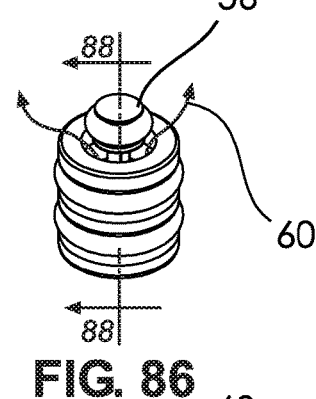
FIG. 86
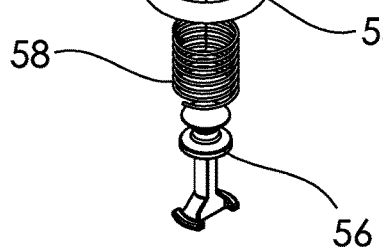
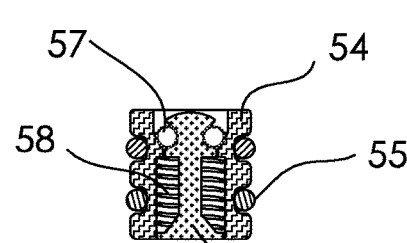
FIG. 87
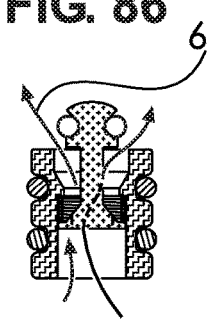
FIG. 88

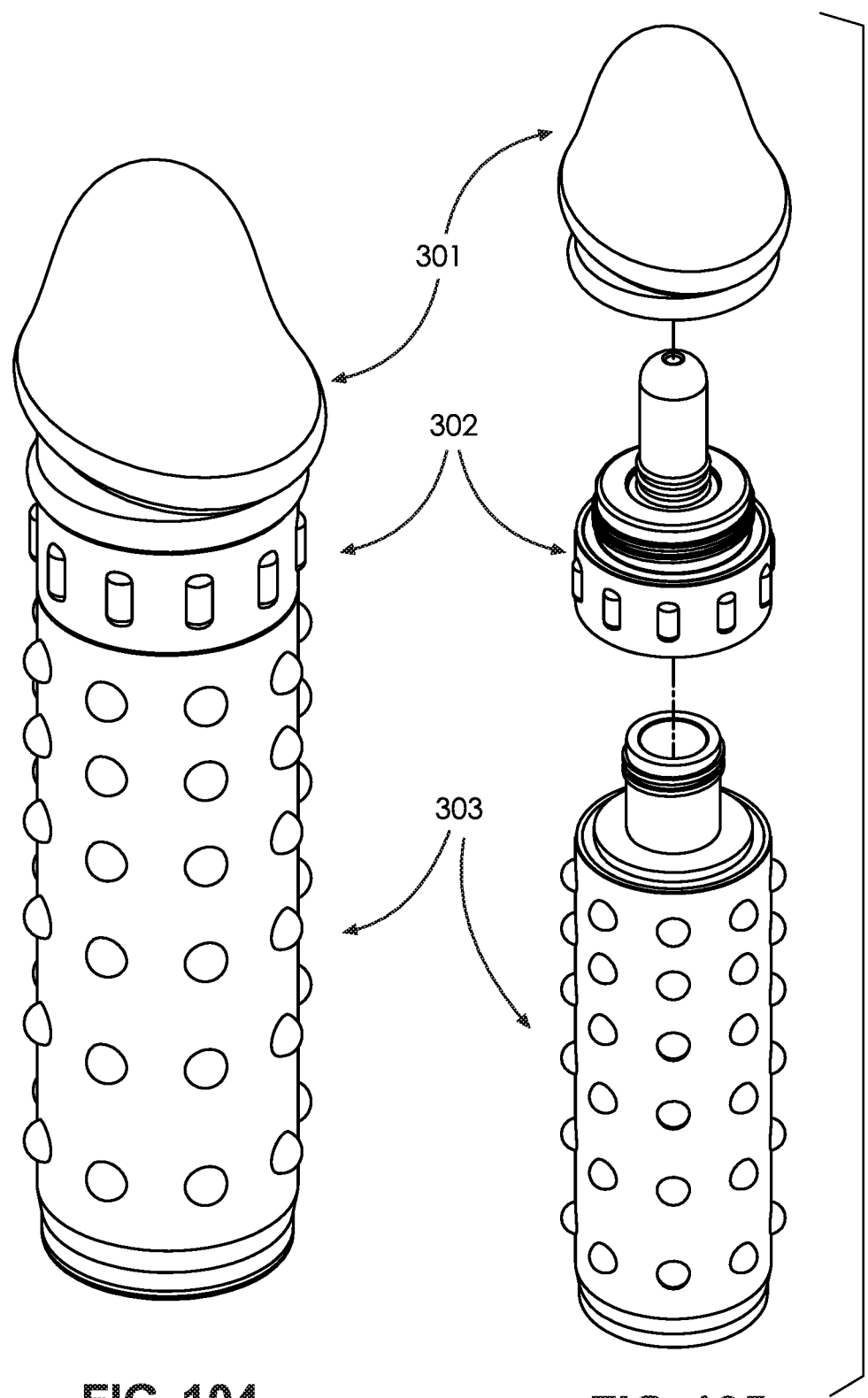
FIG. 104  FIG. 105

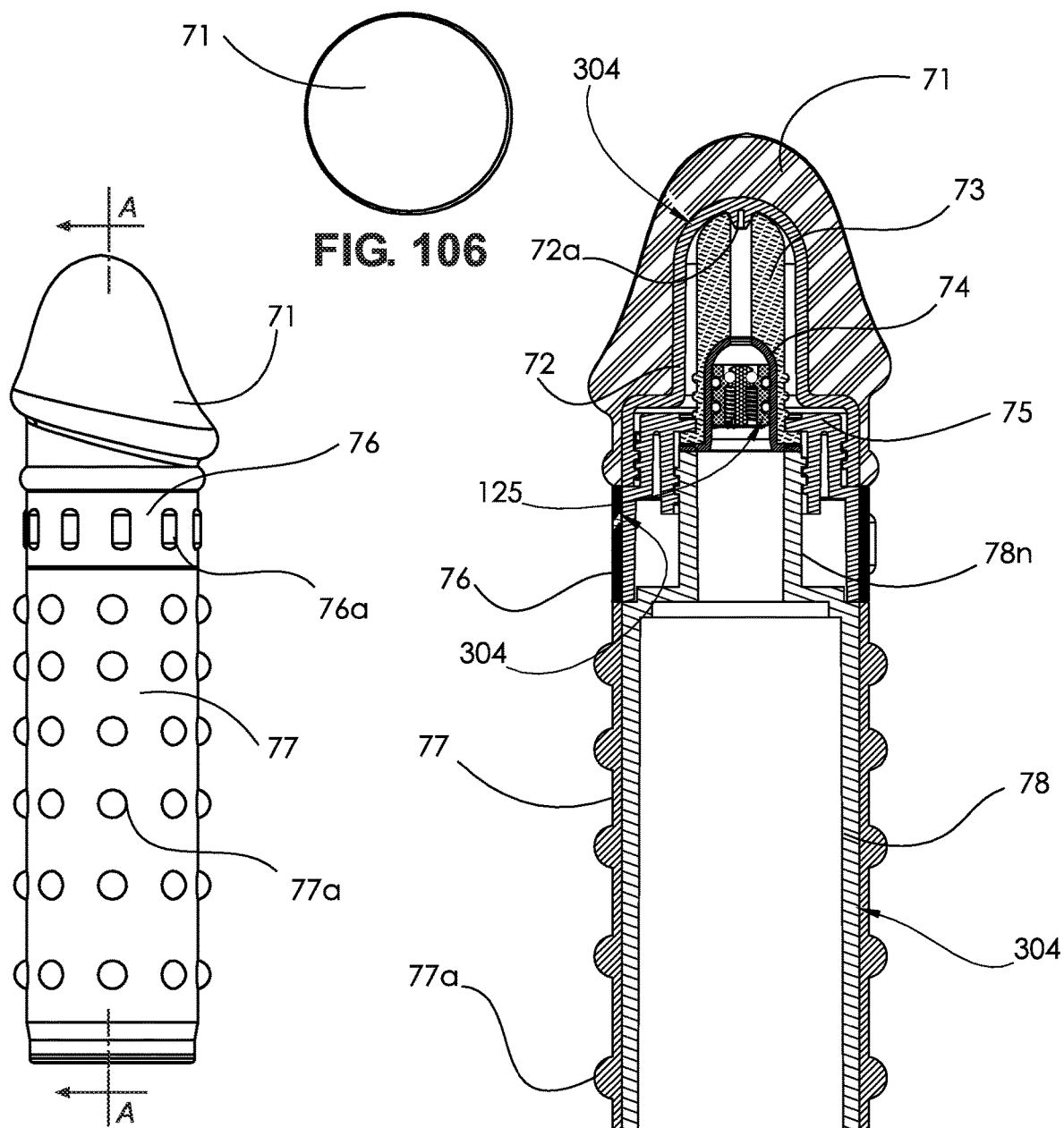

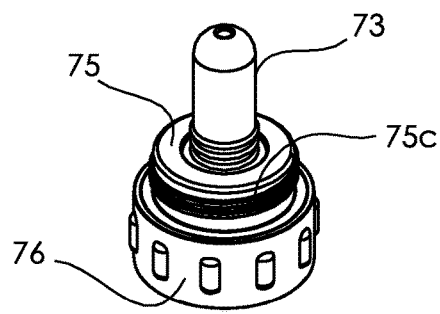
FIG. 119
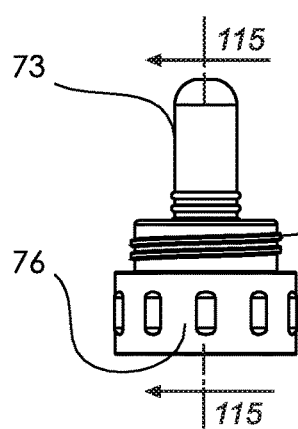
FIG. 120
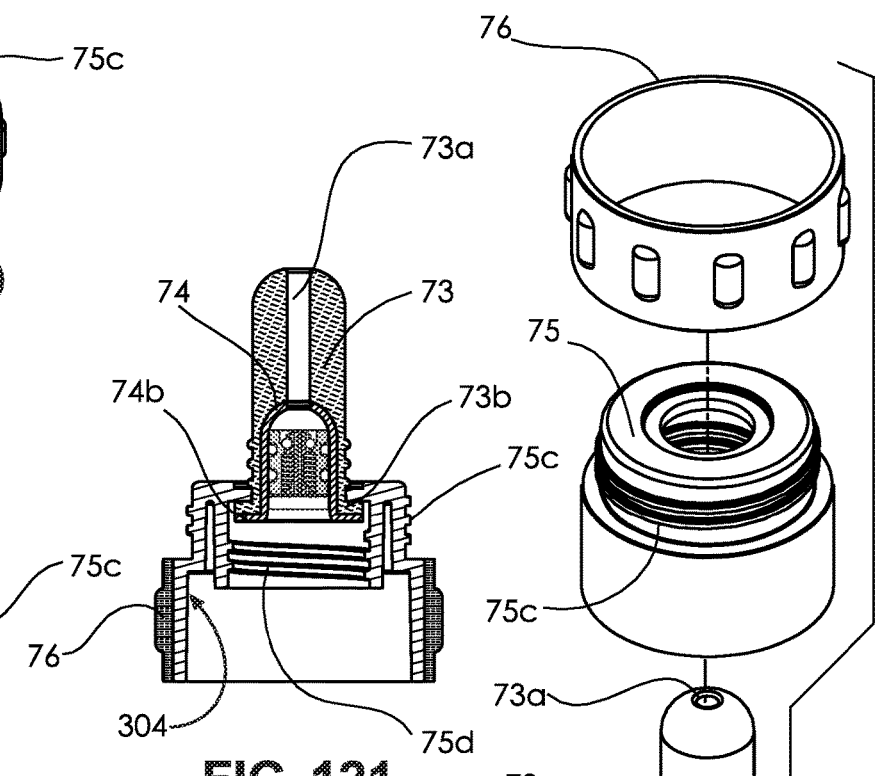
FIG. 121
FIG. 124
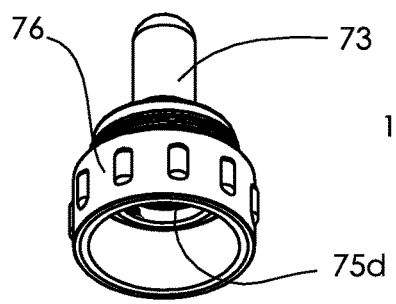
FIG. 122
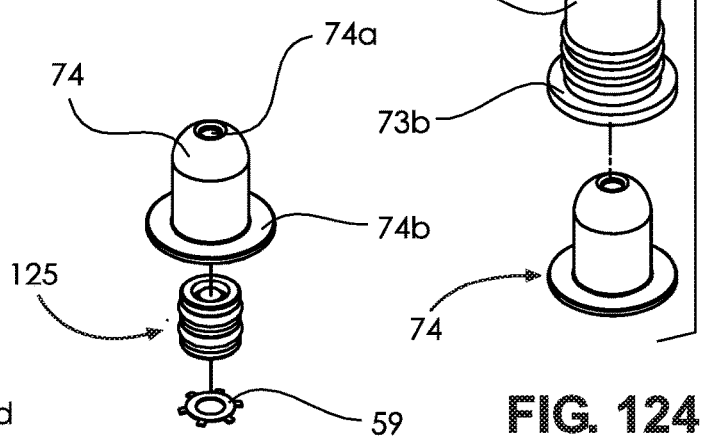
FIG. 123

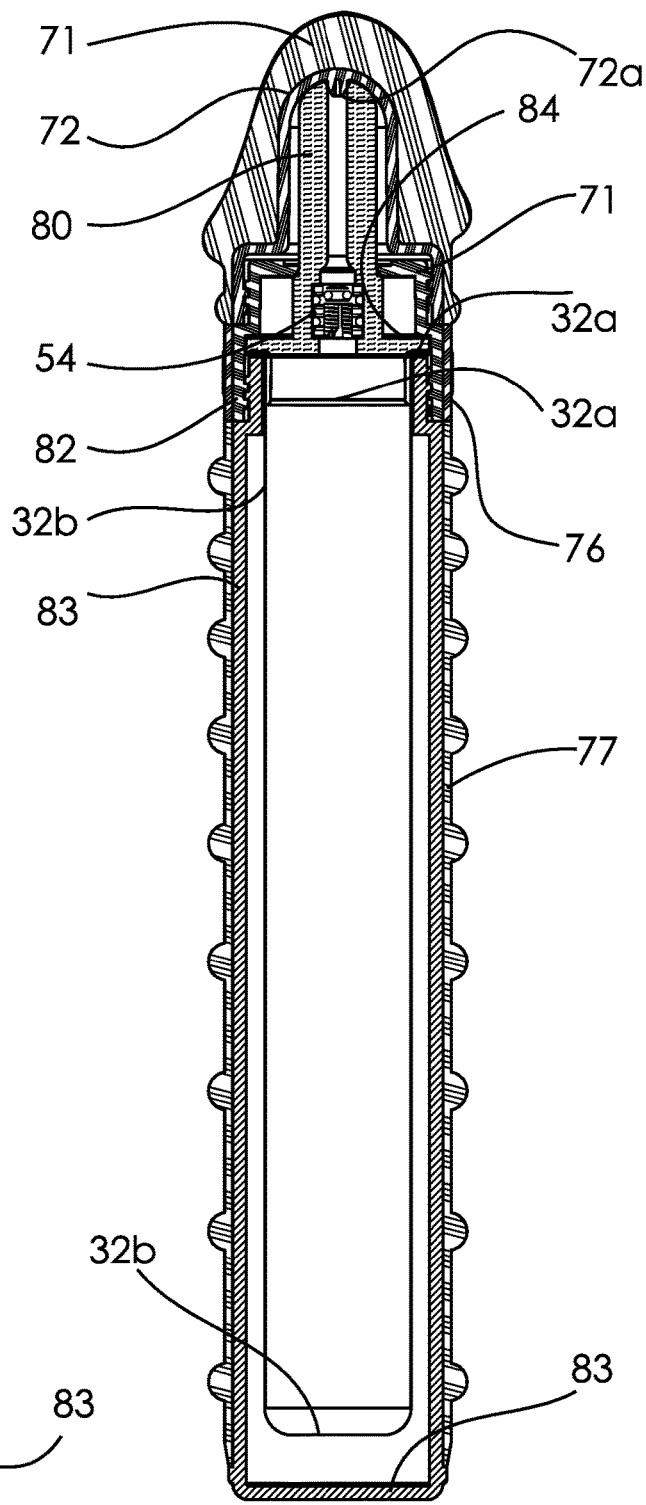
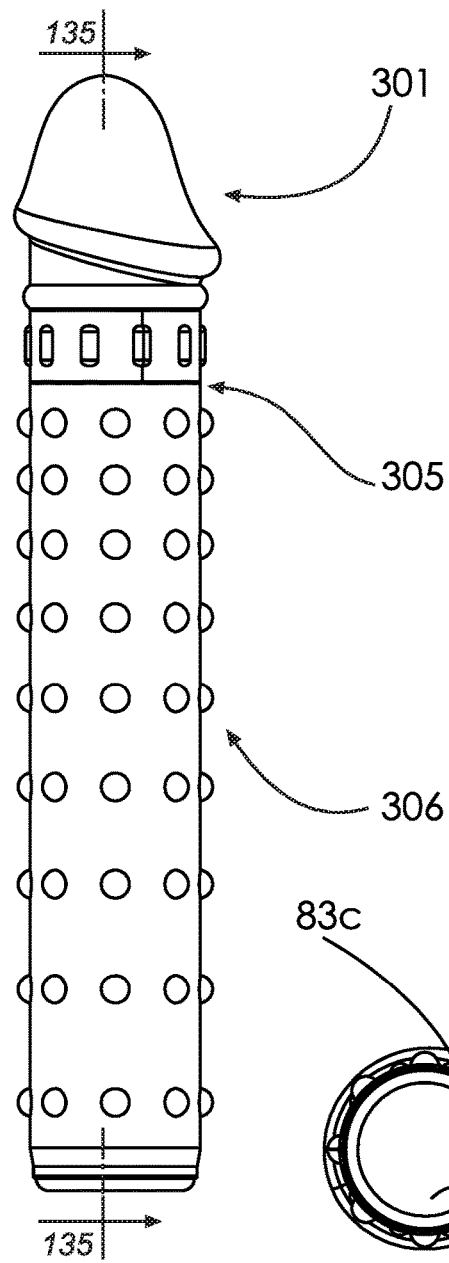
FIG. 133
FIG. 132  FIG. 134  FIG. 135

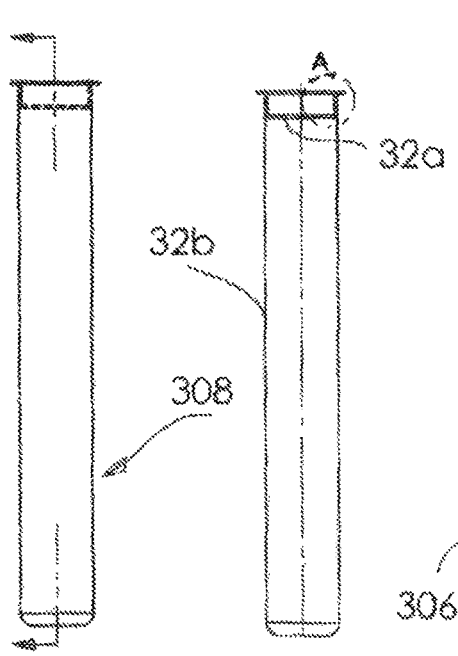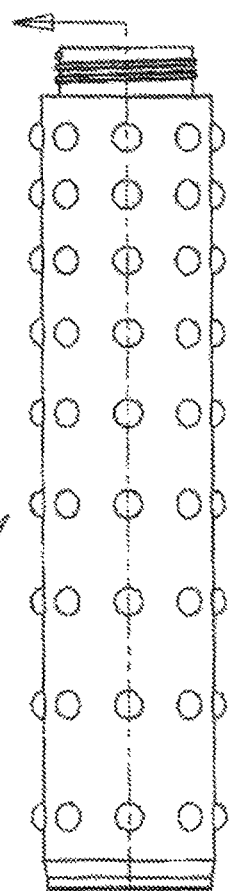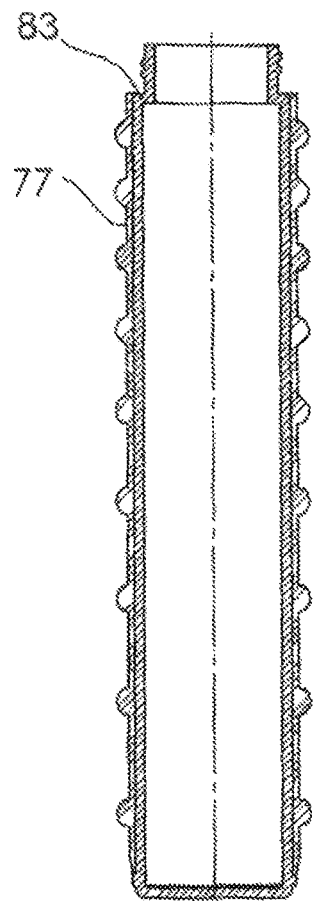
FIG. 136　FIG. 137　　　FIG. 139　　FIG. 140
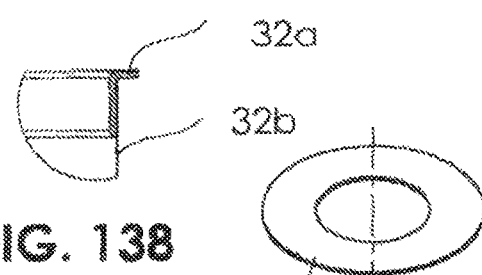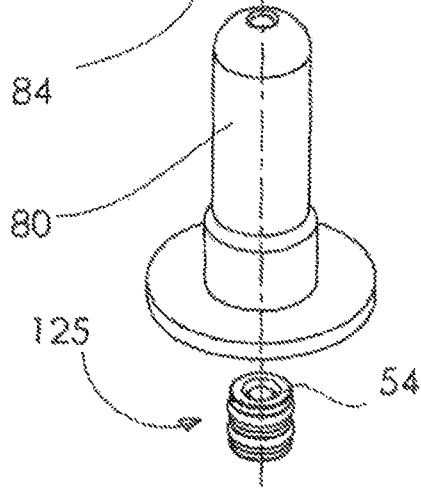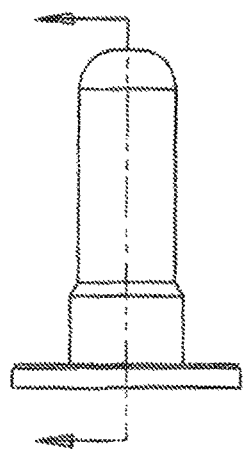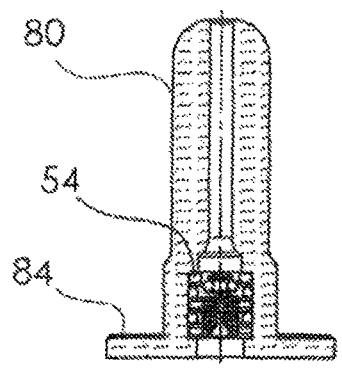
FIG. 138
FIG. 141　　FIG. 142　　FIG. 143

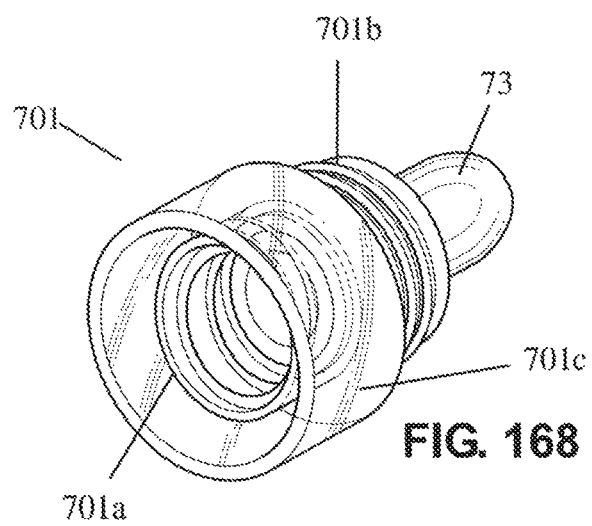
FIG. 168
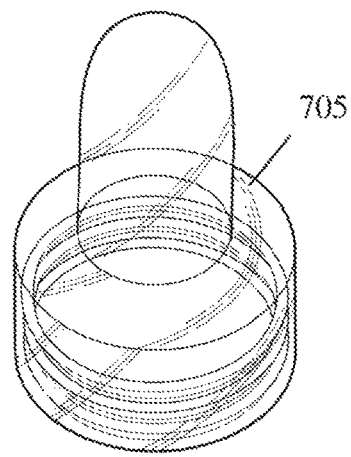
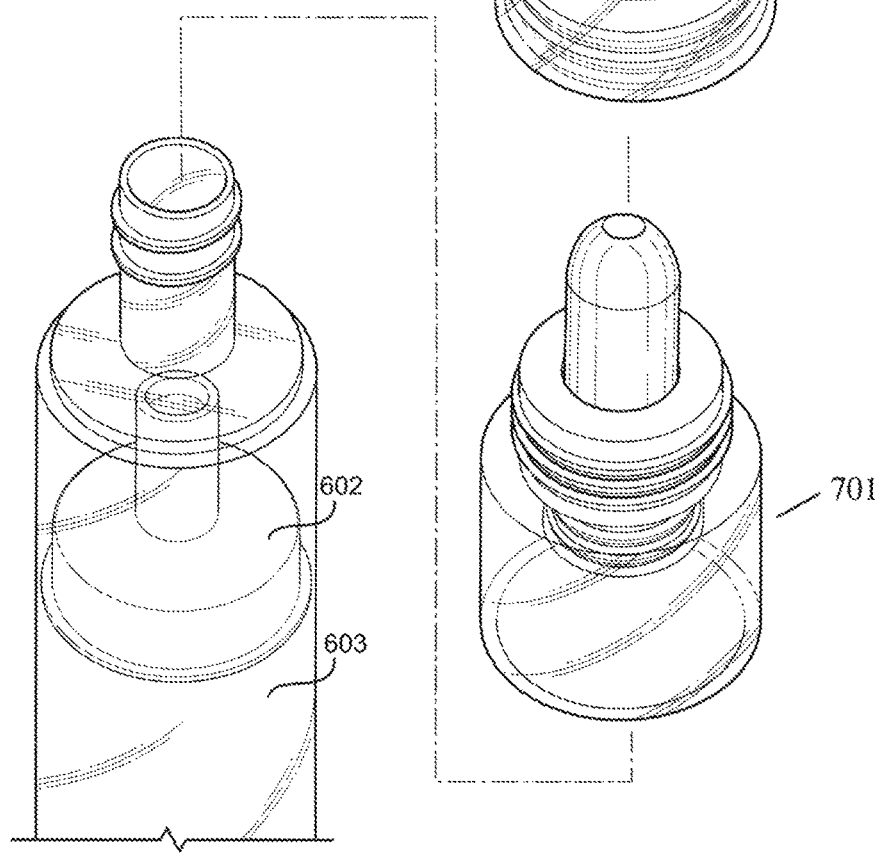
FIG. 169

DRINK CONTAINERS

CROSS-REFERENCE

The present application claims the benefit of US Provisional application No. 62/656,356, filed on Apr. 12, 2018 and 62/777,751 filed on Dec. 10, 2018. The present application is a Continuation-In-Part (CIP) of U.S. application Ser. No. 16/383,543, filed on Apr. 12, 2019, which is a Continuation-In-Part (CIP) of Ser. No. 16/102,687, filed on Aug. 13, 2018, U.S. application Ser. No. 15/816,851, filed on Nov. 17, 2017, CIP of U.S. application Ser. No. 15/615,629, filed on Jun. 6, 2017, CIP of U.S. application Ser. No. 15/615,082, filed on Jun. 6, 2017, and CIP of U.S. application Ser. No. 15/662,198 filed on Jul. 27, 2017, all of which (other than claim Ser. No. 16/102,687) the benefit of U.S. provisional application 62/423,301 filed on Nov. 17, 2017 and U.S. provisional App. No. 62/473,220, filed on Mar. 17, 2017. All of these applications are incorporated herein by reference in their entirety.

BACKGROUND SECTION OF THE INVENTION

People have a need to drink liquids, either to quench thirst or for entertainment. Different liquids, such as water, juice, or alcohol are typically drunk from relatively boring containers. Furthermore, the container has to be often washed to keep it sanitary. Some containers are difficult to clean.

A problem with drink containers, in addition to not being multi-use, is that a user has to drink from the container while the container is in a vertical orientation to avoid spillage of the liquid. A portion of the population is unable to drink from a vertical container, including infants, the elderly, the bed ridden and some hospital patients.

There is a need in the art for containers that address the above drawbacks.

SUMMARY SECTION OF THE INVENTION

Provided is a container for drinking liquid comprising: a. a reservoir for holding liquid, the reservoir made from a material that shrinks as liquid leaves the reservoir, b. an opening for the liquid to leave the reservoir and exit the container, and c. a one way valve configured to be actuated by a person sucking the opening; wherein when the person sucks, the one way valve opens and the liquid leaves the container while the reservoir shrinks to compensate for the volume of liquid that left the container. The container can further include a housing in which the container is placed. The housing can be phallus shaped. The housing can be shaped as a cylinder. The housing can be shaped as a baby milk bottle. The housing can be shaped as an adult toy. The housing can be made from a rigid material that does not shrink due to shrinkage of the container. An opening can exist for exchange of air between inside and outside of the housing. The container can further comprise a separator inside of the reservoir to maintain stability of the reservoir when liquid leaves the container. The separator can be a rod. The container can further comprise a slot before the one way valve for liquid to leave the reservoir. The housing can be made from one layer or alternatively at least two layers, with an outside layer that is made from a material that is compressible and an inner layer made from a material that is not compressible. The housing can be made from two parts, a body and a cap, the body and the cap configured to threadably be attached to each other. The cap can have a channel for liquid to move outside of the housing. The cap in a shape of a nipple to simulate breast of a woman, or the shape of lips or vagina. The container can further comprise a member fabricated from one piece, the member having a spout on top, a slot in liquid communication with the spout, and a separator positioned below the slot, wherein liquid leaves through the slot and moves through the spout to outside of the container. The member can be attached to an extension inside the cap or one that comes downward from the cap, resulting in the member to be in fluid communication with outside of the housing. The valve can be placed above the spout. The member can be sealed to the material that shrinks.

Provided is a container for drinking liquid comprising: a) a housing in a shape of a phallus, the housing having a body and a cap, inside of the body of the housing having a reservoir for a liquid, the cap configured to be removably attached to the housing; and b) a channel in the cap configured to carry liquid from inside of the housing to outside of the container, wherein the reservoir is filled by removing the cap and pouring the liquid into the reservoir, and the liquid is consumed through the channel; and wherein the only opening that the container with the cap in place has is the channel. The cap and the body can have complementary threading. A plug can be placed inside of the channel and be removable from outside of the channel.

Provided is a container for drinking liquid comprising: a) a body; b) a cap for removably attaching to the body, the cap having an opening configured to allow liquid to travel from inside of the container to outside of the container, c) a cup for holding liquid placed inside of the body, the cup maintained in proximity to a top of the body; wherein liquid leaves the cup and moves to the outside of the container through the opening in the cap. The cup can have a flange portion, the flange portion configured to rest on top of the body. The container further comprises a one way valve placed in between the cup and the opening of the cap, the valve having an assembly that rests on the flange portion of the cup. The container can be phallus shaped. The container can be shaped as a baby milk bottle. The container can be shaped as an adult toy. The cup can shrink as liquid leaves the cup. The body can be made from at least two layers, with an outside layer that is a made from a material that is compressible and an inner layer made from a material that is not compressible. The body and the cap can be threadably attached to each other. The container can further comprise a one way valve placed in between the cup and the opening of the cap. The one way valve can be an umbrella valve.

Provided is a mannequin or a portion thereof, comprising: a) one or more cavities in proximity to where a person's mouth, breast, vagina, vagina, or anus is located; b) a container configured to hold a liquid placed in the cavity, the container having an opening for drinking the liquid, wherein the opening is accessible from outside of the mannequin and a user can drink the liquid from the container while the container is placed partially or fully inside the cavity of the mannequin. The mannequin can be a male mannequin with a container opening coming out of the container for at least 2 inches. The mannequin can have access from back side of the cavity for placing and removing the container. The cavity and the container can have complementary threads for removably attaching the container. The two cavities can be positioned where a breast of the mannequin would ordinarily be placed, each of the cavities having threading, and each of the cavities threadably attached to a single container. Each of the containers placed in position of the breast can have a nipple for a user to drink the liquid.

Provided is a container for drinking liquid comprising: a) a body; b) a cap for removably attaching to the body, the cap having an opening configured to allow liquid to travel from inside of the container to outside of the container; c) a cup for holding liquid placed inside of the body, the cup maintained in proximity to a top of the body; d) a one way valve attached to the cap inside of the container, wherein liquid leaves the cup and moves to the outside of the container through the opening in the cap. The cup can have a flange portion, the flange portion configured to rest on top of the body. The one way valve can be placed in between the cup and the opening of the cap, the valve having an assembly that rests on the flange portion of the cup. The one way valve can comprise a disc portion that rests on the cup, and a protruding portion above the disc portion that attached to the cap. The one way valve can be an umbrella valve.

Provided is a mannequin or a portion thereof, comprising: a) one or more openings representing a person's mouth, breast, penis, vagina, or anus is located; b) a container configured to hold a liquid, the container having an opening for movement of liquid to outside of the container, c) a tubing from the container to the opening in the mannequin; wherein a user can drink the liquid from the container from outside of the mannequin. The container can be placed vertically inside of the mannequin. The one way valve can comprise a disc portion that rests on the cup, and a protruding portion above the disc portion that attached to the cap. The one way valve can be placed in between the cup and the opening of the cap, the valve having an assembly that rests on the flange portion of the cup.

Provided is a drinking system for a mannequin, comprising: a) a member for attaching on outside of the mannequin, the member having an opening; b) a container configured to hold a liquid, the container having an opening for movement of liquid to outside of the container, c) a tubing from the container to the member on the mannequin; wherein a user can drink the liquid from the container from the member on the outside of the mannequin.

Provided is a container for drinking liquid comprising: a) a body; b) a first cap for removably attaching to the body, the cap having an opening configured to allow liquid to travel from inside of the container to outside of the container, c) a cup for holding liquid placed inside of the body, the cup maintained in proximity to a top of the body; d) a first one way valve placed above the cup for regulating flow of the liquid; e) a second one way valve configured to allow air to move inside the body from outside; wherein liquid leaves the cup and moves to the outside of the container through the opening in the cap, and air from outside moves into the body through the second one way valve. The container can further comprise a second cap on bottom of the body incorporating the second one way valve.

Provided is a mannequin or a portion thereof, comprising: a) one or more openings representing a person's mouth, breast, penis, vagina, or anus is located; b) a container configured to hold a liquid, the container having an opening for movement of liquid to outside of the container, c) a tubing from the container to the opening in the mannequin; d) a first one way valve for regulating flow of the liquid to outside of the container and a second one way valve for regulating flow of air to inside of the container, wherein a user can drink the liquid from the container from outside of the mannequin.

Provided is a drinking system for a mannequin, comprising: a) a member (such as in shape of a nipple) for attaching to outside of the mannequin, the member having an opening; b) a container configured to hold a liquid, the container having an opening for movement of liquid to outside of the container, c) a tubing from the container to the mount on the mannequin; d) a first one way valve for regulating flow of the liquid to outside of the container and a second one way valve for regulating flow of air to inside of the container, wherein a user can drink the liquid from the container from the member.

The one way valves can be a spring valve. Each valve can have a spring with a different k-constant.

Provided is a container for drinking liquid comprising: a) a body; b) a first cap for removably attaching to the body, the cap having an opening configured to allow liquid to travel from inside of the body to outside of the body; c) a piston configured to move inside the body as the liquid leaves the body, the piston separating the liquid and air inside the body; wherein liquid leaves the body and moves to the outside of the container through the opening in the first cap. The first cap can be in a shape of a glans. The first cap can be in a shape of a nipple. The container can further comprise a second cap to be placed on the first cap. The second cap can be in shape of glans. The container can further comprise an opening configured to allow movement of air inside of the body as liquid leaves the body. The container can be cylindrical, the piston circular in shape and configured to move up and down inside the cylindrical body. The container can further comprise a third cap on bottom of the body. The third cap can have an opening for movement of air. The container can be shaped as a baby milk bottle. The container can be shaped as an adult toy. The body can be made from at least two layers, with an outside layer that is a made from a material that is compressible and an inner layer made from a material that is not compressible. The container can further comprise a one-way valve that regulates flow of liquid. The valve can be actuated by sucking.

Provided is a container for drinking liquid comprising: a) a cylindrical body, the body having an opening on a top and a bottom; b) a nipple assembly comprising a nipple and a one way valve for removably attaching to the body, the nipple having an opening configured to allow liquid to travel from inside of the body to the one way valve and to outside of the container, c) a piston configured to move inside the body as the liquid leaves the body, the piston separating the liquid and air inside the body; wherein liquid leaves the body and moves to the outside of the container, the piston moving to the top as liquid leaves the opening on the top and air comes into the body from the opening on the bottom. The container can further comprise a cap in shape of glans for placement on the nipple. The container can further comprise an adapter with an opening for the nipple, the nipple placed inside of the adapter with a tip of the nipple extending out of the opening of the adapter, the top of the adapter further configured to attach to a glans cap.

The one way valve housing can be placed inside of the nipple. Both the one way valve and the nipple can be cylindrical, with the one way valve placed inside of the nipple.

Provided is a container for drinking liquid comprising: a) a cylindrical body, the body having an opening on a top and a bottom; b) a cap for the body in shape of a glans, the glans having an opening configured to allow liquid to travel from inside of the body to the one way valve and to outside of the container, c) a piston configured to move inside the body as the liquid leaves the body, the piston separating the liquid and air inside the body; wherein liquid leaves the body and moves to the outside of the container, the piston moving to the top as liquid leaves the opening on the top and air comes into the body from the opening on the bottom.

Provided is a container for drinking liquid comprising: a) a cylindrical body with a reservoir for holding a liquid and an opening at the top, wherein shape of the container remains cylindrical and does not change as liquid leaves the reservoir; b) a member for removably attaching to the top of the body, the member having an opening for movement of liquid; c) a cap in shape of glans for removably attaching to the member, the cap not having an opening for travel of liquid to outside of the body; and d) a nipple with an opening placed above the body in fluid communication with the reservoir; wherein liquid leaves the body and moves to the outside of the container when the cap is removed. The container can be configured to be used as a dildo with the cap on and a drink container with the cap removed. The nipple can have a disc shaped base and a protruding portion on top of the base, wherein a one way valve is placed inside of the nipple. The one way valve can have a cylindrical housing that is configures to fit inside of the protruding portion of the nipple. The one way valve housing can have a retainer washer below the valve housing. The one way valve housing can have O-rings on outside. The one way valve housing can have a spring inside and a member configured to move from force of suction by a person. The member can be configured to move is placed on top of the valve housing facing the nipple opening. The one way valve placed inside of the nipple, the one way valve actuated by force of sucking. The container can include an opening configured to allow movement of air inside of the body as liquid leaves the body. The container can include a piston configured to move inside the cylindrical body, with liquid present above the piston and air below the piston. The container can include a cap on bottom of the body below the piston to allow air to come inside the body. The cap can have an extension on its inside that comes down, the extension configures to fit on the opening of the nipple and stop flow of liquid to outside of the nipple from the nipple opening. The cap can have two layers, with an outer layer more compressible than inside layer.

Provided is a container for drinking liquid comprising: a) a cylindrical body with a reservoir for holding a liquid and an opening at the top, wherein shape of the container remains cylindrical and does not change as liquid leaves the reservoir, b) a ring for threadably attaching to the top of the body; c) a cap in shape of glans for threadably attaching to the member, the cap not having an opening for travel of liquid to outside of the body; d) a nipple with an opening placed above the body in fluid communication with the reservoir; and e) a one way valve with a cylindrical housing placed inside of the nipple, wherein the one way valve is actuated by a user sucking on the nipple; wherein liquid leaves the body and moves to the outside of the container when the cap is removed; wherein the cap has an extension on its inside that comes down and prevents liquid from coming out of the opening of the nipple; and container is configured to be used as a dildo with the cap on and a drink container with the cap removed.

Provided is a mannequin comprising at least a torso of a human body, the mannequin further comprising: a) a cavity on a side of the mannequin where a container can be placed in an upright position; b) tubing from the container to one or more of sexual organs, wherein a user can suck on the tubing to drink liquid from the container. The cavity can have a removable cover made by cutting away a portion of mannequin. The mannequin can have arms and the cavity underneath the arms on the sides of the torso.

Provided is a container for drinking liquid comprising: a) a cylindrical body with a reservoir for holding a liquid and an opening at the top, wherein shape of the container remains cylindrical and does not change as liquid leaves the reservoir, b) a ring for threadably attaching to the top of the body; c) a first rigid cap for threadably attaching to the ring, the cap not having an opening for travel of liquid to outside of the body; d) a second cap made from rubber or silicone in shape of glans for threadably attaching to the member, the cap not having an opening for travel of liquid to outside of the body; e) a nipple with an opening placed above the body in fluid communication with the reservoir; and f) a member placed inside of the nipple in a concentric fashion; g) a one way valve with a cylindrical housing placed inside of the member, wherein the one way valve is actuated by a user sucking on the nipple; wherein liquid leaves the body and moves to the outside of the container when the first and second caps are removed; wherein first the cap has an extension on its inside that comes down and prevents liquid from coming out of the opening of the nipple; and wherein the container is configured to be used as a dildo with the cap on and a drink container with the cap removed.

Provided is a container for drinking liquid comprising: a) a cylindrical body with a reservoir for holding a liquid and an opening at the top, wherein shape of the container remains cylindrical and does not change as liquid leaves the reservoir; b) a member for removably attaching to the top of the body, the member having an opening for movement of liquid; c) a cap in shape of glans for removably attaching directly or indirectly to the member, the cap not having an opening for travel of liquid to outside of the body; and d) a nipple with an opening placed above the body in fluid communication with the reservoir; wherein liquid leaves the body and moves to the outside of the container when the cap is removed.

Provided is a container for drinking a liquid comprising: a) a cylindrical body for holding the liquid and an opening at the top, wherein shape of the body remains cylindrical and does not change as liquid enters or leaves the body; b) a piston movably attached to inside of the body, the piston defining a barrier between air and the liquid, with the liquid on top of the piston: c) a ring shaped cap with an opening attached to the top of the body; and d) a nipple with an opening placed in proximity to the top of the body in fluid communication with the body, the nipple having a base portion and a nipple portion with an opening, the nipple portion going through the opening of the rig-shaped cap; e) a one way valve in fluid communication with the body and the nipple, the one way valve placed in flow of the liquid between the nipple opening and the body; wherein when a person sucks on the nipple, the one way valve opens, and liquid leaves the body and to the person's mouth through the opening of the nipple. The container can further comprise a glans shaped cap lacking an opening for flow of the liquid, wherein the glans shaped cap is removably placed on the nipple. The body can be phallus shaped. The glans shaped cap can have a member that comes downward to seal the nipple opening. The container can be configured to be used as a dildo with the glans shaped and a drink container without the cap removed. The first portion of the nipple can be a disc shaped base and the second portion of the nipple is a protruding portion on top of the base, wherein the one way valve is placed inside of the second portion of the nipple. The one way valve has a cylindrical body that can fit inside of the protruding portion of the nipple. The one way valve body has a spring inside and a member configured to move from force of suction by a person. The member that is configured to move is placed on top of the valve body faces the nipple opening. There can be an opening configured to allow movement of air inside of the body as liquid leaves the body. The container can further have a removable cap on a bottom of the body having the opening configured to allow movement of air inside of the body. The ring shaped cap can have two concentric circles, with an inner circle having threading for attaching to the body, and the outer circle being configured to form a uniform cylindrical surface with the body. The ring shaped cap can have additional threading located above the concentric circles, the additional threading configures for attachment to another cap. The body can have a neck portion. The piston can have a base portion and a protruding portion, the protruding portion configured to fit inside the neck portion of the body. The piston can have a base portion and a protruding portion, the protruding portion configured to fit inside the neck portion of the body. The top of the protruding portion can have a recess configured to receive a rod for pushing the piston down. The piston can comprise one or more bands that seal the liquid.

Provides is a multi-use container configured to function as both an adult toy and for drinking a liquid comprising: a) a cylindrical body for holding the liquid and an opening at the top, wherein shape of the body remains cylindrical and does not change as liquid enters or leaves the body; b) a piston movably attached to inside of the body, the piston defining a barrier between air and the liquid, with the liquid on top of the piston: c) a ring shaped cap with an opening attached to the top of the body; and d) a nipple with an opening placed in proximity to the top of the body in fluid communication with the body, the nipple having a base portion and a nipple portion with an opening, the nipple portion going through the opening of the rig-shaped cap; e) a one way valve in fluid communication with the body and the nipple, the one way valve placed in flow of the liquid between the nipple opening and the body; the one way valve placed inside of the nipple; f) a glans shaped cap lacking an opening for flow of the liquid, wherein the glans shaped cap is removably placed on the nipple, wherein when a person sucks on the nipple, the one way valve opens, and liquid leaves the body and to the person's mouth through the opening of the nipple; and wherein the container is configured to be used as a dildo with the cap on and a drink container with the cap removed. The body can have a neck portion, the piston can have a base portion and a protruding portion on top, the protruding portion of the piston configured to fit inside of the neck portion. The piston can have one or more bands for sealing the liquid. Provided is a mannequin comprising at least a torso of a human body, the mannequin further comprising any of the above containers/bottles, and b) a recess on a side of the torso of the mannequin; c) tubing extending from the container to one or more of breasts of the mannequin; d) a nipple mount having a nipple in fluid communication with the container and attached to the tubing, the nipple mount placed on one of the breasts of the mannequin.

BRIEF DESCRIPTION OF THE FIGURES

FIG. 1 is front view of adult toy.
FIG. 2 is a cross section view of the adult toy with a closed valve.
FIG. 3 is a cross section view of the adult toy with an open valve.
FIG. 12 illustrates mannequin side view with nippled liquid container mounting.
FIG. 13 illustrates mannequin front view with nippled liquid container mounting.
FIG. 14 illustrates front view of nippled liquid container for mannequin.
FIG. 15 illustrates side view, cross section, of nippled liquid container for mannequin.
FIG. 17 illustrates front view cross section of container spout.
FIG. 18 illustrates front view of container spout.
FIG. 19 illustrates detailed cross section of one-way valve.
FIG. 20 illustrates exploded view of the one-way valve.
FIG. 32 is an isometric exploded view of adult toy.
FIG. 33 illustrates front view of an adult toy.
FIG. 34 illustrates cross-section of an adult boy.
FIG. 35 illustrates a side view of the adult toy.
FIG. 36 illustrates a section view of FIG. 35.
FIG. 37 illustrates a section view of FIG. 35.
FIG. 38 illustrates a side view of valve assembly o-ring sealer.
FIG. 39 illustrates a top view of valve assembly with valve assembly chassis.
FIG. 40 illustrates bottom view of valve assembly with valve assembly chassis.
FIG. 41 illustrates an exploded isometric view of one way valve assembly.
FIG. 42 illustrates isometric view of valve assembly with valve assembly chassis.
FIG. 43 illustrates cross section of top view of FIG. 39 valve assembly.
FIG. 44 cross section of toy with valve in normally closed position.
FIG. 45 illustrates cross section of toy with valve in open position via user mouth suction.
FIG. 46 illustrates isometric view of valve assembly in a closed position.
FIG. 47 illustrates isometric view of valve assembly in an open position.

FIG. 80 illustrated an exploded isometric view of glans spring valve assembly.

FIG. 81 illustrates a cross-sectioned side view of glans spring valve assembly.

FIG. 82 illustrates an exploded isometric view of bottom cap spring valve assembly.

FIG. 83 illustrates cross-sectioned side view of bottom cap spring valve assembly.

FIG. 84 illustrates an exploded isometric view of spring valve assembly

FIG. 85 illustrates an isometric view of spring valve assembly in closed position.

FIG. 86 illustrates a cross-section of spring valve in a closed position.

FIG. 87 and FIG. 88 illustrates an isometric view of spring valve assembly in an open position

FIG. 104 illustrates an isometric view of double threads airless dildo container.

FIG. 105 illustrates the exploded view of double threads airless dildo container.

FIG. 106 illustrates the top view of double threads airless dildo container.

FIG. 107 illustrates a side view of double threads airless dildo container.

FIG. 108 illustrates a bottom view of double threads airless dildo container.

FIG. 109 illustrates a cross-section view of FIG. 107.

FIG. 119 illustrates an isometric side view of container closure sub-assembly.

FIG. 120 illustrates a side view of container closure sub-assembly.

FIG. 121 illustrates cross section of FIG. 120.

FIG. 122 illustrates an isometric bottom view of container closure sub-assembly.

FIG. 123 illustrates an exploded view of cradle valve sub-assembly.

FIG. 124 illustrates an exploded view of closure sub-assembly.

FIG. 132 illustrates a side view of double threads with liner dildo container.

FIG. 133 illustrates a top view of view of double threads with liner dildo container.

FIG. 134 bottom view of view of double threads with liner dildo container

FIG. 135 illustrates a cross-section view of FIG. 132.

FIG. 136 illustrates a piston side view.

FIG. 137 illustrates a piston bottom view of liner flange.

FIG. 138 illustrates a partial section of FIG. 137.

FIG. 139 illustrates a side view of overmolded container 306.

FIG. 140 illustrates a cross section of FIG. 139.

FIG. 141 illustrates a isometric exploded view of nipple valve assembly.

FIG. 142 illustrates a side view of nipple sub-assembly

FIG. 143 illustrates a cross section of view 142.

FIG. 151 illustrates a container in the shape of an adult toy (dildo) with the cap on.

FIG. 160 is a cross-section view of the container of FIG. 158.

FIG. 168 illustrates a cap with two concentric circles.

FIG. 169 illustrates a piston bottle and two caps for the bottle.

DETAILED DESCRIPTION OF THE INVENTION

Figure 4:
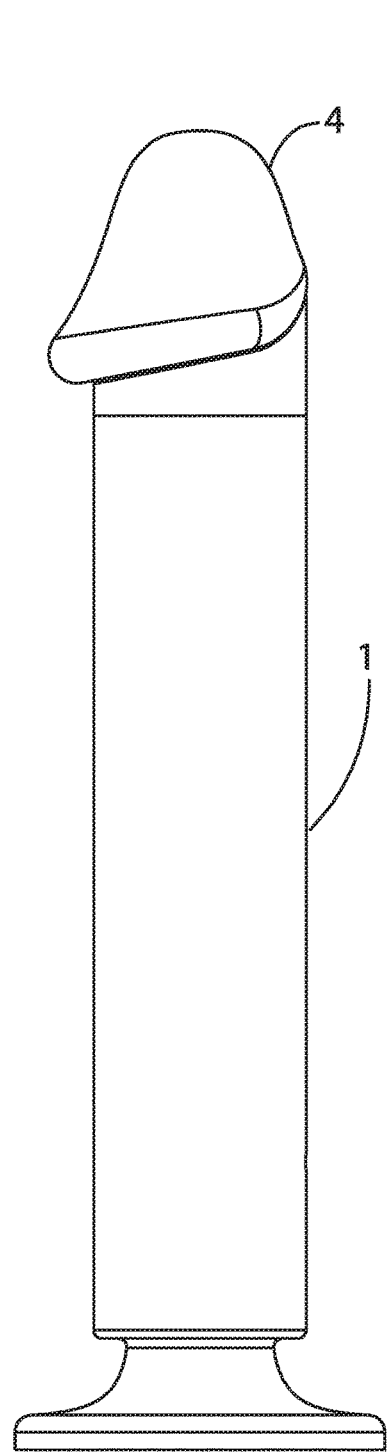
FIG. 4 illustrates the adult toy.

FIGS. 1-8 illustrate a drink container in the shape of an adult toy, in this case a phallus. In other embodiments, the container can be a baby bottle or other shaped cups. A liquid for drinking is placed inside of the container. A user can drink from the container (of all the figures) regardless of the position of the container. The container can also be washed and reused.

FIG. 1 illustrates a front view of adult toy, showing the outside of the adult toy. Body 1 can be made with an overmold of a soft cover on a hard material, or alternatively from a single material that is not porous to a liquid. FIG. 1 illustrates the soft cover of body 1 with a similar feel and hardness to human tissue. A suitable soft material can be TPE (Thermo Plastic Elastomers) gels in the 50 Shore OOO to 80 Shore OO range. Examples of TPEs include Styrenic block copolymers (TPE-s or TPS ((Thermo Plastic Starch) compounds based on SBS (Poly(styrene-butadiene-styrene), (SEBS styrene-ethylene/butylene-styrene)), Polyolefin blends (TPE-O or TPO (Thermoplastic olefin)), Elastomeric alloys (TPE-V or TPV (Thermoplastic vulcanizates)), Thermoplastic polyurethanes (TPE-U or TPU (Thermoplastics polyurethane Elastomer), Thermoplastic copolyester (TPE-E or TPC (Thermoplastic Copolyester Elastomer), and Thermoplastic polyamides (TPE-A or TPA (Thermoplastic Polyamide Elastomers). Body 1 can be cylindrical in shape. The hard part can be made from metal, plastic, glass, wood, fabric, ceramic, and carbon-fiber. Glass is typically used for a one-layer housing.

To cover the top of the body and to give the look of a phallus, Cap 4 in shape of glans can cover the top of body 1. Cap 4 can be made from a soft cover (over mold). The cap 4 on body 1 can create a cap-body split line 100. Cap 4 can have threading that can be used to removably and threadably attach cap 4 to body 1.

FIG. 2 is a cross-section view of the adult toy of FIG. 1. Disclosed in this figure are body soft cover (over mold) 1, body housing hard shell (over mold) 2, body housing hard shell air exchange hole 2a, body housing cap hard shell (over mold) 3, cap 4 (glans soft cover over mold), cap hard shell (over mold) 5, cap liquid access hole 5a, liquid flow direction 101, air-less liquid 102, cap/liquid container engagement threads 103, cap/body over molds engagement threads 104, flexible liquid container 7, valve seal o-ring assembly (closed position) 10, valve housing 19, and valve retainer ring 20.

FIG. 2 illustrates placing container 7 inside of body 1. Container 7 is made from a flexible material that shrinks/collapses as liquid leaves container 7, compensating for the loss of volume of the liquid. The container can include a liquid that is airless. Examples of liquids include water, juice, soda, alcohol, wine, vodka, tequila, whiskey, or a liquid simulating a human fluid in taste and/or looks (such as semen). A separator 6a extending from substantially the top of the container 7 to bottom of container 7 can be included to keep the container 7 stable, particularly as liquid 102 leaves the container 7. The separator 6a as shown in FIG. 2 is filled and does not allow for movement of liquid. In another embodiment, the separator is a straw with a cavity inside and optional perforations on the sides to allow for movement of liquid. The separator 6a is positioned below and attached to spout 6. Liquid 102 leaves through slot on spout 6. Positioned above slot is one way valve housing 19. Valve housing 19 contains valve 10, which is configured to be actuated by force of suction of a person's mouth. Liquid leaving the valve 10 moves up spout 6 and moves into liquid access hole 4a (channel) of cap 4. The liquid then exits the toy from top of hole 4a on cap 4. FIG. 2 illustrates valve 10 in a closed position and FIG. 3 illustrates valve 10 in an open position, allowing for movement of liquid pass valve 10. The container can be made by welding a flexible material, which can result in the container having a seam 7a.

FIG. 3 is a cross section view with open valve 10. This figures discloses liquid flow direction 101, air-less liquid 102, mounting suction cup 1a, body housing soft shell air exchange hole 1b, body housing cap snap ring 3a, cap (glans) soft cover liquid access hole 4a, liquid container spout 6, flexible container film separator 6a, flexible container welded seam 7a, and valve seal o-ring assembly (opened position) 10. Separator 6a, is an extension of spout unit and acts as a spacer to allow the liquid to flow out of flexible container via user mouth suction. Check-valve 10 prevents air to replace liquid exiting out of the housing. Flexible container 7 remains airless until all the liquid is consumed. This toy can be used in any universal position while liquid is still available. Liquid container can be disposable while the over molded housing can be reusable and also dishwasher safe. Alternatively the Liquid container can be reusable.

FIG. 4 illustrates a side view of the adult toy with the phallus shaped body 1. Illustrated in this view are body soft cover (over mold) 1, and cap (glans) soft cover (over mold) 4. The bottom of the toy can have mounting suction cup 1a.

Figure 5:
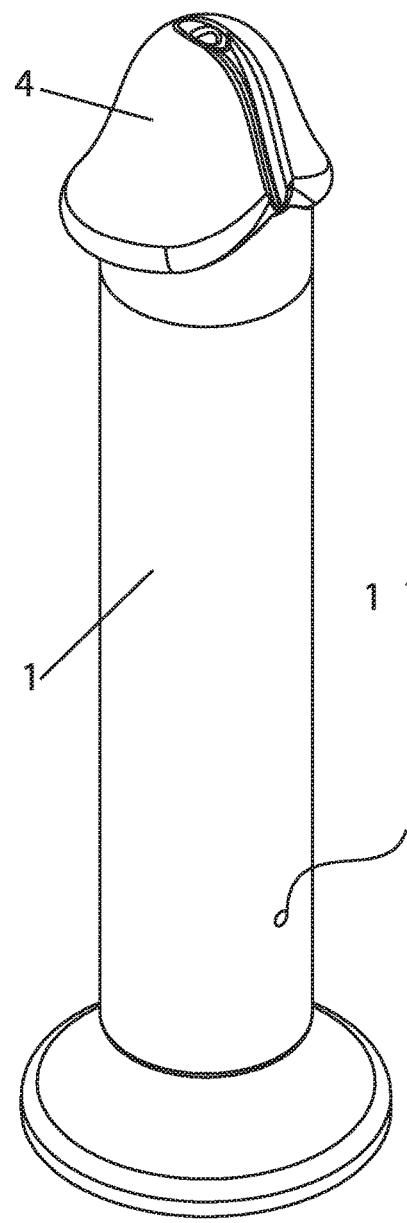
FIG. 5 illustrates the adult toy.

FIG. 5 illustrates an isometric front side view of the adult toy with the phallus shaped body 1. Illustrated in this view are body soft cover (over mold) 1, body housing soft shell air exchange hole 1b, and cap (glans) soft cover (over mold) 4.

Figure 6:
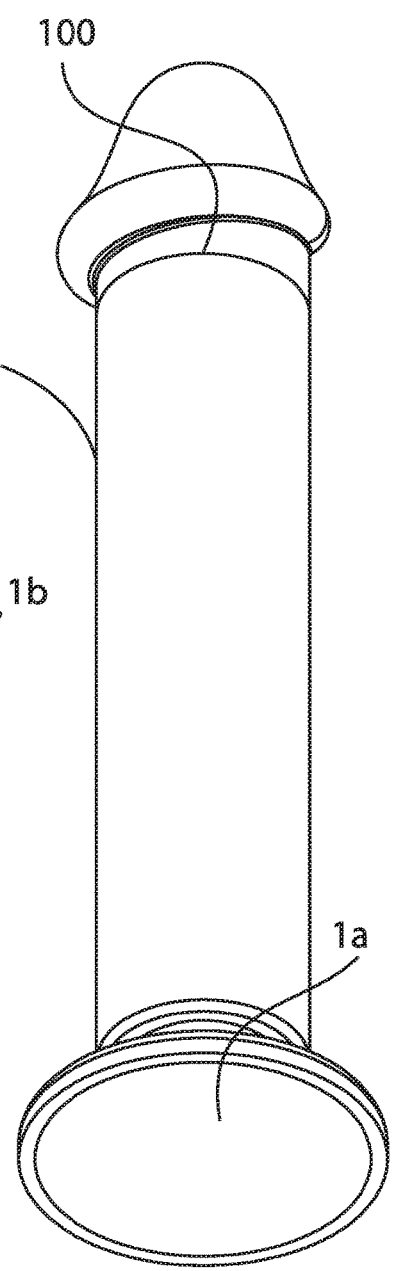
FIG. 6 illustrates the adult toy.

FIG. 6 illustrates a perspective view of adult toy with body soft cover (over mold) 1, mounting suction cup 1a, and cap body split line 100. Mounting suction cup 1a can be used to removably attach the adult toy to a flat surface, and to stabilize the adult toy in an upright position. Cap 4 can further have a channel on the outside in between the two bulges that runs from access hole opening 4a to the bottom of the bulge area on cap 4.

Figure 7:
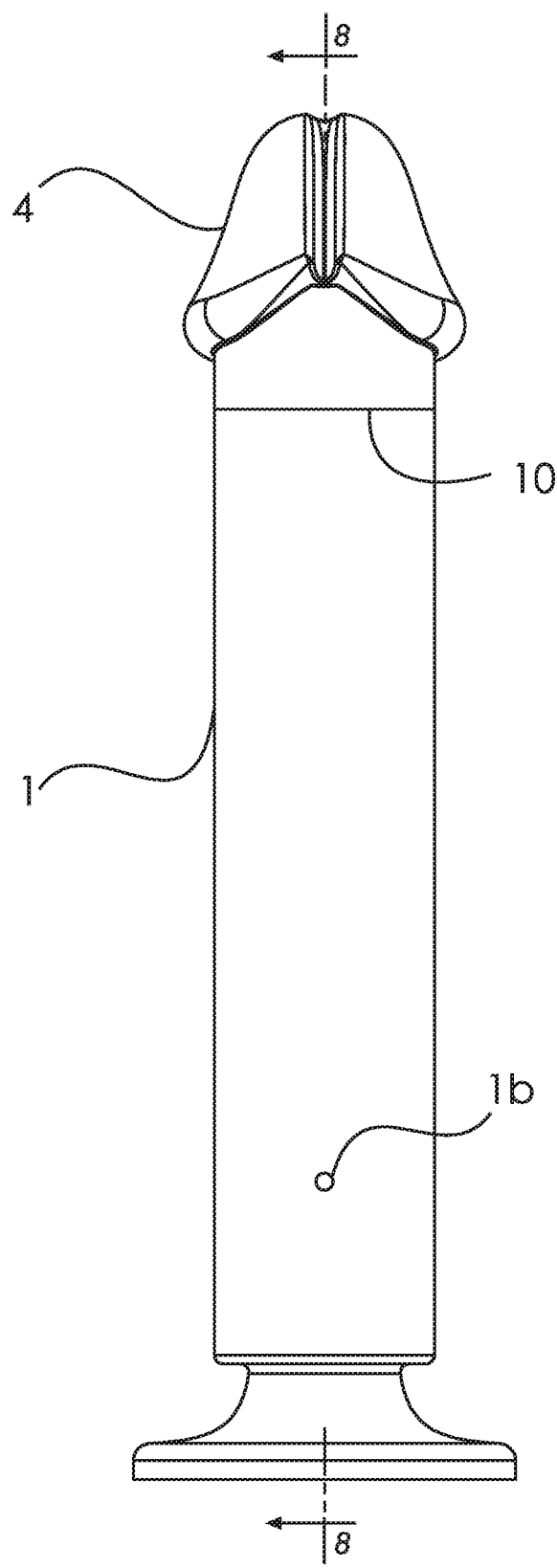
FIG. 7 illustrates back view of the housing for the adult toy.

FIG. 7 illustrates back view of reusable housing of the adult toy. This view illustrates body soft cover (over mold) 1, air exchange hole 1b, cap body split line 100, and cap (glans) soft cover (over mold) 4. Air exchange hole 1b allows for exchange of air from outside of the housing with air in between the container and the housing in the inside of housing.

Figure 8:
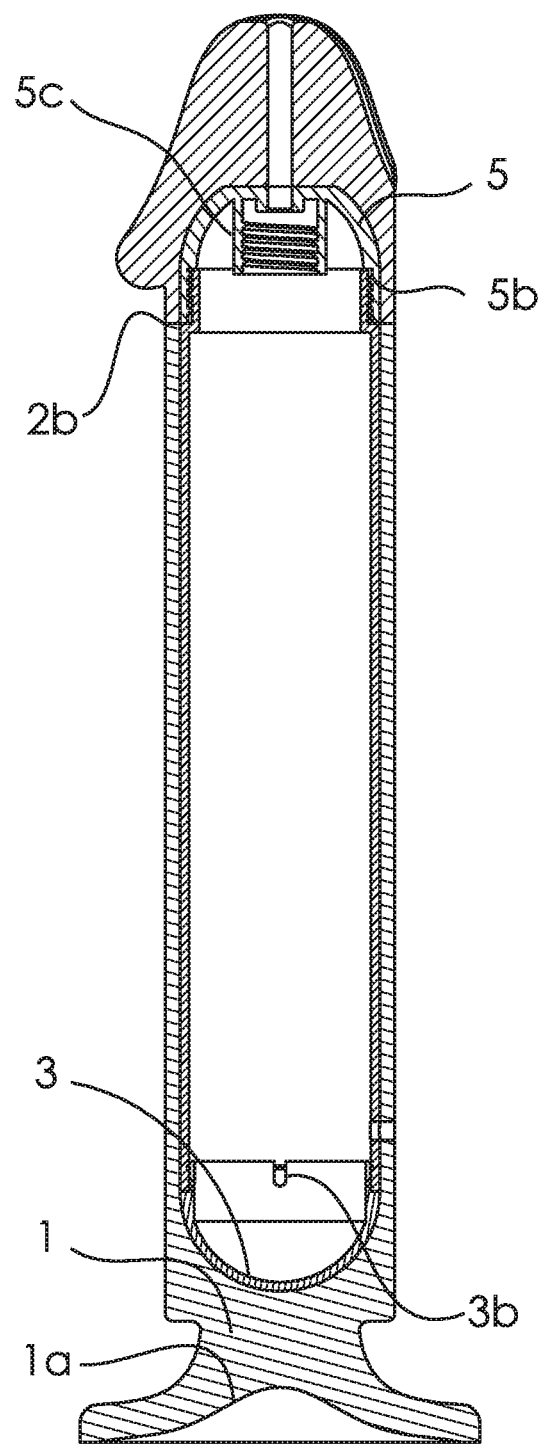
FIG. 8 illustrates side view cross section of housing for the adult toy.

FIG. 8 illustrates side view cross section of reusable housing of the adult toy. This view illustrates body soft cover (over mold) 1, mounting suction cup 1a, body housing hard shell threaded receptacle for cap 2b, body housing cap hard shell (over mold) 3 (which is in shape of a sphere and is used to cap the bottom part in the manufacturing process), body housing cap snap deflection slot 3b. Placed on top of the body is cap 4, which is overmolded on cap hard shell 5. Cap threaded receptacle 5c extends down and is configured to receive a spout. The housing illustrated in FIG. 8 is reusable, and can be washed after each use. A container having a liquid for consumption is placed in the housing. Cap 4 and body 1 can have a rigid inner hard shell. The rigid shell 3 of body 1 extends above the soft outer layer of the body on top, and has threading to accept the cap. The threaded portion can be positioned on a shoulder, which is a portion of the rigid shell with a smaller diameter. When cap 4 is placed on the body, the threaded portion 5b (Cap threaded receptacle) of rigid portion 5 of cap complements the threads on the body. Cap hard shell 5 also has an extension (receptacle 5c) that comes down inside the body and has threading. The extension is configured to receive spout 6 and be threadably attached to spout 6. After attachment, the spout is in fluid communication with access hole 4a, allowing the fluid to leave cap 4 and the container altogether.

As illustrated in FIG. 8, the housing is configured so that a spout is attached to receptacle 5c. In another embodiment, receptacle 5e is absent and a person uses the toy as a regular cup that has to be filled up by a user.

Figure 9:
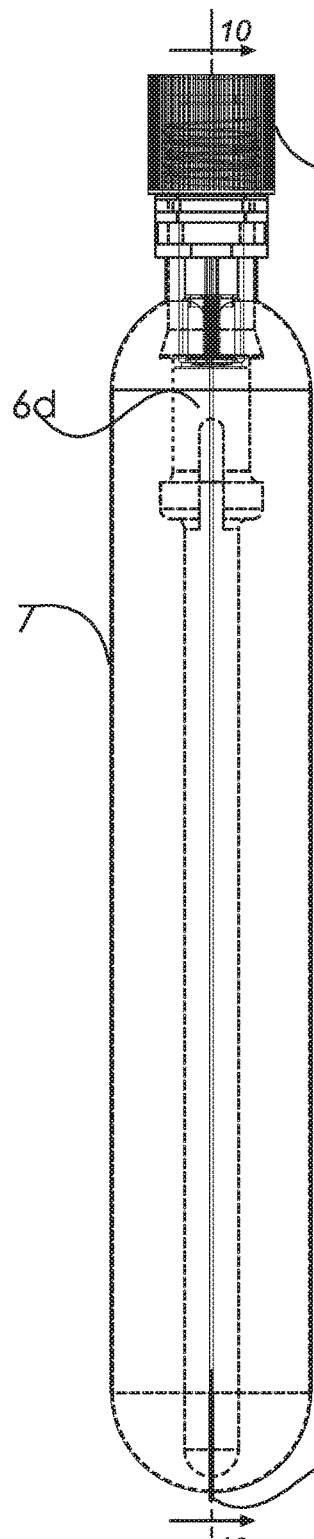
FIG. 9 illustrates side view of a liquid container.

FIG. 9 illustrates side view of a disposable liquid container. Illustrated in this view are liquid container spout 6, spout liquid flow side access slot 6d, flexible liquid container 7, and liquid container shipping cap (throw away) 210. Flexible liquid container 7 is made from a material that shrinks/collapses as a user consumes liquid. By collapsing, the bottle compensates for loss of volume resulting from consumption. This bottle can be a stand-alone bottle, or have a hard housing as illustrated in FIG. 10.

Figure 10:
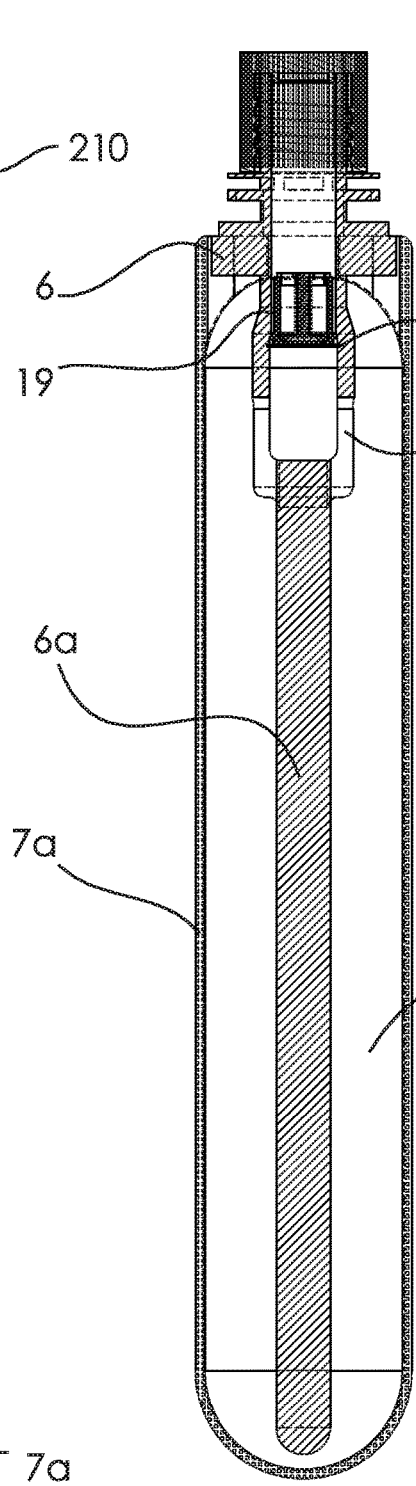
FIG. 10 front view cross section of a liquid container.

FIG. 10 illustrates front view cross section of disposable liquid container with a rigid housing. In this view, illustrated are liquid container spout 6, flexible container film separator 6a, spout liquid flow side access slot 6d, flexible liquid container 7, flexible container welded seam 7a, valve retainer ring 20, air-less liquid 102. The separator 6a maintains the length of the flexible liquid container 7. Illustrated is also flexible container welded seam 7a that can result from the manufacture of the flexible container.

Figure 11:
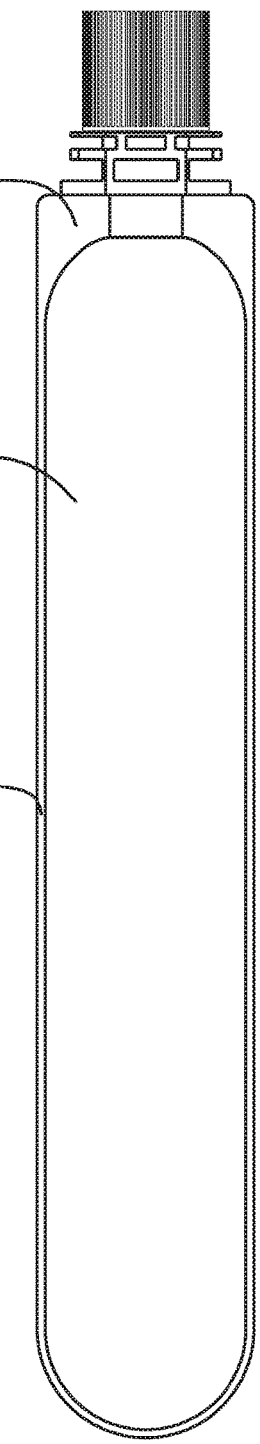
FIG. 11 illustrates front view cross section of a liquid container.

FIG. 11 illustrates front view cross section of disposable liquid container. Illustrated in this view are flexible liquid container 7 and flexible container welded seam 7a.

The liquid container illustrated in FIGS. 9-11 can be stand alone or have a phallus shaped housing. Cap 210 can be removed when using a phallus shaped or other type of housing. When a user sucks, the user actuates the one way valve of the bottle so that liquid can leave the bottle. The container 7 then shrinks.

Figure 27:
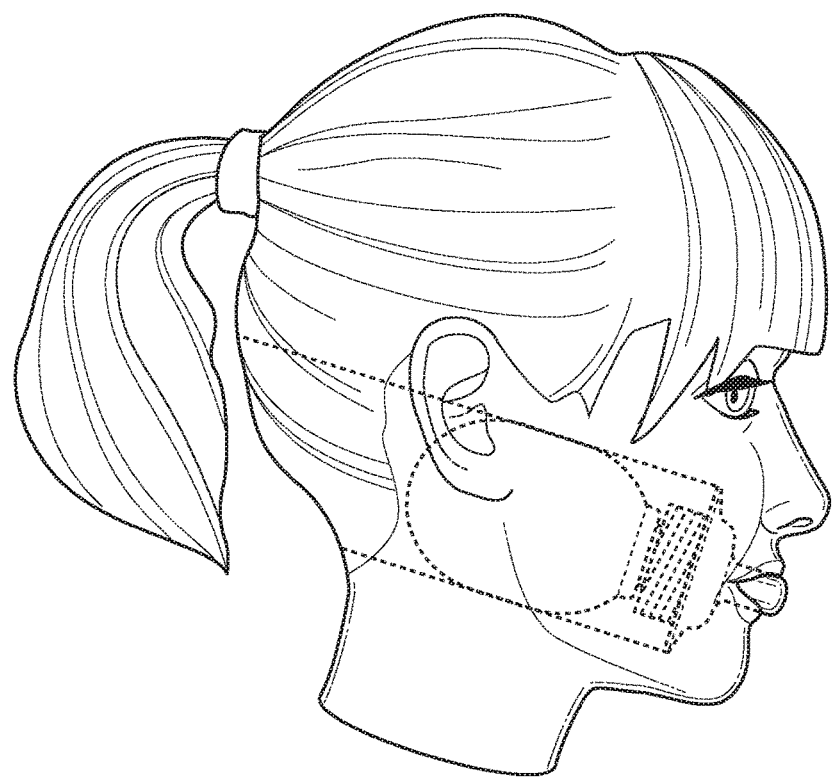
FIG. 27 illustrates a head with a bottle placed inside of the head.
Figure 28:
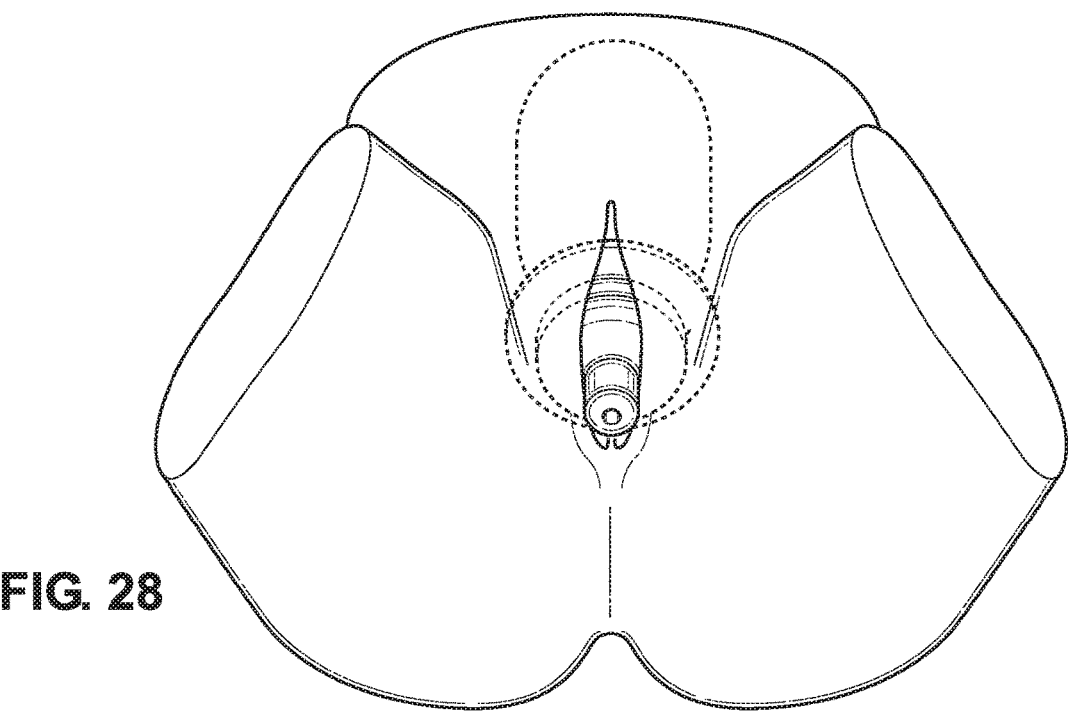
FIG. 28 illustrates a mannequin with a bottle placed in a cavity in the torso and the nipple of the bottle accessible from the vagina.

As illustrated in FIGS. 12-15 and FIGS. 27-28, a bottle containing a liquid can also be placed inside a cavity of a mannequin. The cavity can be formed in position of the mouth, genitals, vagina, breasts, and anus. FIG. 12 illustrates a mannequin side view of the torso. Illustrated in this view are disposable nippled liquid container mounting cap (nipple) soft cover (over mold) 12, mannequin 110, mannequin breast 110a, mannequin breast threaded insert receptacle (mounting tbd) 110b. In this embodiment, container 8 is placed in a cavity of the mannequin where the breasts of the mannequin are typically present. The portion of container 8 holding the liquid is inside of the mannequin and the nippled portion 12, which is a nipple-shaped cap, is outside of mannequin 110. When a user sucks on nipple 12, one way valve opens, and liquid from container 8 enters the cap, and then the person's mouth. In this embodiment, only the nippled portion 12 of the bottle is visible from outside of the mannequin 110. The bottle can be removably placed inside the mannequin 110 cavity. If the breasts of the mannequin are made from a soft material like silicone, the fins 110b on the bottle would stabilize the bottle by pressing on the silicone. FIG. 27 illustrates placing the bottle in the head of a mannequin, with the nippled portion sticking out of the lips of the mannequin. There can be an access from the back of the head for accessing the cavity to place and remove the bottle. There can be similar access from back for breasts and other genitals. Alternatively there can be front access for placing the bottle. The bottle can be placed as a stand-alone or as part of an assembly that includes a member simulating human part. For example, the bottle can be placed inside a soft material that resembles a human breast, and then the human breast having the bottle incorporated therein is attached to the mannequin. FIG. 28 illustrates the bottle being placed in a cavity of the torso to simulate a human vagina. Instead of a nipple, the part of the mouth configured to touch the moth can be a lip or a vagina, to simulate other parts of the body.

FIG. 13 illustrates mannequin front view. Container 8 is secured to the cavity in the mannequin. Illustrated in this view are disposable nippled liquid container mounting cap (nipple) soft cover (over mold) 12, mannequin 110, mannequin breast 110a. A person can suck on the nippled portion 12 to drink the liquid inside the container. The bottle can be placed from the front or the back depending on the design of the mannequin. The container 8 can also be placed as part of a bottle having a hard shell.

FIG. 14 illustrates container 8 that is placed inside of the mannequin in the upper torso where the mannequin's breasts would be located. Container 8 is secured to the cavity in the mannequin. Illustrated in this figure are disposable nippled liquid container for mannequin cap (nipple) soft cover (over mold) 12, short flexible liquid container 8, and flexible container welded seam 8a, and mannequin breast threaded insert receptacle (mounting tbd) 110b.

FIG. 15 illustrates side view, cross section of disposable nippled liquid container 8. Illustrated in this view is cap hard shell (over mold) 5, cap liquid access hole 5a, flexible container welded seam 8a, liquid container spout 9, flexible container film separator (short) 9a, cap (nipple) soft cover (over mold) 12, cap (nipple) soft cover liquid access hole 12a, valve housing 19, air-less liquid 102, flexible container welded seam 8a. The soft cover 12 can be overmolded on hard shell 5. Hard shell 5 can have an extension that comes down and has threading to be threadably and removably attached to liquid container spout 9. The spout can be fabricated as one piece having spout 9 and separator 9a. Valve housing 19 can be placed inside the spout to control movement of liquid 102 from inside the container to outside of the container. The flexible liquid container 8 shrinks as liquid 102 leaves the container. Container 8 can be made by welding a flexible material, which can result in a seam 8a. Container 8 can also be welded to spout 9 to seal container 8.

Figure 16O:
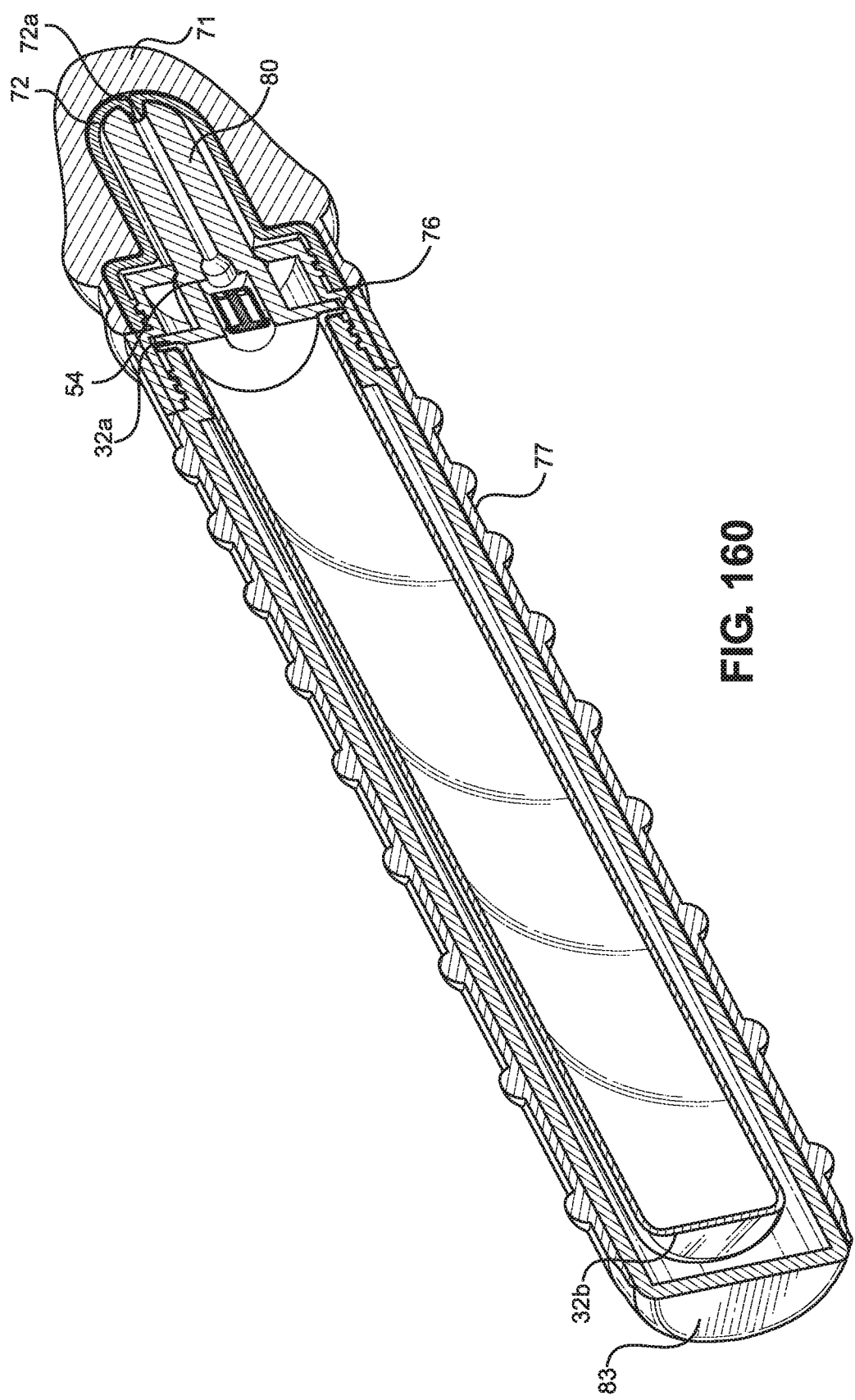
FIG. 16 illustrates side view of container spout.

FIG. 16 illustrates side view of container spout liquid container spout 6. This view illustrates the spout liquid flow side access slot 6d and separator puncture-proof spherical tip 6s. The entire spout 6 (from top to 6s) can be fabricated from one piece of material, typically plastic. The spherical bottom 6s minimizes chance of puncturing the container. Liquid leaves the reservoir of the container through slot 6d and then travels through spout 6 to outside of the container. Spout 6 has threading on top for threadable attachment to member 5c extending below rigid portion of the cap, as illustrated in FIG. 8.

FIG. 17 illustrates front view cross-section of container spout 6. In addition to relative small lots 6d, the spout 6s has larger slots 6w, for a total of 4 slots, spaced relatively equidistant from each other. Illustrated in this view are flexible container film separator 6a, spout liquid flow side access slot 6d, and spout liquid flow front/back access slot 6w. Also illustrated in this view is valve housing 19, which contains a one way valve. The valve housing 19 is positioned in between above access slot 6d, which with slots 6w, are the only pathway the liquid has to travel from the inside of the container to outside of container.

FIG. 18 illustrates front view of container spout 6. Illustrated in this view is valve retainer ring 20. Valve retainer ring 20 mounts the valve assembly on spout 6, and maintains the position of the valve assembly parallel to the spout. Valve retainer ring 20 can be a compressible ring, which is compressed first, and then positioned in the spout 6, resulting in expansion and forming a stable assembly with spout 6. In this view, valve retainer ring 20 is slightly visible on top of slot 6w. Also shown in this view is threading 6t on outside of spout 6. Threading 6t complements the threading on inside of 5c, and is configured to allow the spout to be threadably attached to cap 5.

FIG. 19 illustrates detailed cross section of the one-way valve. Illustrated in this view are one-way valve liquid container spout 6, valve (closed position) 10, valve seal o-ring 14, valve housing seal o-ring 15, valve spring 17, valve spring retainer cap 18, valve housing 19, valve retainer ring 20.

FIG. 20 illustrates exploded view of the one-way valve. Illustrated in this view are valve 10, valve seal o-ring 14, valve housing seal o-ring 15, valve spring 17, valve spring retainer cap 18, and valve housing 19. When a user sucks on the bottle, valve 10 moves upward as regulated by spring 17, opening a passageway for movement of liquid. Spring 17 sits on stem of valve 10 and is compressed and provides resistance as valve 10 moves upward. Valve spring retainer cap 18, which snaps into housing 19, has a central opening that allows the step of valve 10 to slide up when subjected to the force of sucking. Valve housing 19 and valve seal o-ring 14 block passage of liquids when valve 10 is in a closed position. Seal o-ring 14 is positioned in a depression along the base of valve 10 to block passage of liquid in a closed valve position. Seal o-ring 15 is placed on outside of housing 19 and blocks passage of liquid from in between housing 19 and spout 6. FIG. 20 illustrates a relatively sophisticated valve design. Cheaper and simpler valves can also be used. For example, a miniature umbrella valve can be used.

Figure 21:
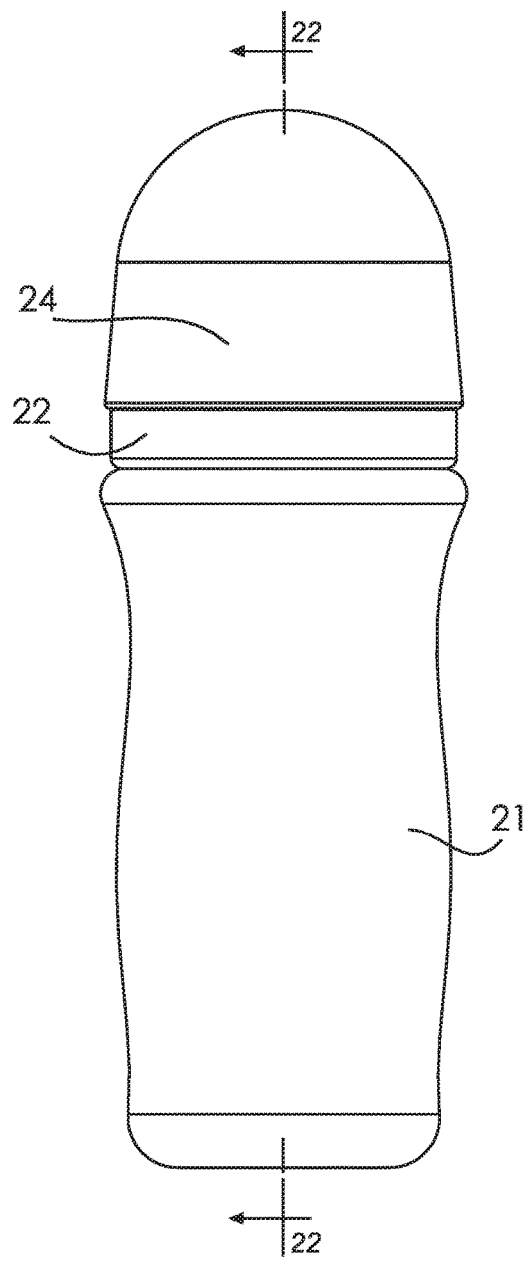
FIG. 21 illustrates front view of baby bottle assembly.

FIG. 21 illustrates front view of baby bottle assembly from the outside with cap 24 in place. Illustrated in this view is baby bottle with baby bottle housing 21, nipple housing closure 22, and nipple protective cap 24.

Figure 22:
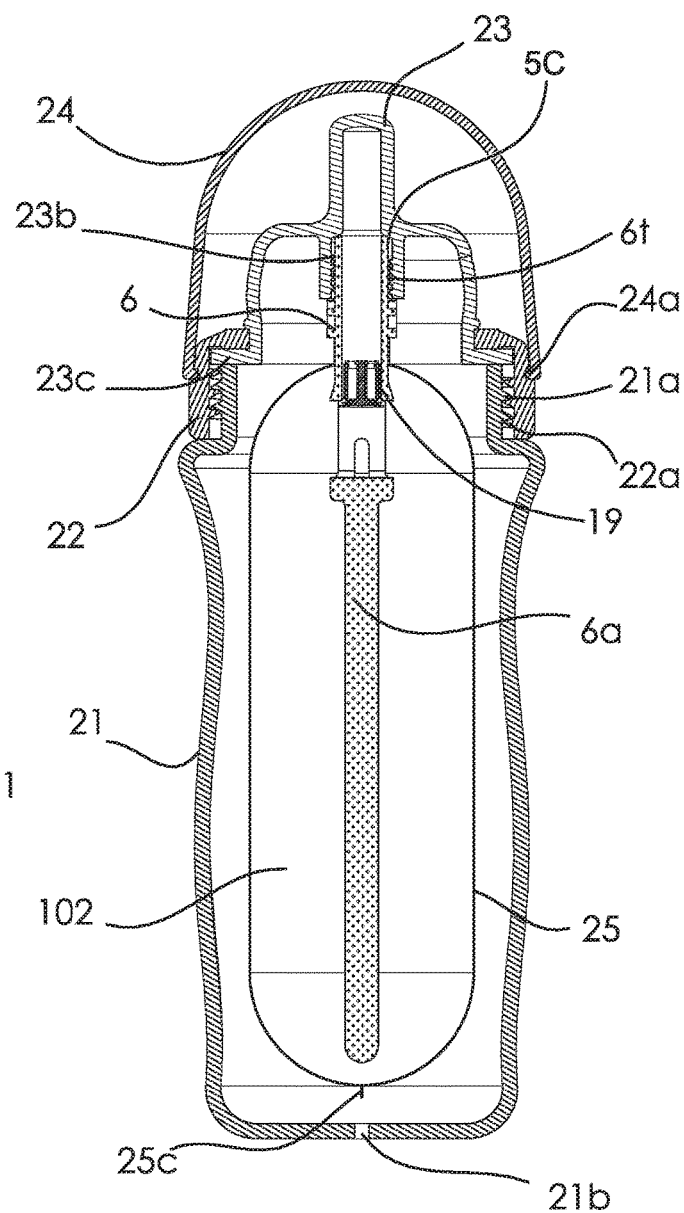
FIG. 22 illustrates cross-section side view of baby bottle assembly.

FIG. 22 illustrates cross-section side view of baby bottle assembly of FIG. 21, Illustrated in this view are liquid container spout 6, flexible container film separator 6a, spout mounting thread 6t, valve housing 19, baby bottle housing 21, baby bottle housing closure mounting thread 21a, baby bottle housing air exchange hole 21b, nipple bottle housing closure 22, nipple bottle housing closure thread 22a, nipple 23, nipple liquid container spout threaded receptacle 5c, nipple spout receptacle thread 23b, nipple mounting flange 23c, nipple protective cap 24, nipple protective cap snap ring 24a, flexible liquid container 25, flexible liquid container seam 25c, air-less liquid 102. The construction of bottle in FIG. 22 is similar to that in FIG. 15 except for the addition of a rigid baby bottle housing 21. The use of an airless container minimizes suction of air by a baby, and may reduce the need for burping a baby.

Figures 23, 24, 26:
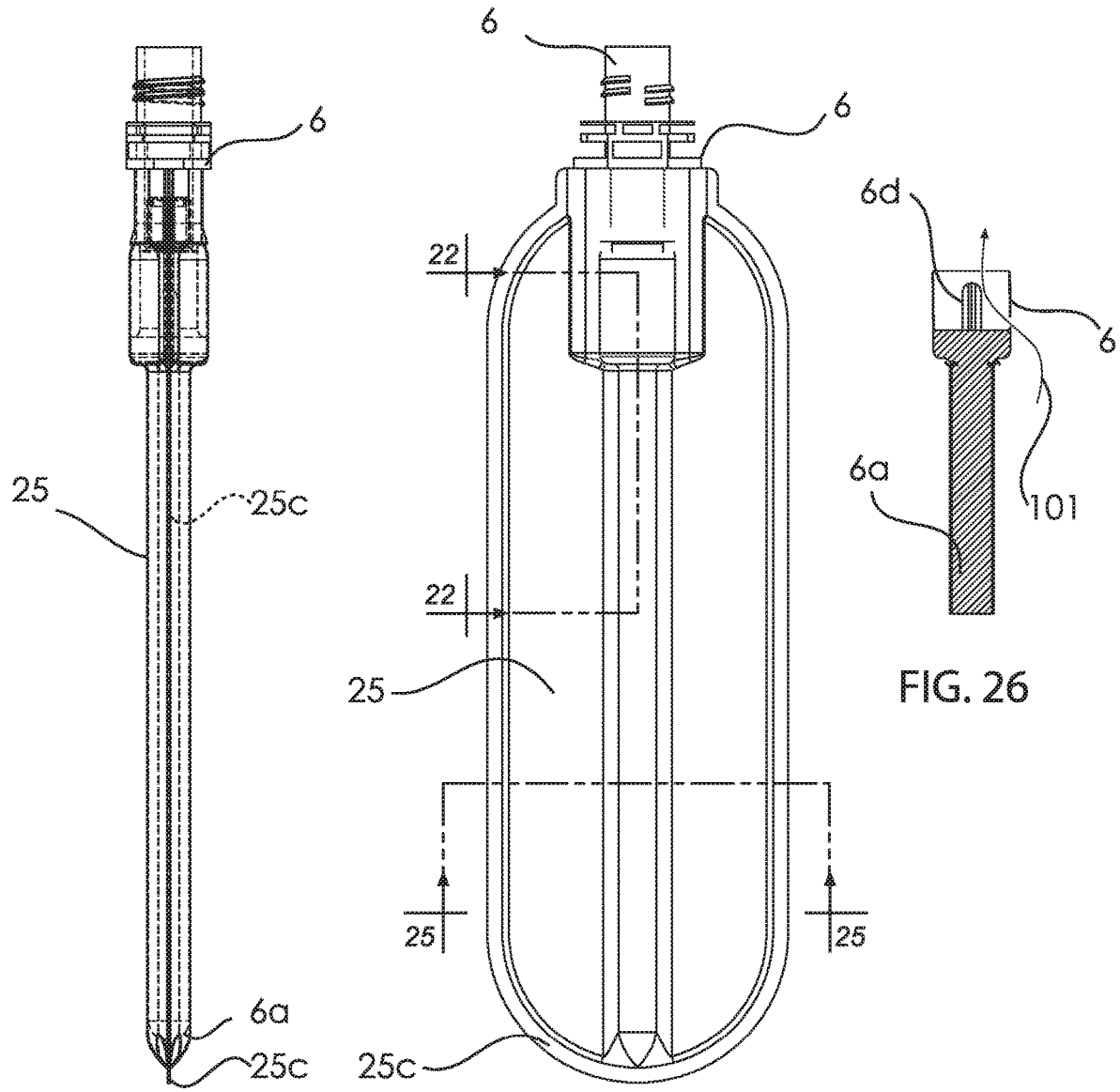
FIG. 23 illustrates side view of liquid container.
FIG. 24 illustrates front view of liquid-less liquid container.
FIG. 26 illustrates a partial vertical cross-section of front view showing movement of liquid.

FIG. 23 illustrates front view of baby bottle air-less liquid container at collapsed minimum volume liquid container spout 6, flexible container film separator 6a, flexible liquid container 25, and flexible container welded seam 25c.

FIG. 24 illustrates side view of baby bottle liquid container. In this figure, all the liquid has been consumed. Illustrated is a collapsed minimum volume liquid container spout 6 having no liquid, flexible container film separator 6a, flexible liquid container 25, and flexible container welded seam 25c.

Figure 25:
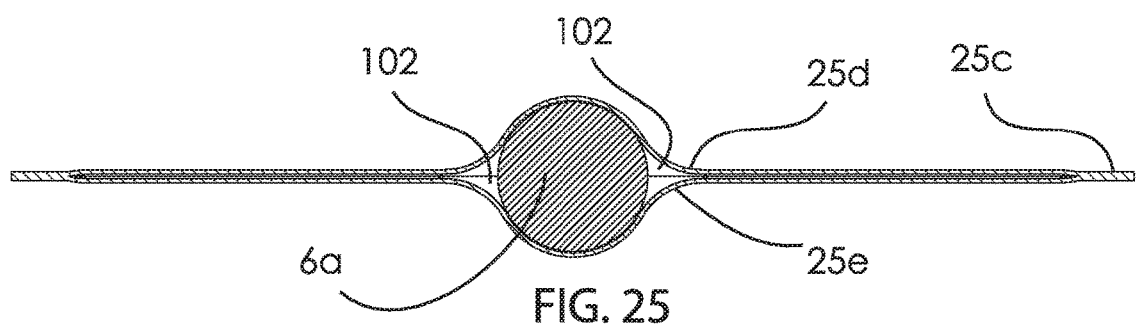
FIG. 25 horizontal cross-section front view of liquid-less container.

FIG. 25 horizontal cross-section of front view showing liquid flow spaces 102 created by spacer 6a along both sides, liquid container spout 6, flexible container film separator 6a, flexible liquid container 25, flexible container welded seam 25c, front flexible container film 25d, rear flexible container film 25e, and air-less liquid 102. This view illustrates that when the liquid is consumed, the container film 25d. When front/back slots 6W are covered, side slots 6d are still open and can allow for movement of liquid.

FIG. 26 illustrates a partial vertical cross-section of front view showing liquid flow thru spout side slot near and far sides (far side shown). Illustrated in this figure are liquid container spout 6, flexible container film separator 6a, spout liquid flow side access slot 6d, flexible liquid container 25, and flexible container welded seam 25c. When front/back slots 6W are covered, side slots 6d are still open and can allow for movement of liquid.

FIG. 27 illustrates a female mannequin head with a cavity inside for placing a bottle. The bottle can be placed from back of the head inside of the cavity. The nipple of the bottle can be exposed and accessible through an opening in the mouth of the mannequin. A person would put its lips against the lips of the mannequin and then suck fluid from nipple.

FIG. 28 illustrates a female mannequin torso with a cavity inside for placing a bottle. The bottle can be placed from behind the torso inside of the cavity. The nipple of the bottle can be exposed and accessible through an opening in the vagina of the mannequin. A person would put its lips against the vagina of the mannequin and then suck fluid from the nipple of the bottle.

Figure 29:
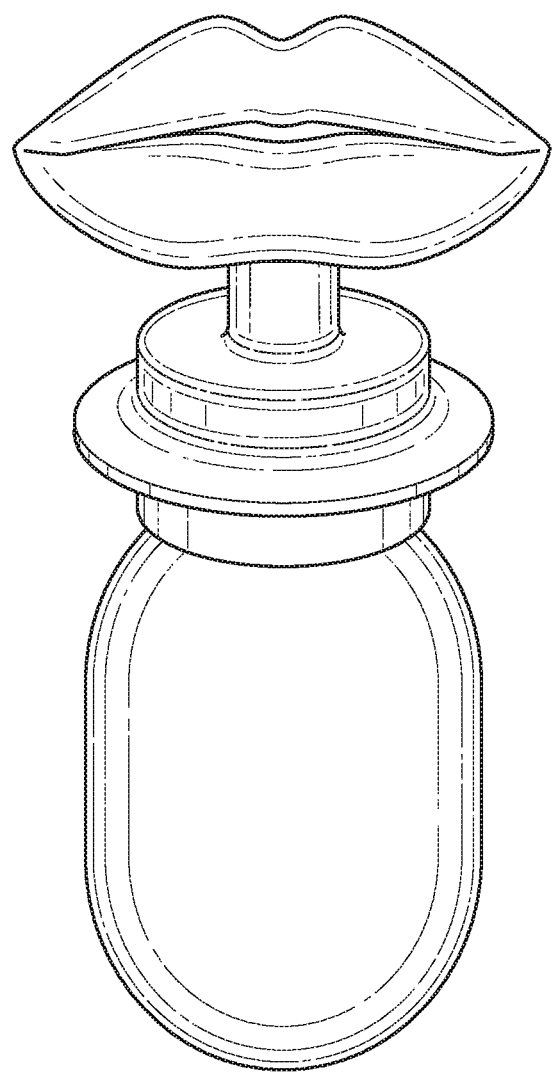
FIG. 29 illustrates a bottle with the nipple of the bottle shaped like lips.

FIG. 29 illustrates a bottle having lips instead of a nipple for sucking. The bottle can be placed in a mannequin and form the lips or another part (vagina) of the mannequin. The person can place his or her lips against the lips of the mannequin to drink.

Figure 30:
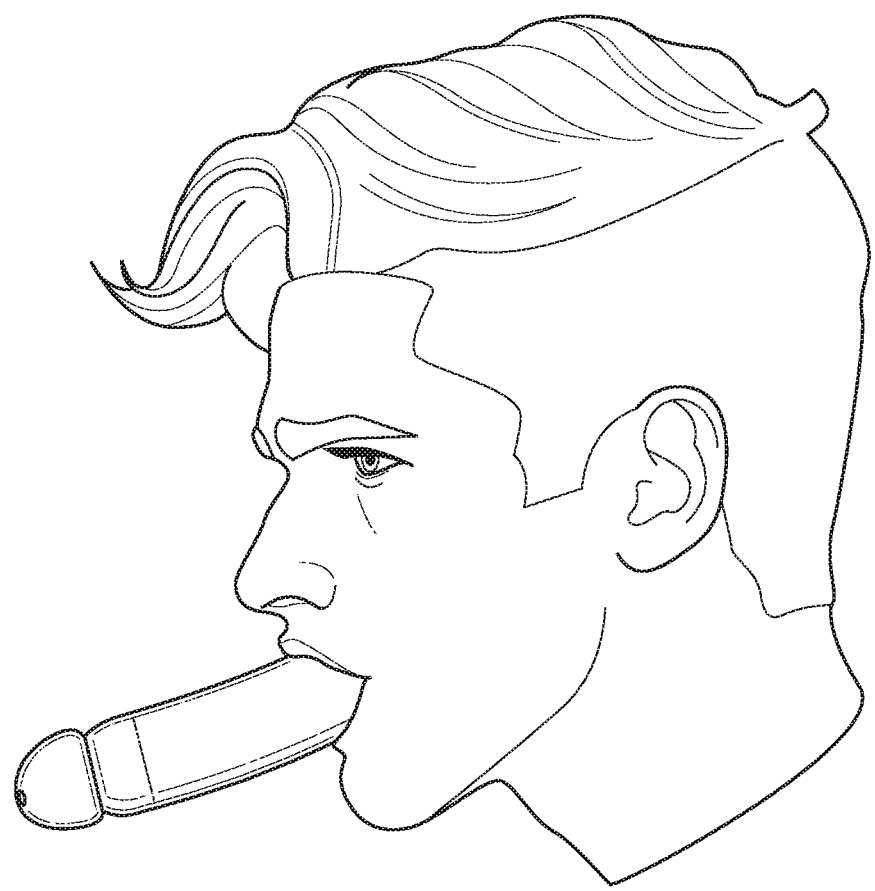
FIG. 30 illustrates the head of a male mannequin with a phallus shaped container sticking out of the mouth.

FIG. 30 illustrates a male mannequin head with a cavity inside for placing a bottle. The bottle can be placed from back of the head inside of the cavity. The bottle, in this case phallus shaped, comes out at least by one inch from an opening in the mouth of the mannequin. A person would put its lips against the bottle and then suck fluid from bottle.

Figure 31:
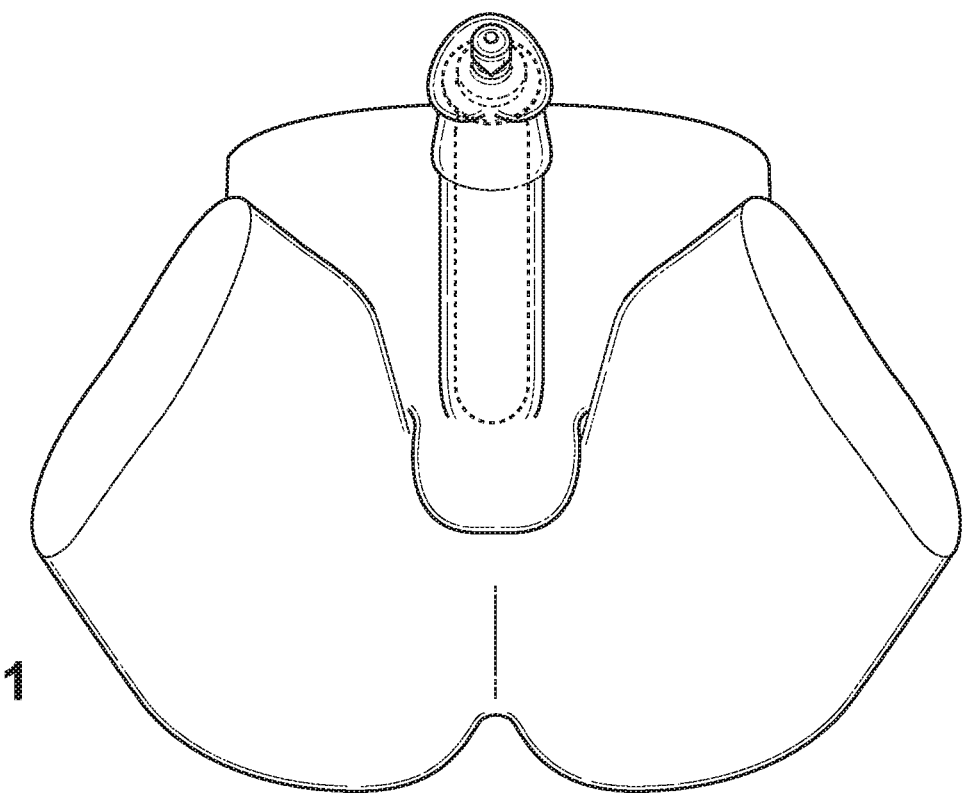
FIG. 31 illustrates the torso of a male mannequin with a phallus shaped container.

FIG. 31 illustrates a male mannequin torso with a cavity inside for placing a bottle. The bottle, in this case phallus shaped, comes out at least by one inch from an opening in the area of the genitals of the mannequin. A person would put its lips against the bottle and then suck fluid from bottle.

FIG. 32 is an isometric exploded view of adult toy with shaft 29, bottom cap 31, one-way valve assembly 111, liner cup 112, and cap (glans) 30. Shaft 29 and bottom cap 31 can be made of polypropylene (pp). A user would put a desired liquid in cup 112 and drink the liquid from the opening in cap 30. Liner cup 112 has a flange portion that rests on shaft 29, and the one-way valve assembly 111 sits on the flange of liner cup 112. The user fills cup 112 with a liquid, puts valve assembly 111 on top of it and then screws the threaded cap 30. The user can also use this embodiment without any valve 111 where liquid from cup 112 directly flows to cap 30 and to the outside without going through valve 111.

FIG. 33 illustrates front side view of the novelty in FIG. 32 with all the components in place. In this view, illustrated are shaft 29, cap (glans) 30, bottom cap 31, bottom cap knurl 31b, and cap body split line 100.

FIG. 34 illustrates cross-section of the novelty in FIG. 33. Illustrates in this figure are shaft 29, shaft cap thread 29a, shaft bottom cap thread 29b, cap valve assembly receptacle 30a, cap liquid outlet 30c, bottom cap 31, bottom cap shaft thread 31a, bottom cap air vent 31c, and valve chassis 33. Cup 112 (label) has a flange portion that sits on the threaded portion of shaft 29. The liquid inside of cup 112 is in fluid communication with valve 111.

FIG. 35 illustrates another side view of the novelty with shaft 29, cap (glans) 30, bottom cap 31, and cap body split line 100.

FIG. 36 illustrates a section of FIG. 35 side view. Illustrated in this figure are shaft 29, material cap (glans) 30, cap valve assembly receptacle 30a, cap liquid outlet liner flange (as a sealant, compressed between assembly chassis 33 and shaft 29 via cap (glans) 30 cap closure) 32a, thin flexible liner membrane (non-stretchable for example 0.08 mm thin film) 32b, valve assembly chassis 33, o-ring sealer (compressed between receptacle 30a and assembly chassis 33 as a sealant) 34, umbrella valve (elastic) 35, umbrella mounting keeper (elastic) 35k.

FIG. 37 illustrates a section of FIG. 35 with side view of shaft 29, bottom cap 31, and bottom cap air vent 31c. Cap 31 is threadably attached to shaft 29, and can be removed when needed to access the inside of shaft or for washing the novelty. Vents 31c allow for movement of air to inside of shaft as liquid leaves the shaft.

FIG. 38 illustrates a side view of valve assembly o-ring sealer 34 (compressed between receptacle 30a and assembly chassis 33 as a sealant).

FIG. 39 illustrates a top view of valve assembly with valve assembly chassis 33 and umbrella valve (elastic) 35.

FIG. 40 illustrates bottom view of valve assembly with valve assembly chassis 33, valve assembly chassis liquid flow hole 33h, valve assembly liquid inlet 33, and valve stem (elastic) 35s.

FIG. 41 illustrates an exploded isometric view of one way valve assembly 111 with valve assembly chassis 33, valve assembly chassis liquid flow hole 33h, umbrella valve mounting hole 33v, o-ring sealer (compressed between receptacle 30a and assembly chassis 33 as a sealant) 34, umbrella valve (elastic) 35, and valve stem (elastic) 35s.

FIG. 42 illustrates isometric view of valve assembly with valve assembly chassis 33, o-ring sealer (compressed between receptacle 30a and assembly chassis 33 as a sealant) 34, and umbrella valve (elastic) 35.

FIG. 43 illustrates cross section of top view of FIG. 39 valve assembly with valve assembly chassis 33, chassis o-ring groove 33g, valve assembly chassis liquid flow hole 33h, valve assembly liquid inlet 33i, umbrella valve mounting hole 33v, o-ring sealer (compressed between receptacle 30a and assembly chassis 33 as a sealant) 34, umbrella valve (elastic) 35, umbrella valve mounting keeper (elastic) 35k, valve stem (elastic) 35s, and umbrella valve seat normally closed 115.

FIG. 44 cross section of toy with valve in normally closed position. This figure illustrates shaft 29, material cap (glans) 30, cap liquid outlet 30c, bottom cap 31, bottom cap air vent 31c, thin flexible liner membrane (full capacity with no suction present) 32b, valve assembly chassis 33, airless liquid 102, and umbrella valve seat 115 (normally in a closed position in the absence of a sucking force).

FIG. 45 illustrates cross section of toy with valve in open position via user mouth suction. Liquid 102 leaves cup 112 as cup 112 collapses to compensate for loss of liquid. Liquid 102 passes through the one way valve in an open position and comes out of the opening on the cap 30c. Illustrates in this view are cap liquid outlet 30c, bottom cap 31, bottom cap air vent 31c, thin flexible liner membrane, collapsed when suction present 32b, valve assembly chassis 33, airless liquid 102, umbrella 116 valve seat opened via user mouth suction. Cup 112 can be reusable or disposable.

FIG. 46 illustrates an isometric view of valve assembly in a closed position. Illustrates in this view are valve assembly chassis 33, valve assembly chassis liquid flow hole 33h, umbrella valve (elastic) 35, and umbrella valve seat normally closed 115.

FIG. 47 illustrates isometric view of valve assembly in an open position. Illustrates in this view are valve assembly chassis 33, valve assembly chassis liquid flow hole 33h, umbrella valve (elastic) 35, and umbrella valve seat opened via user mouth suction 116.

Figures 48, 49:
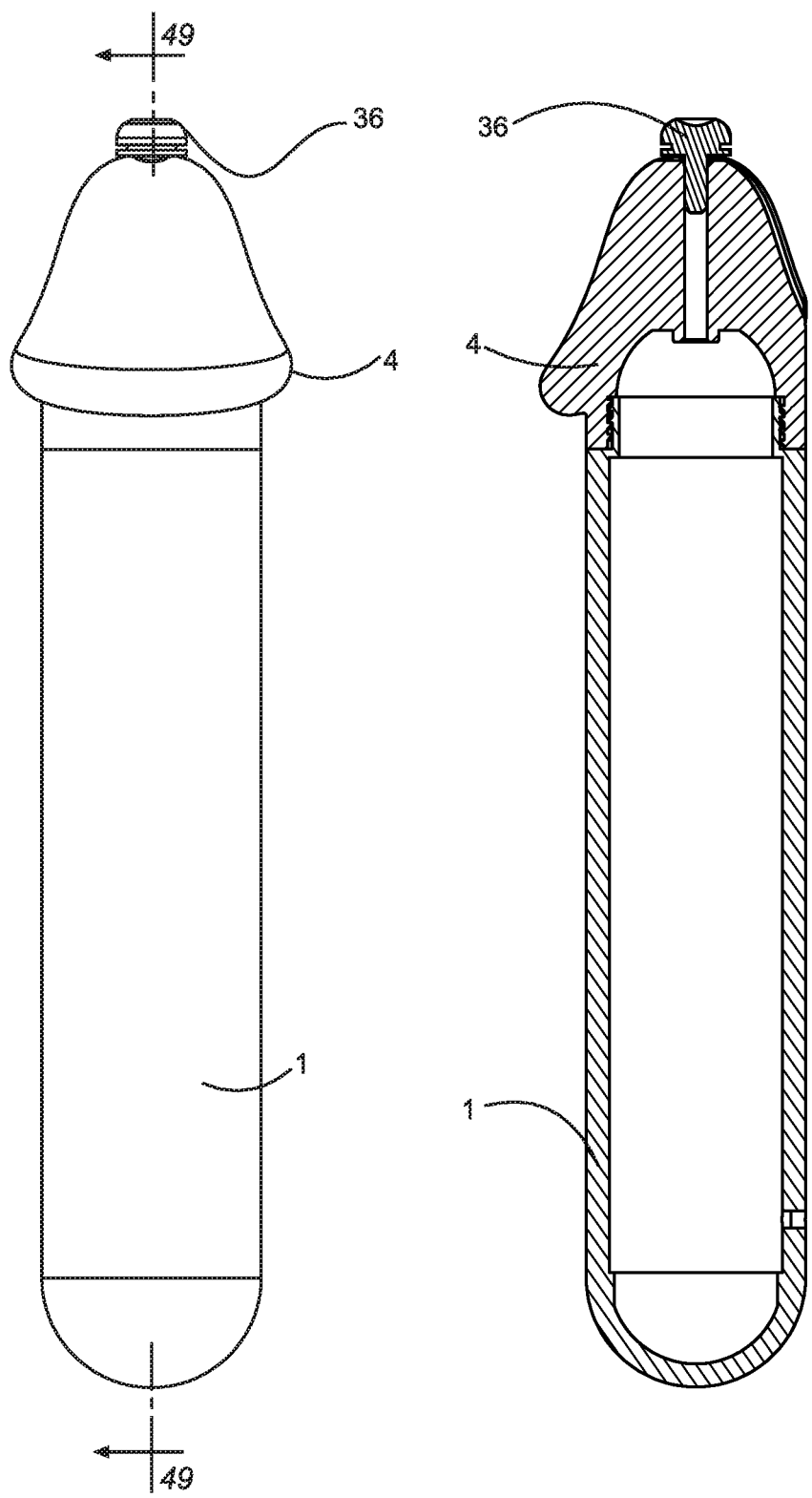
FIG. 48 illustrates a phallus shaped cup where a user fills in the liquid as desired.
FIG. 49 illustrates a phallus shaped cup where a user fills in the liquid as desired.

FIGS. 48 and 49 illustrate a phallus shaped cup where a user fills in the liquid as desired. FIGS. 48 and 49 illustrate a straight container with a cap in shape of glans. The cap can be screwed on and off to fill in the container. A person would then put the cap, in shape of glans, in a mouth and suck liquid through a channel inside of the cap. The channel can be placed entirely inside of the glans, with only an opening of the channel exposed from the outside. The channel can further have a plug 36 that blocks flow of liquid. The step of the plug 36 can rest in the channel inside of the channel, and a handle portion on the outside for removal. The entire glans can form the cap, with the container below being a substantially straight cylinder. The glans portion can be filled, and the channel present as a cutaway tubular channel that is straight and has a diameter of less than 1 cm. The toy is configured so that the cap shaped like a glans is placed in the mouth or at least makes contact with the mouth. The one layer housing shown in this embodiment can be used with any embodiment described above.

Figures 50, 51, 52:
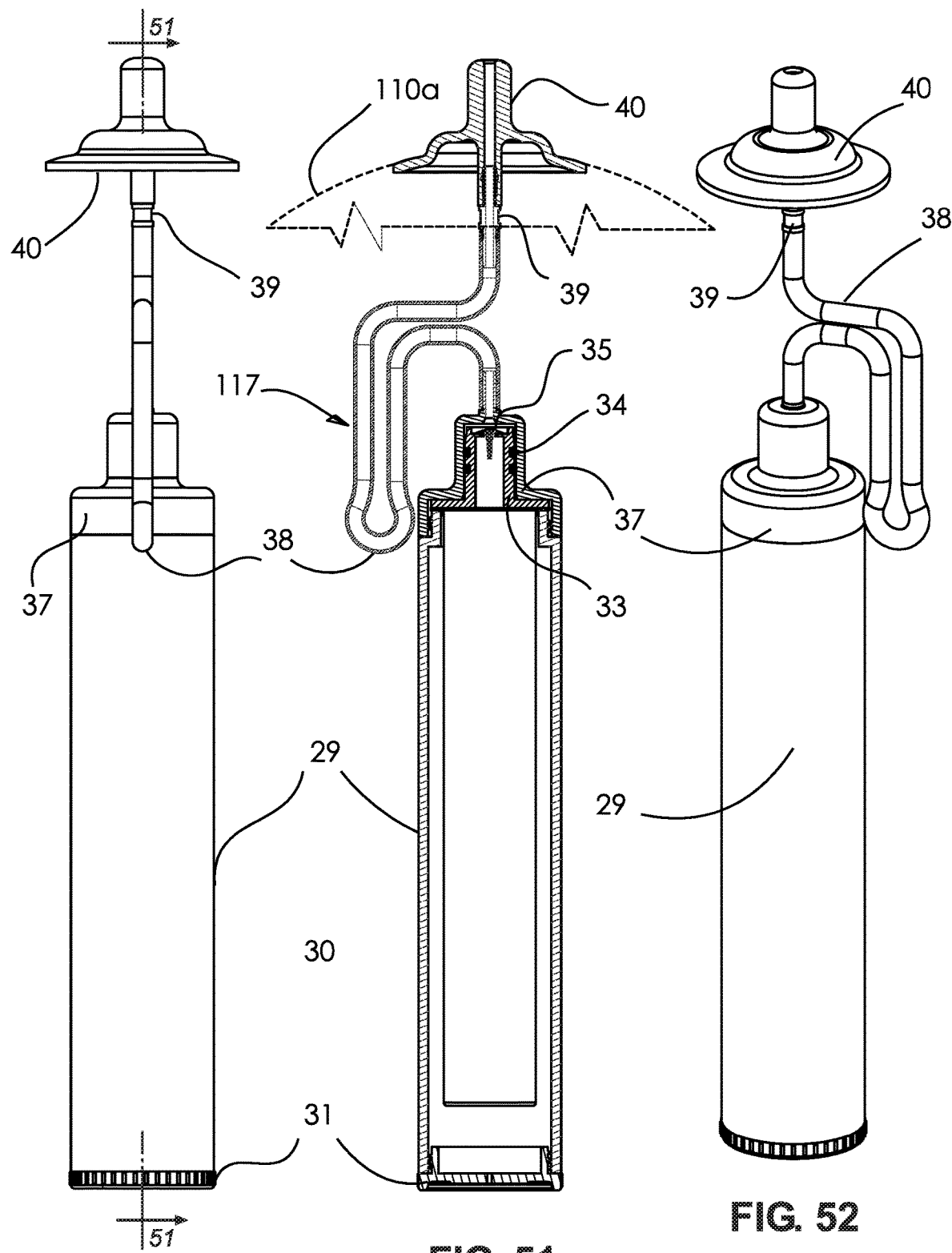
FIG. 50 illustrates a side view of container with flex tubing for connection for mannequin (breast nipple connection shown).
FIG. 51 illustrates cross section of FIG. 50.
FIG. 52 illustrates isometric view of container/adapter for mannequin organs.
Figure 53:
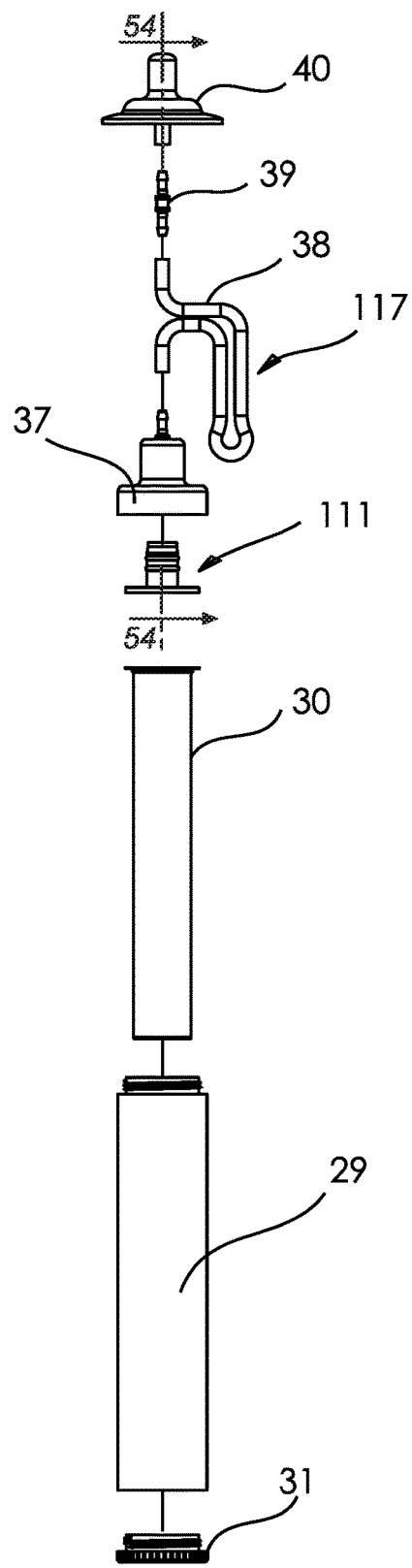
FIG. 53 illustrates front exploded view of container assembly.
Figure 54:
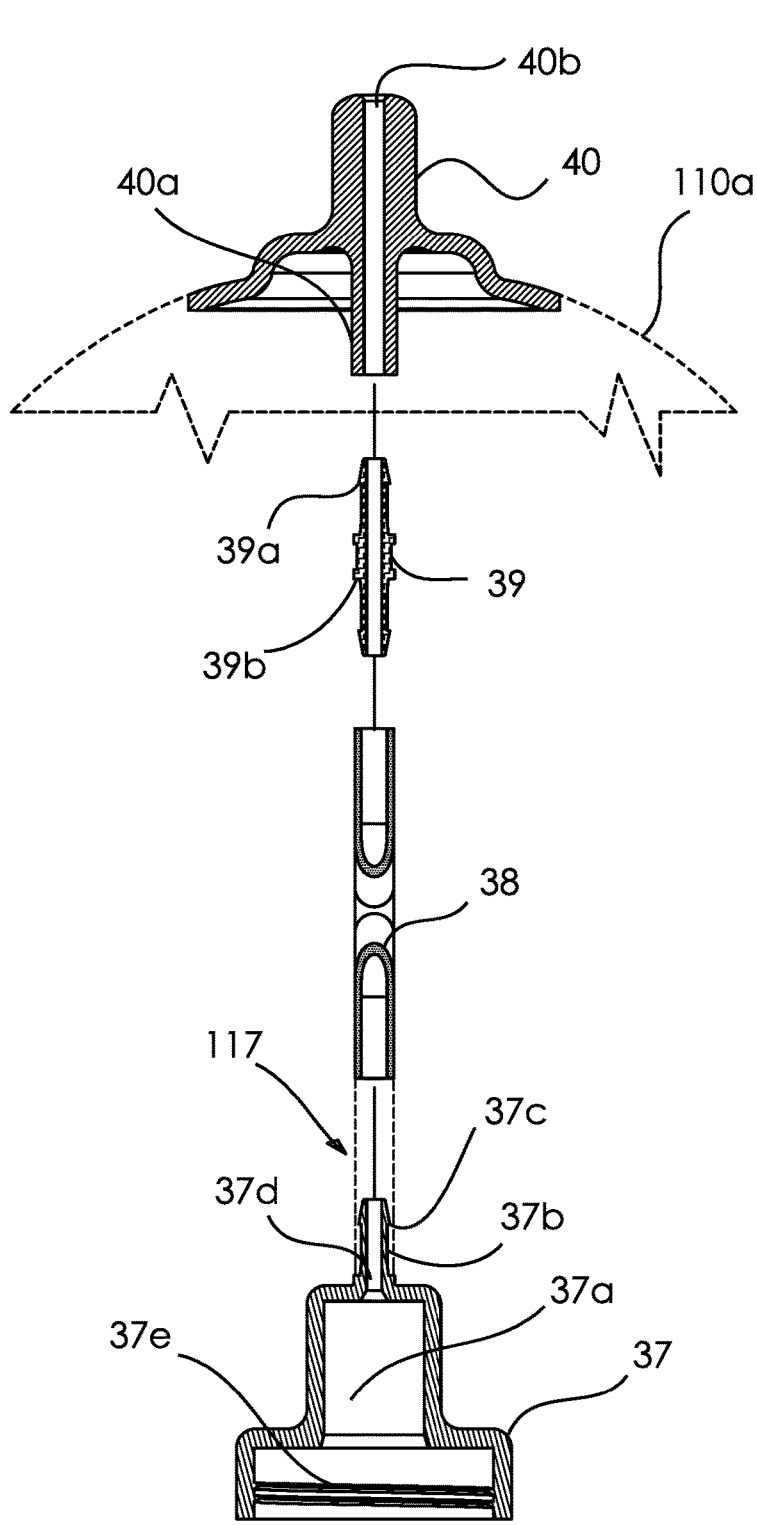
FIG. 54 illustrates partial cross section of FIG. 53.
Figure 55:
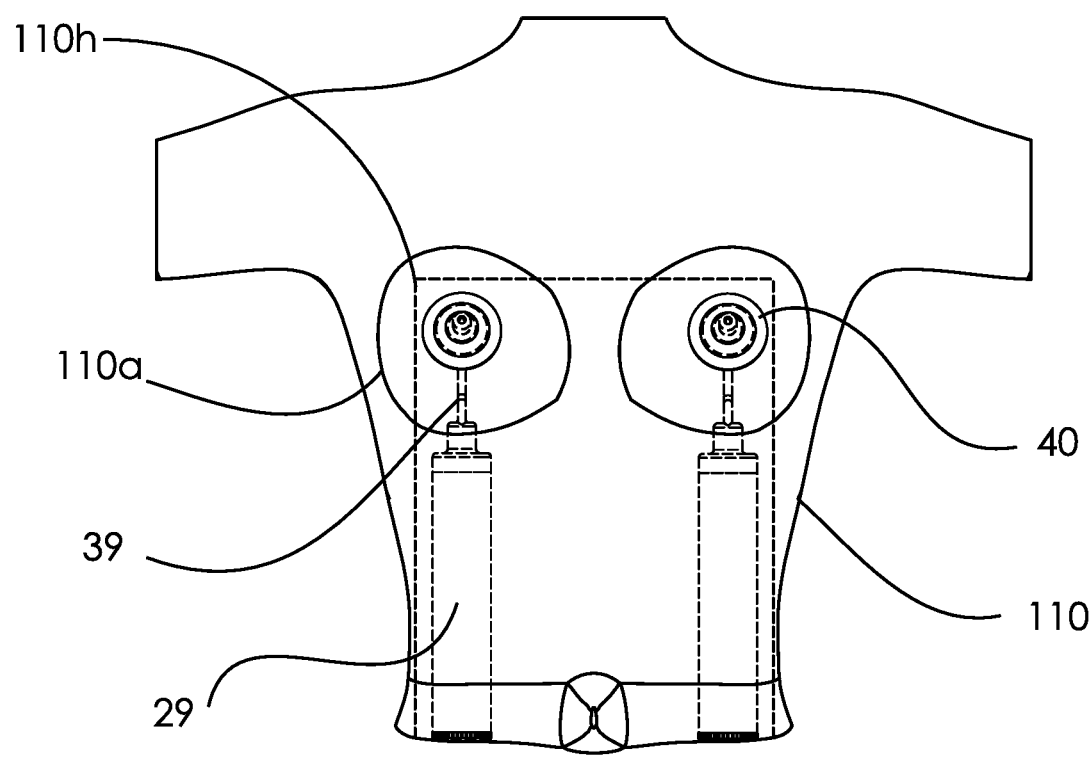
FIG. 55 illustrates mannequin front view, refillable nippled liquid container mounting.
Figure 56:
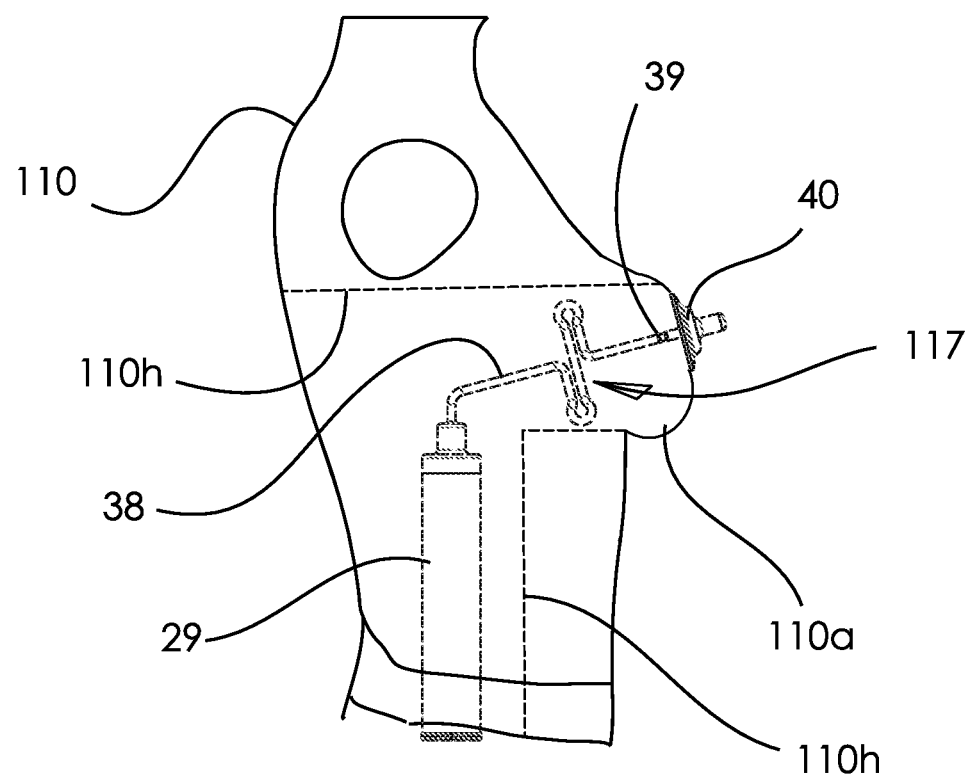
FIG. 56 illustrates mannequin side view, refillable nippled liquid container mounting.

FIGS. 50 to 56 illustrate a mannequin system for drinking liquid. A bottle can be placed anywhere in the mannequin. As illustrated in FIG. 56, the bottle is placed in a vertical position behind the nipples. To improve movement of liquid, the bottle can be placed in an upside-down or horizontal position. A tubing in fluid communication with the bottle can be connected to an opening in the mannequin, such as an opening in the nipple, mouth, or genital area. In this embodiment, the bottle can be placed in a remote location from the opening as long as a person is capable of sucking liquid from the bottle. FIG. 51 illustrates a cross-section of the bottle. This embodiment illustrates a refillable bottle with liner 30 that can be filled with any liquid that a consumer desires. The liner, which typically has a flange portion, is placed inside shaft 29 with the flange of the liner resting on shaft 29. Closure adapter 37 can be screwed to shaft 29. The closure adapter can also be attached to valve assembly chassis 33. Adapter 37 can be attached to nipple 40 with flexible tubing 117. The nipple can be held in place on the cavity with glue, snap-in mechanism, other mechanisms, or through tubing 117. FIGS. 53 and 54 illustrate the components of the bottle and its flexible tubing.

FIG. 50 illustrates a side view of container with flex tubing for connection for mannequin (breast nipple connection shown). Illustrated in this figure are shaft, material example: polyproplene (pp) 29, bottom cap, material example: polyproplene (pp) 31, closure adapter, material example: polyproplene (pp) 37, flexible tubing connection 38, flexible tubing barbed fitting 39, and mannequin breast nipple (areola nipple shown) 40. Flexible tubing connection 38 can be at least one cm long, or at least 2, 3, 4, 5, 6, 7, 8, or 9 cm long, or any range in between.

FIG. 51 illustrates a cross section of FIG. 50. Illustrated in this figure are shaft, material example: polyproplene (pp) 29, flanged flexible liner 30, bottom cap, material example: polyproplene (pp) 31, valve assembly chassis 33, o-ring sealer 34 (compressed between receptacle 30a and assembly chassis 33 as a sealant), umbrella valve (elastic) 35, closure adapter, material example: polyproplene (pp) 37, flexible tubing connection 38, flexible tubing barbed fitting 39, mannequin breast nipple (areola+nipple shown) 40, mannequin breast 110a, and tubing maintenance loop 117.

FIG. 52 illustrates isometric view of container/adapter for mannequin organs, Illustrated in this figure are shaft, material example: polyproplene (pp) 29, closure adapter, material example: polyproplene (pp) 37, flexible tubing connection 38, flexible tubing barbed fitting 39, and mannequin breast nipple (areola+nipple shown) 40.

FIG. 53 illustrates front exploded view of container assembly. Illustrated in this view are shaft, material example: polyproplene (pp) 29, flanged flexible liner 30, bottom cap, material example: polyproplene (pp) 31, closure adapter, material example: polyproplene (pp) 37, flexible tubing connection 38, flexible tubing barbed fitting 39, mannequin breast nipple (areola+nipple shown) 40, one-way valve assembly 111, and tubing maintenance loop 117. One-way valve assembly 111 fits inside of closure adapter 37.

FIG. 54 illustrates a partial cross section of FIG. 53. Illustrates in this figure are closure adapter, material example: polyproplene (pp) 37, valve assembly 111, receptacle 37a, closure adapter barbed nozzle 37b, tube keeper barb 37c, closure adapter, liquid outlet 37d, closure adapter mounting thread 37e, flexible tubing connection 38, flexible tubing barbed fitting 39, tube keeper barb 39a, tube end stop 39b, mannequin breast nipple (areola+nipple shown) 40, mannequin breast nipple connector receptacle 40a, mannequin breast nipple liquid outlet 40b, mannequin breast 110a, and tubing maintenance loop 117.

FIG. 55 illustrates mannequin front view. Illustrated in this view is refillable nippled liquid container mounting, shaft, material example: polyproplene (pp) 29, flexible tubing barbed fitting 39, mannequin breast nipple (areola+nipple shown) 40, mannequin 110, mannequin breast 110a, and liquid container replacement access hole 110h.

FIG. 56 illustrates mannequin side view. Illustrated in this figure are refillable nippled liquid container mounting shaft, material example: polyproplene (pp) 29, flexible tubing barbed fitting 39, mannequin breast nipple (areola+nipple shown) 40, mannequin 110, mannequin breast 110a, liquid container replacement access hole 110h, and tubing maintenance loop 117.

Figure 57:
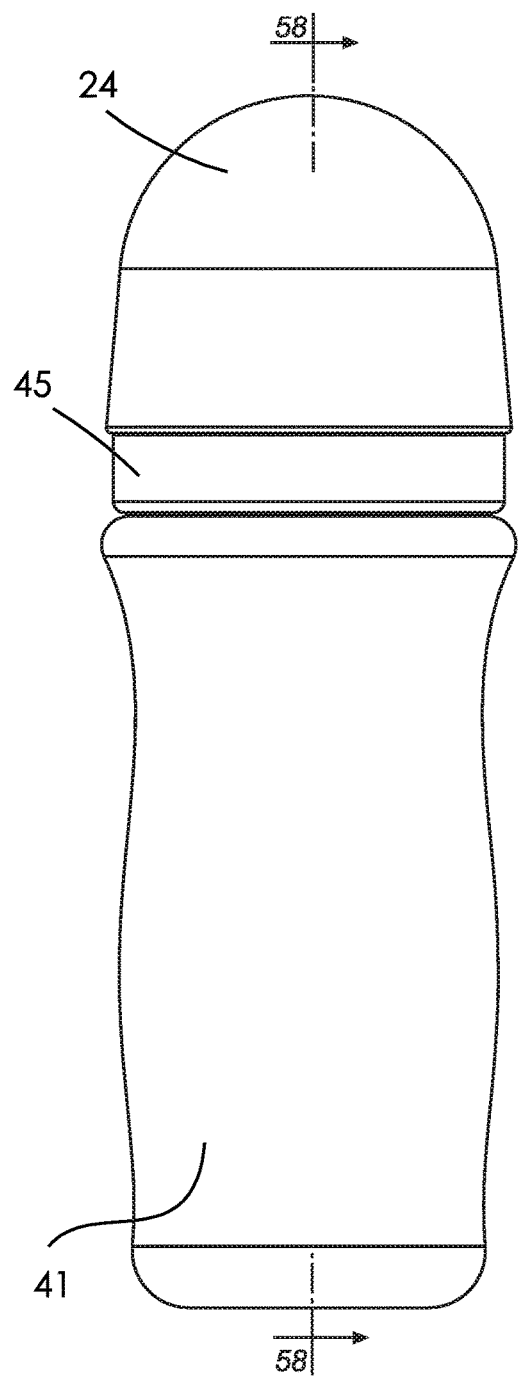
FIG. 57 illustrates front view of refillable baby bottle assembly.
Figure 58:
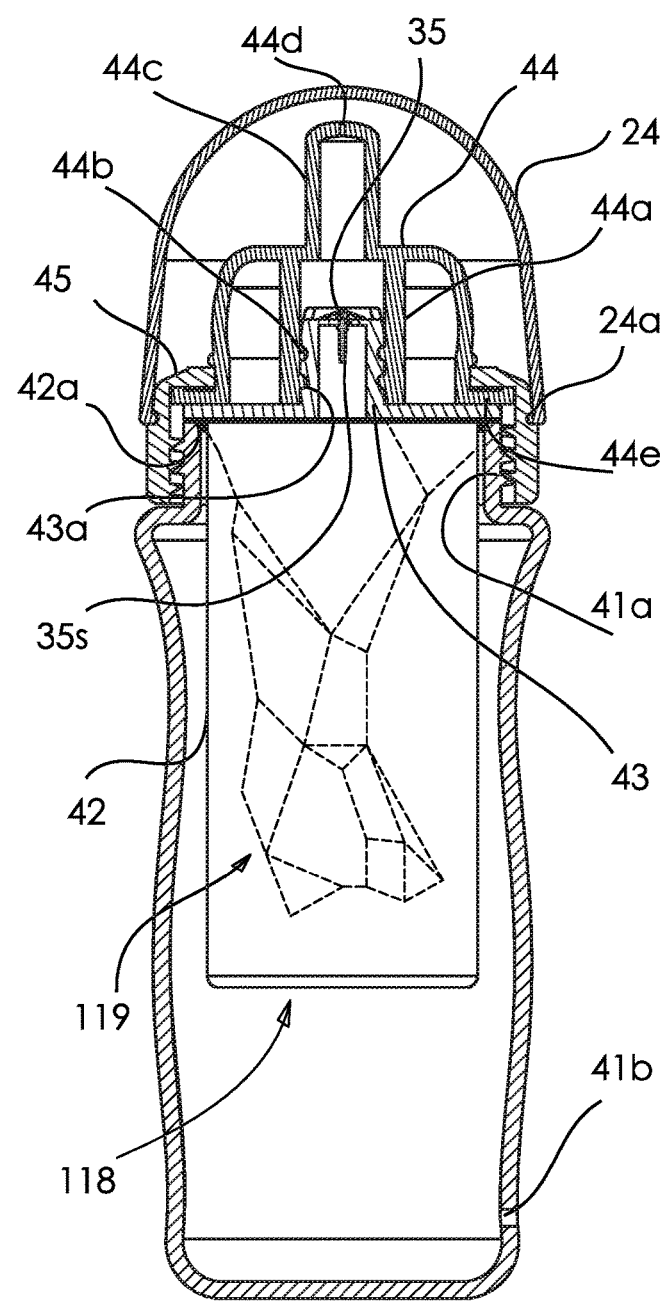
FIG. 58 illustrates cross-section side view of baby bottle assembly.
Figure 59:
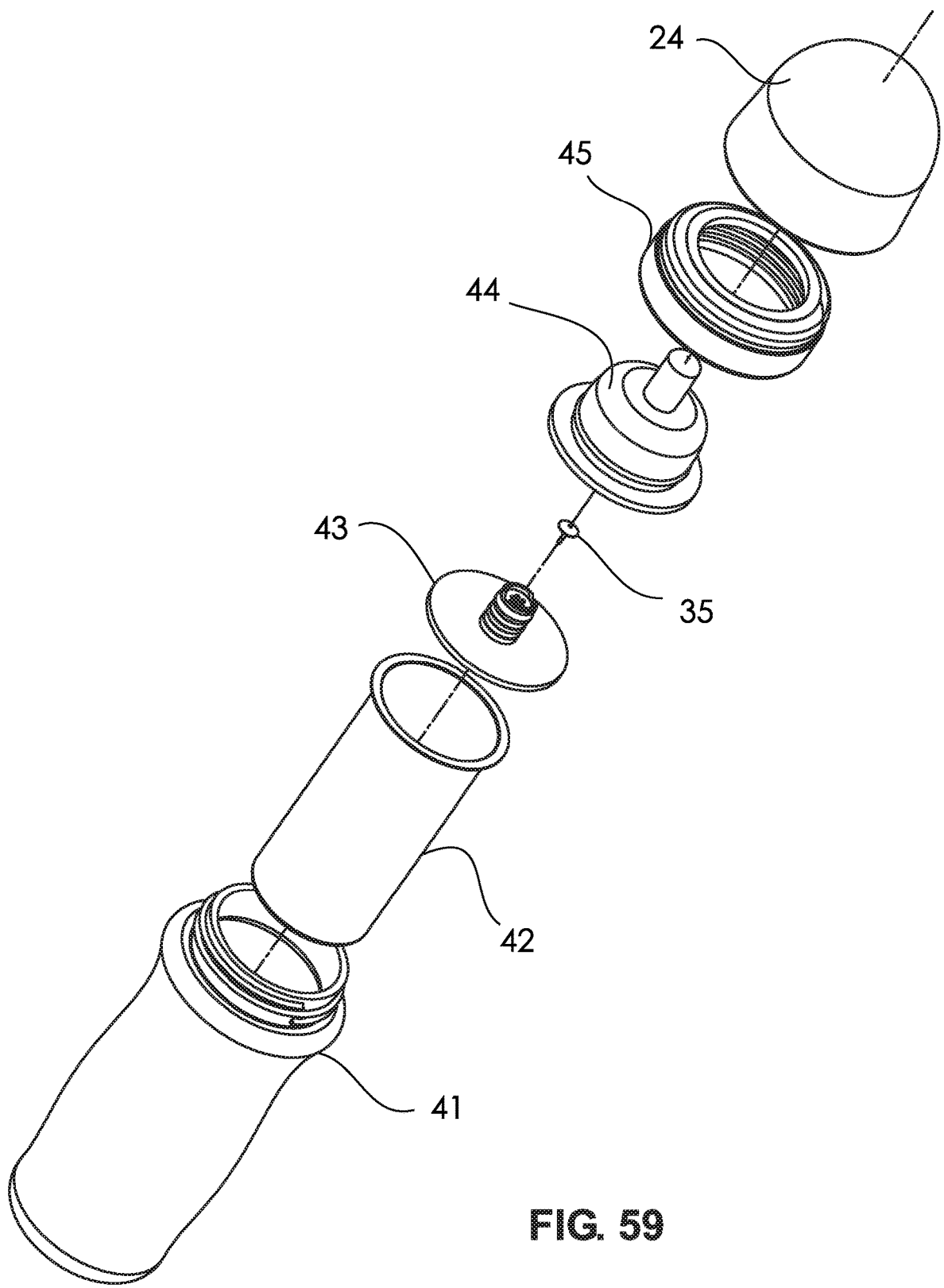
FIG. 59 illustrates exploded isometric view baby bottle assembly.

FIGS. 57-59 illustrate a refillable baby bottle. Flexible liner 42 is placed inside baby container 41. Flexible liner 42 has a flange portion that can rest on baby container 41. A valve chassis 42 having a shape of a disc and middle portion that protrudes from one side of the disc upwards is placed on top of flexible liner 42. Umbrella valve (elastic) 35 can be placed in the protruding part of valve chassis 43. Baby bottle nipple 44 is placed on top of valve chassis 43, and can be attached to the nipple valve chassis retainer ring 44b Baby bottle closure 45 can be placed around baby bottle nipple 44 and threadably attached to baby container 41.

FIG. 57 illustrates front view of refillable baby bottle assembly. Illustrated in this figure are nipple protective cap 24, baby bottle container 41, and baby bottle closure 45.

FIG. 58 cross-section side view of baby bottle assembly. Illustrated in this figure are nipple protective cap 24, nipple protective cap snap ring 24a, umbrella valve (elastic) 35, valve stem (elastic) 35s, flexible liner 42, flexible liner flange 42a, one way valve chassis 43, valve chassis nipple retainer ring 43a, baby bottle nipple 44, nipple valve chassis receptacle 44a, nipple valve chassis retainer ring 44b, nipple 44c, liquid outlet 44d, baby bottle nipple flange 44e, baby bottle closure 45, full capacity airless liner 118, and collapsed empty airless liner 119.

FIG. 59 illustrates exploded isometric view baby bottle assembly. Provided in this figure are nipple protective cap 24, umbrella valve (elastic) 35, baby bottle container 41, flexible liner 42, one way valve chassis 43, baby bottle nipple 44, and baby bottle closure 45.

Figure 60:
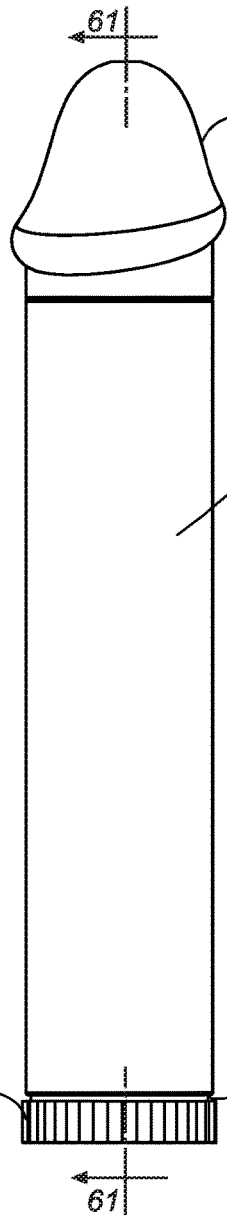
FIG. 60 illustrates a side view of container housing with chemically bonded silicone over-mold (1 mm to 3 mm outside surfaces only as shown).

FIG. 60 illustrates a side view of container housing with chemically bonded silicone over-mold. The silicon over-mold can be 1 mm to 3 mm thick and placed on the outside surface. Illustrated in this figure are shaft, silicone over-mold 29d, glans, silicone over-mold 30d, silicone seal gasket 46, and bottom cap 47d.

Figure 61:
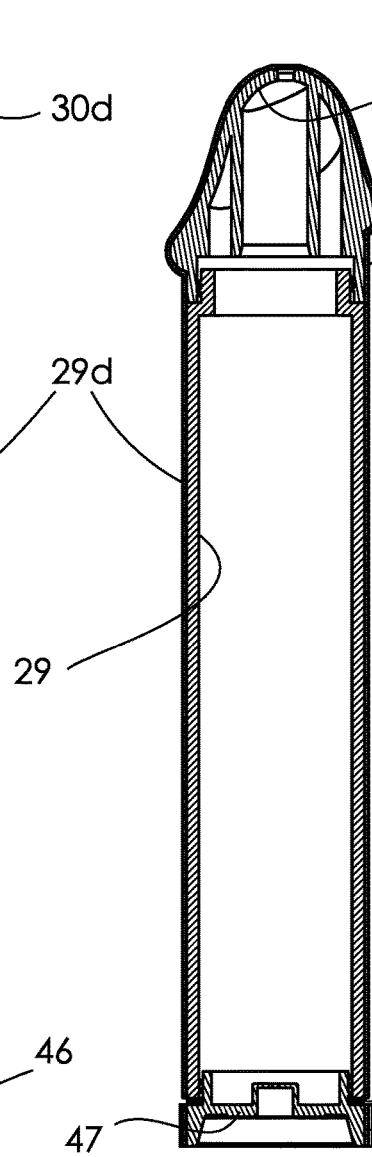
FIG. 61 cross section of FIG. 60.

FIG. 61 illustrates cross-section of FIG. 60. Illustrated in this figure are shaft, material example: UTLEM™ amorphous thermoplastic polyetherimide (pei) 29, shaft, silicone over-mold 29d, glans, material example: ULTEM (pei) 30, glans, silicone over-mold 30d, silicone seal gasket 46, bottom cap, material example: ULTEM (pei) 47, and bottom cap, silicone over-mold 47d.

Figure 62:
FIG. 62 isometric view of silicone over-molded glans.

FIG. 62 illustrates isometric view of silicone over-molded glans, silicone over-mold 30d.

Figure 63:
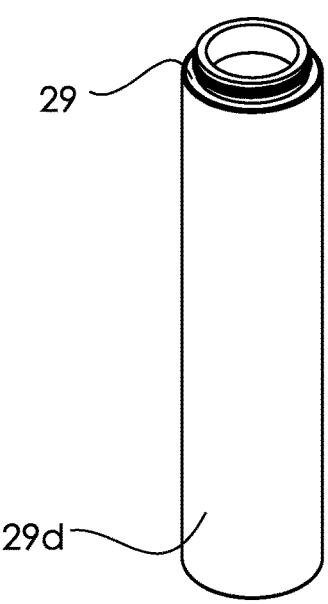
FIG. 63 isometric view of silicone over-molded shaft.

FIG. 63 illustrates an isometric view of silicone over-molded shaft. Illustrated in this figure are shaft, material example: ULTEM (pei) 29 and shaft, silicone over-mold 29d.

Figure 64:
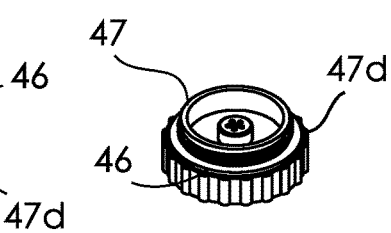
FIG. 64 isometric view of silicone over-molded bottom cap.

FIG. 64 illustrates an isometric view of silicone over-molded bottom cap/valve assembly. Illustrated in this figure are silicone seal gasket 46, bottom cap, material example: ULTEM (pei) 47, and bottom cap, silicone over-mold 47d.

Figures 65, 66, 67, 68, 69:
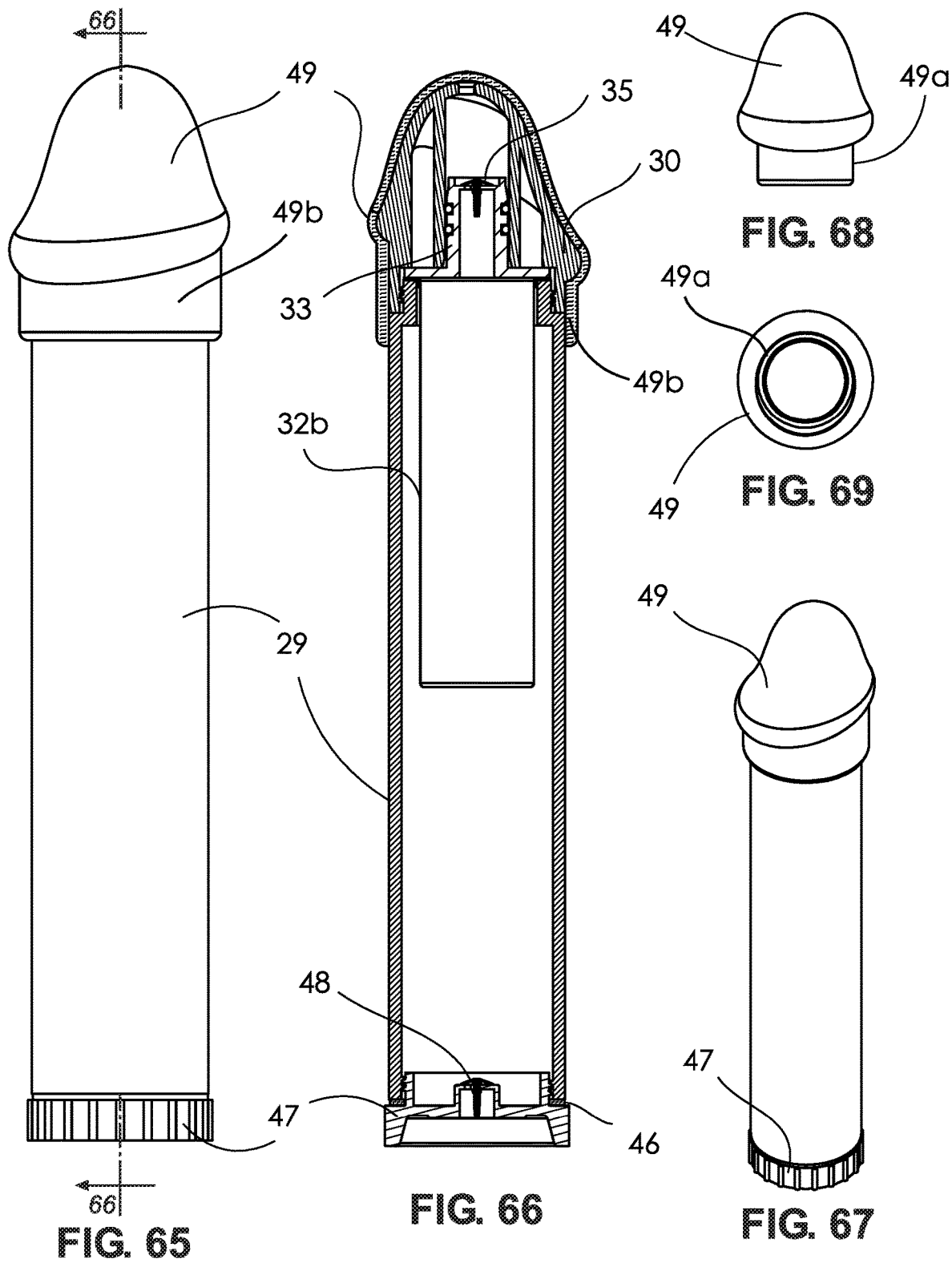
FIG. 65 adult toy front view, with mounted stretchable top protective cover.
FIG. 66 cross section of FIG. 65.
FIG. 67 side isometric view of adult toy with mounted protective cap.
FIG. 68 side view of stretchable protective cover.
FIG. 69 bottom view of stretchable protective cover.

FIG. 65 illustrates adult toy front view, with mounted stretchable top protective cover. Provided in this figure are shaft, material example: polyproplene (pp) 29, bottom cap, material example: ULTEM (pei) 47, stretchable protective cover material example: medical grade silicone 49, and protective cover stretched skirt for firm grip 49b.

FIG. 66 illustrates cross-section of FIG. 65. Illustrated in this figure are shaft, material example: polypropylene (pp) 29, glans, material example: ULTEM (pei) 30. thin flexible liner membrane (non-stretchable for example 0.08 mm thin film) 32b, valve assembly chassis 33, umbrella valve (elastic) 35, silicone seal gasket 46, bottom cap, material example: ULTEM (pei) 47, air intake umbrella valve 48, stretchable protective cover material example: medical grade silicone 49, and protective cover stretched skirt for firm grip 49b.

FIG. 67 illustrates a side isometric view of adult toy with mounted protective cap. Illustrated in this figure are bottom cap, material example: ULTEM (pei) 47 and stretchable protective cover material example: medical grade silicone 49.

FIG. 68 illustrates a side view of stretchable protective cover. Provided in this view are stretchable protective cover material example: medical grade silicone 49, and stretchable protective cover skirt relaxed under sized for firm mounting grip 49b.

FIG. 69 illustrates a bottom view of stretchable protective cover. Provided in this view are stretchable protective cover material example: medical grade silicone 49 and stretchable protective cover skirt relaxed under sized for firm mounting grip 49b.

Figure 70:
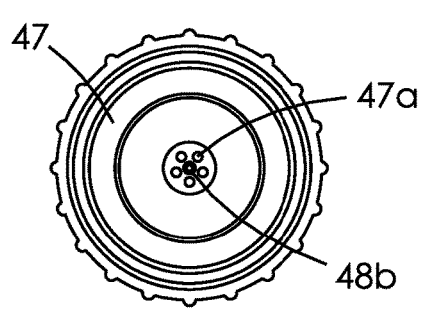
FIG. 70 bottom view of bottom cap/valve assembly.

FIG. 70 illustrates bottom view of bottom cap/valve assembly Illustrated in this figure are bottom cap, material example: ULTEM (pei) 47, air intake hole 47a, and air intake umbrella valve stem 48b.

Figure 71:
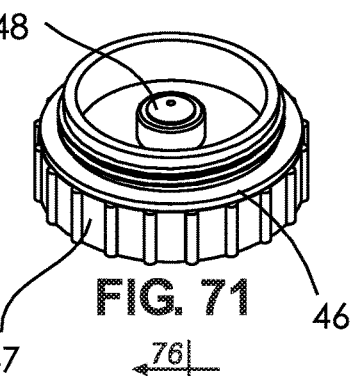
FIG. 71 top isometric view of bottom cap/valve assembly.

FIG. 71 illustrates a top isometric view of bottom cap/valve assembly.

Illustrated in this view are silicone seal gasket 46, bottom cap, material example: ULTEM (pei) 47, and air intake umbrella valve 48.

Figure 72:
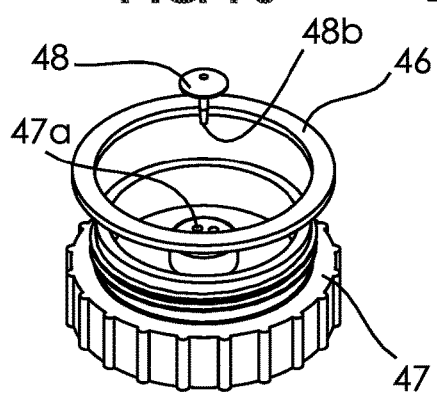
FIG. 72 exploded view of bottom cap/valve assembly.

FIG. 72 illustrates an exploded view of bottom cap/valve assembly. Illustrated in this view are silicone seal gasket 46, bottom cap, material example: ULTEM (pei) 47, air intake hole 47a, air intake umbrella valve 48, and air intake umbrella valve stem 48b.

Figure 73:
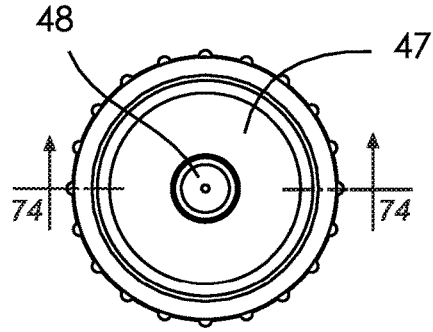
FIG. 73 top view of bottom cap/valve assembly.

FIG. 73 illustrates a top view of bottom cap/valve assembly. Illustrated in this view are bottom cap, material example: ULTEM (pei) 47 and air intake umbrella valve 48.

Figure 74:
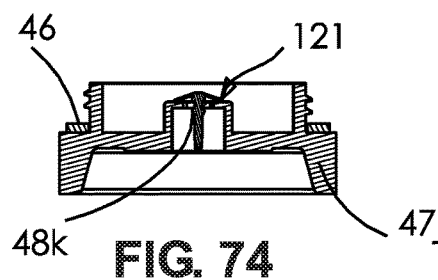
FIG. 74 cross section of FIG. 73.

FIG. 74 cross section of FIG. 73. Provided in this figure are silicone seal gasket 46, umbrella valve stem keeper 48k, and air intake umbrella valve seat normally closed 121.

Figure 75:
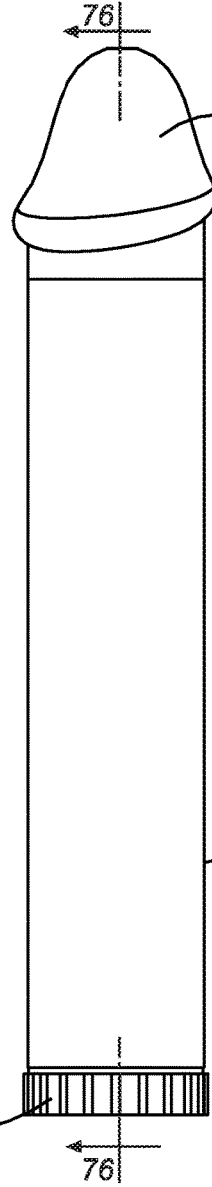
FIG. 75 side view of adult toy assembly.

FIG. 75 illustrates a side view of adult toy assembly. Provided in this figure are shaft, material example: polyproplene (pp) 29 and glans, material example: ULTEM (pei) 30.

Figure 76:
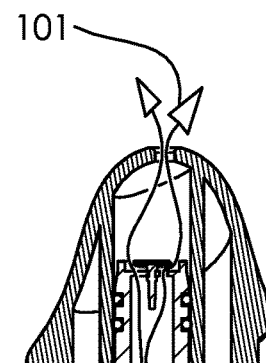
FIG. 76 cross section of FIG. 75.

FIG. 76 illustrates a cross section of FIG. 75. Provided in this figure are shaft, material example: polypropylene (pp) 29, glans, material example: ULTEM (pei) 30, silicone seal gasket 46, bottom cap, material example: ULTEM (pei) 47, liquid flow direction 101, full capacity airless liner 118, collapsed empty airless liner 119, air intake 120, and air intake umbrella valve seat opened by vacuum generated via user mouth suction of liquid 122.

FIGS. 77-88 illustrate embodiments where a spring valve can be used instead of an umbrella valve. A spring valve can be used on top for regulating flow of liquid and another spring valve can be used on the bottom for regulating flow of air to inside of the container. The springs can have the same or different k-constants. For example, the spring for the valve regulating flow of liquid can have a higher or lower k-constant. The two valves can otherwise be identical other than for the k-constant of the spring.

Figures 77, 78, 79:
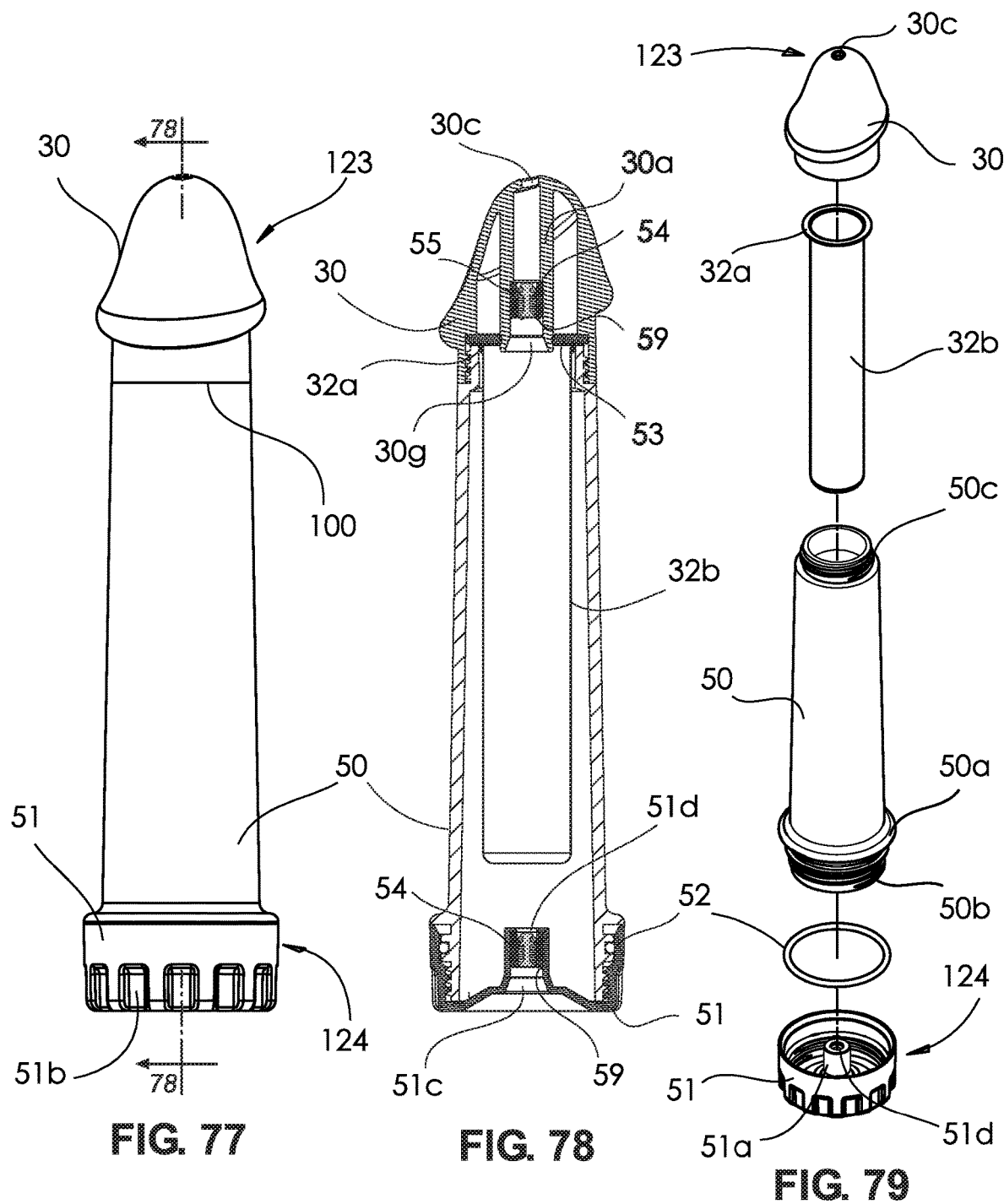
FIG. 77 illustrates a top view of container housing with external threaded shaft.
FIG. 78 illustrates a top side cross-section view of container housing with external threaded shaft.
FIG. 79 illustrates an isometric exploded view of container housing with external threaded shaft.

FIG. 77 illustrates a top view of container housing with external threaded shaft, illustrated in this view are glans, material example: ULTEM (pei) 30, externally threaded flanged shaft 50, bottom cap-spring valve housing 51, bottom cap grip knurl 51a, cap body split line 100, glans/spring valve sub-assembly 123, and bottom cap/spring valve sub-assembly 124.

FIG. 78 illustrates a top side cross-section view of container housing with external threaded shaft. illustrated in this view are glans, material example: ULTEM (pei) 30, cap valve assembly receptacle 30a, cap liquid outlet 30c, cap liquid outlet 30g, liner flange (as a sealant, compressed between valve assembly chassis 33 and shaft 29 via glans 30 cap closure) 32a, thin flexible liner membrane (non-stretchable for example 0.08 mm thin film) 32b, externally threaded flanges shaft 50, bottom cap-spring valve housing 51, air inlet 51c, air outlet 51d, bottom cap seal o-ring 52, liner closure seal silicone washer 53, check valve cartridge housing 54, spring valve seal o-ring (2 pcs) 55, and press in retainer washer 59.

FIG. 79 illustrates an isometric exploded view of container housing with external threaded shaft. illustrated in this figure are glans, material example: ULTEM (pei) 30, cap liquid outlet 30c, cap liquid outlet 30g, liner flange 32a, (as a sealant, compressed between valve assembly chassis 33 and shaft 29 via glans 30 cap closure), thin flexible liner membrane 32b (non-stretchable for example 0.08 mm thin film), externally threaded flanged shaft 50, flange 50a, external bottom cap thread 50b, external top cap thread 50c, bottom cap-spring valve housing 51, bottom cap spring valve receptacle 51a, air outlet 51d, bottom cap seal o-ring 52, glans/spring valve sub-assembly 123, bottom cap/spring valve sub-assembly 124.

FIG. 80 illustrated an exploded isometric view of glans spring valve assembly. Illustrated in this figure are glans, material example: ULTEM (pei) 30, liner closure seal silicone washer 53, check valve cartridge housing 54, spring valve seal o-ring (2 pcs) 55, press in retainer washer 59, glans/spring valve sub-assembly 123, pre-fabricated spring check valve cartridge 125, FIG. 81 illustrates a cross-sectioned side view of glans spring valve assembly. Illustrated in this figure are glans, material example: ULTEM (pei) 30, cap valve assembly receptacle 30a, liner closure seal silicone washer 53, check valve cartridge housing. spring valve housing 54, spring valve seal o-ring (2 pcs) 55, press in retainer washer 59, and glans/spring valve sub-assembly 123.

FIG. 82 illustrates an exploded isometric view of bottom cap spring valve assembly. FIG. 82 illustrates a bottom cap-spring valve housing 51, check valve cartridge housing 54, press in retainer washer 59, and bottom cap/spring valve sub-assembly 124.

FIG. 83 illustrates cross-sectioned side view of bottom cap spring valve assembly. Illustrated in this view are bottom cap-spring valve housing 51, bottom cap spring valve receptacle 51a, check valve cartridge housing 54, press in retainer washer 59, bottom cap/spring valve sub-assembly 124.

FIG. 84 illustrates an exploded isometric view of spring valve assembly (for example pre-fabricated cartridge valve part number 132 by Smart Products, Inc., Morgan Hill, Calif.). Illustrated in this figure are check valve cartridge housing 54, spring valve seal o-ring (2 pcs) 55, valve plunger 56, valve seat o-ring 57, valve compression spring 58, and valve assembly 125, FIG. 85 illustrates an isometric view of spring valve assembly in closed position. Illustrated in this figure are check valve cartridge housing 54, spring valve seal o-ring (2 pcs) 55, valve plunger 56, and valve assembly 125.

FIG. 86 illustrates a cross-section of spring valve in closed position. Illustrated in this figure are check valve cartridge housing 54, spring valve seal o-ring (2 pcs) 55, valve plunger 56, valve seat o-ring 57, and valve compression spring 58.

FIGS. 87 and 88 illustrate an isometric view of spring valve assembly in an open position. Illustrated in this figure is flow direction 60.

Figure 94:
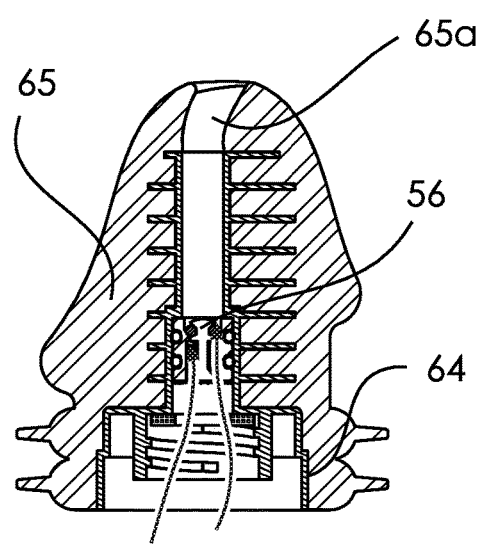
FIG. 94 illustrates glans over mold assembly cross section with normally closed valve.
Figure 95:
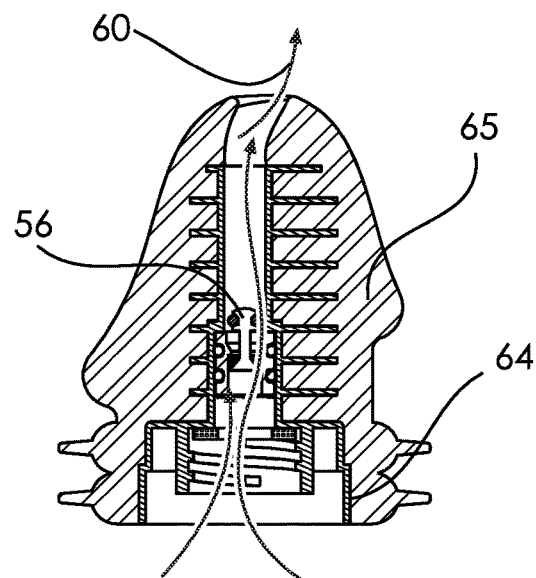
FIG. 95 illustrates the glans over mold assembly cross section with open valve via user suction.

FIGS. 89 to 103 illustrate a drink container with a piston system. Piston 63 moves up/down in a vertical fashion inside of container cylinder body 61. Container 61 can have a cap 62 at the bottom with an opening in the center. The opening allows for air to move into container cylinder 61 as piston 63 slides up container 61. Piston 63 separates air and liquid inside of container 61, and as a user sucks to drink the liquid, piston 63 moves up. The top of the cylindrical body has a threaded neck 61b configured to receive a glans closure 64. The glans can be an assembly of an outer soft material 65 and a hard inner material 64. The hard and the soft parts can be fused together. The glans has a suction hole that allows a user to suck. One way valve 125, which can be a spring valve 125, can be placed inside the glans closure 64. A member, such as retainer washer 59, can be placed under valve 125 to maintain the valve 125 in place. Container closure seal washer 67 is placed on top of cylindrical body 61. FIGS. 94 and 95 illustrate the one way valve that is actuated by sucking. The spring inside of the one way valve moves, allowing for movement of liquid. The plunger 56 of the valve moves with a sucking motion, allowing for passage of fluid. FIGS. 100 to 104 illustrate moving of piston 63, which separates liquid and air from each other.

Figure 89:
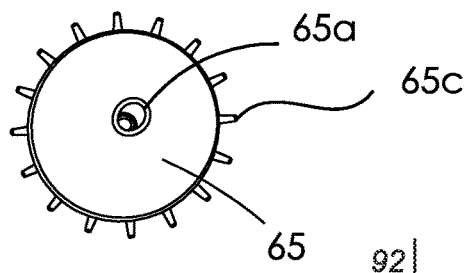
FIG. 89 illustrates atop view of airless cylinder-piston dildo container.

FIG. 89 illustrates a top view of airless cylinder-piston dildo container. Illustrated in this view are Glans over mold, material 65 (such as 40 Durometer FDA RTV Silicone), Glans suction hole 65a, and Glans rib Barb 65c.

Figure 90:
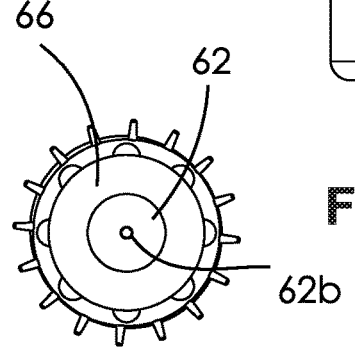
FIG. 90 illustrates a bottom view of airless cylinder-piston dildo container.

FIG. 90 illustrates a bottom view of airless cylinder-piston dildo container. Illustrated in this view are Container bottom snap cap, material example: FDA Polycarbonate 62. Air exchange vent 62b, Container over mold 66 (such as 40 Durometer FDA RTV Silicone).

Figure 91:
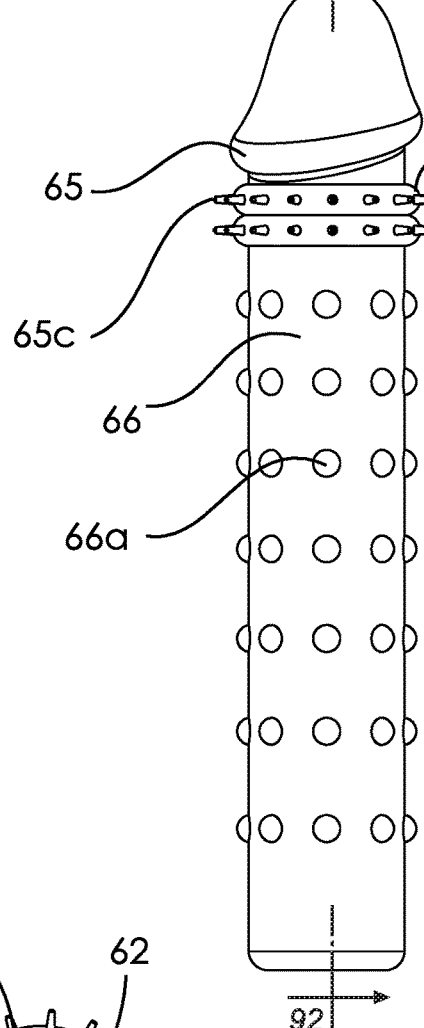
FIG. 91 illustrates front view of airless cylinder-piston dildo container.

FIG. 91 illustrates front view of airless cylinder-piston dildo container. Illustrated in this view are Glans over mold 65 (made from material such as 40 Durometer FDA RTV Silicone), Glans rib 65b, Glans rib Barb 65c, Container over mold, material example: 40 Durometer FDA RTV Silicone 66, and Container over mold bump 66a.

Figure 92:
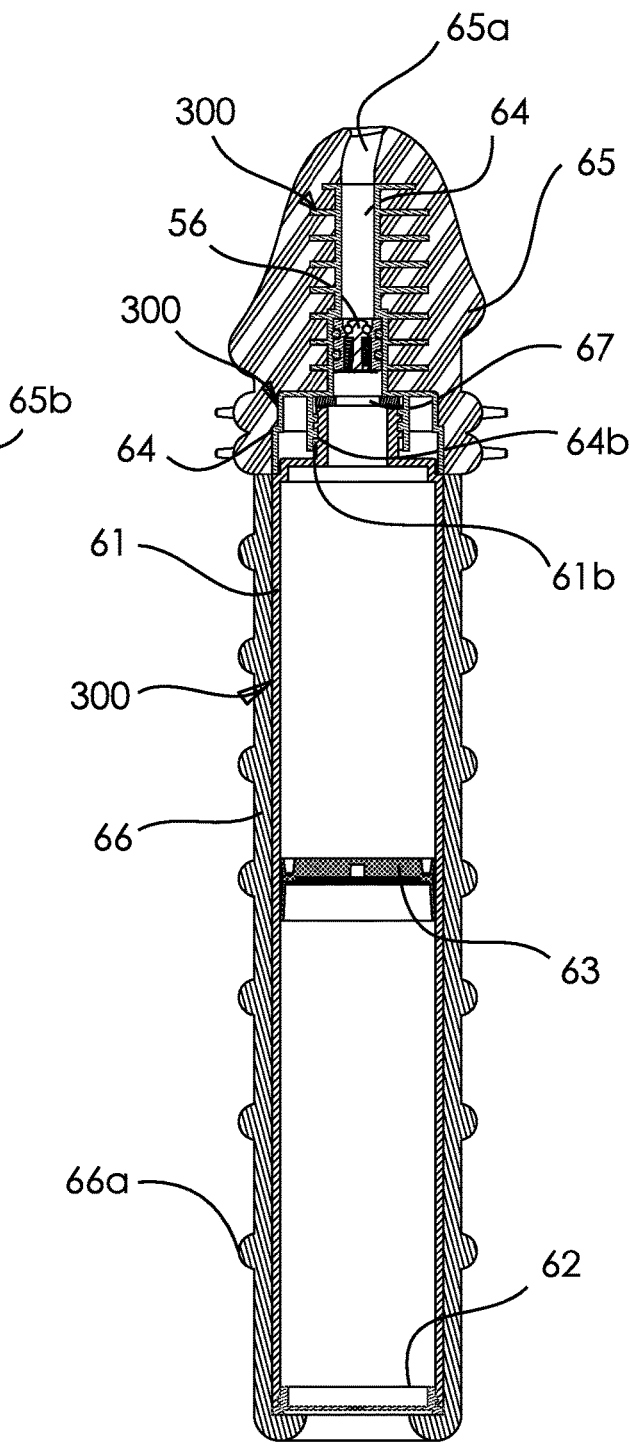
FIG. 92 cross-section view of FIG. 91.

FIG. 92 cross-section view of FIG. 91. Illustrated in this view are Valve plunger 56, Container cylinder, material example: FDA Polycarbonate 61, Container neck thread 61b, Container bottom snap cap, material example: FDA Polycarbonate 62, Container piston, material example: FDA Polypropylene 63, Glans closure, material example: FDA Polypropylene 64, Glans closure thread 64b, Glans over mold 65, Glans suction hole 65a, Container over mold 66, Container over mold bump 66a, container closure seal washer 67, and over mold chemical bond 300.

Figure 93:
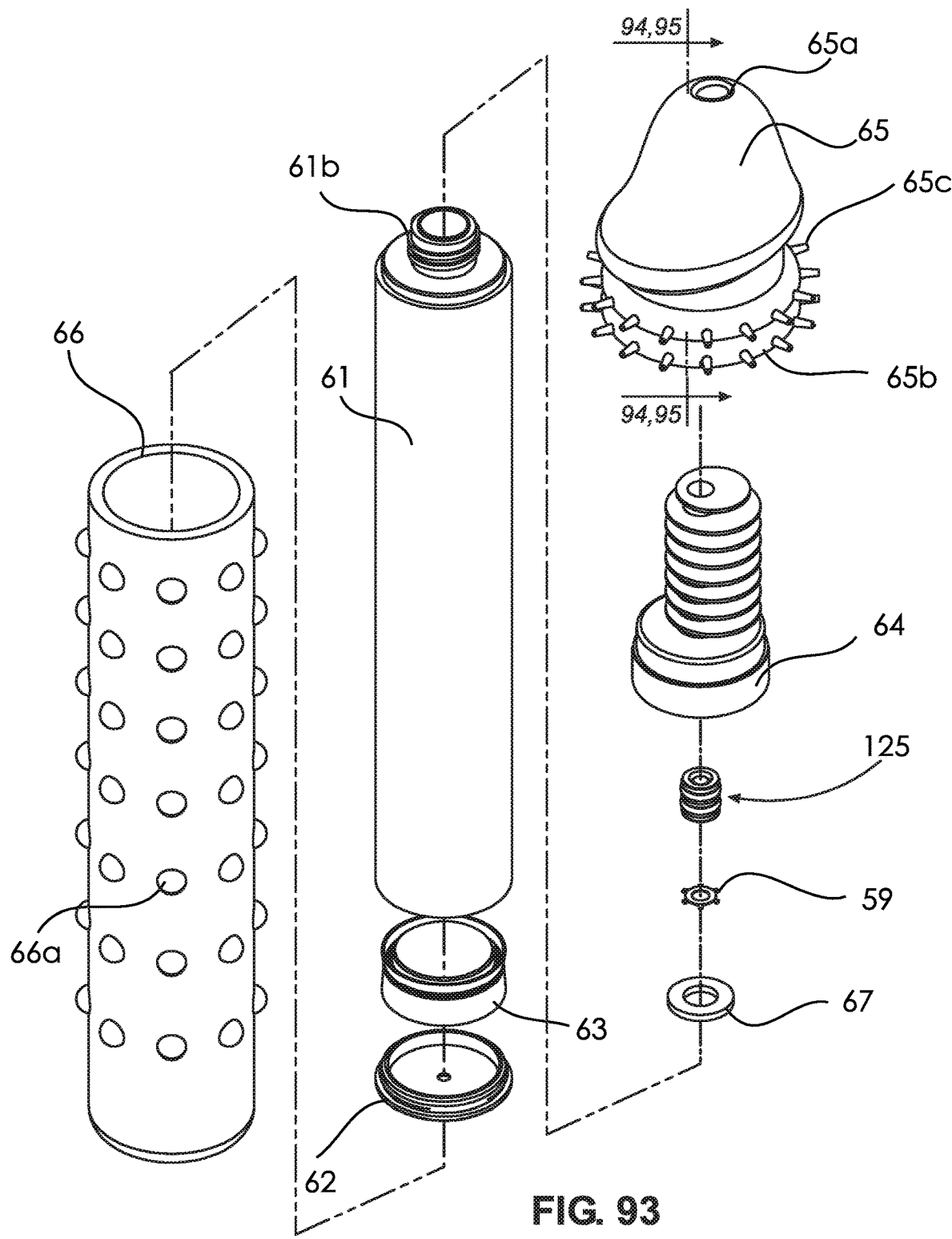
FIG. 93 exploded view of cylinder-piston airless dildo assembly components.

FIG. 93 exploded view of cylinder-piston airless dildo assembly components. Illustrated in this drawing are Press in retainer washer 59, Container cylinder 61, Container neck thread 61b, Container bottom snap cap 62, Container piston 63, Glans closure 64, Glans over mold 65, Glans suction hole 65a, Glans rib 65b, Glans rib Barb 65c, Container over mold 66, Container over mold bump 66a, and Pre-fabricated spring check valve cartridge 125.

FIG. 94 illustrates glans over mold assembly cross section with normally closed valve. Illustrates in this view are Valve plunger (normally closed position) 56, Glans closure 64, Glans over mold 65, and Glans suction hole 65a.

FIG. 95 illustrates the glans over mold assembly cross section with open valve via user suction. Illustrated in this view are Valve plunger (open position via user mouth suction) 56, Flow direction 60, Glans closure 64, and Glans over mold 65.

Figure 96:
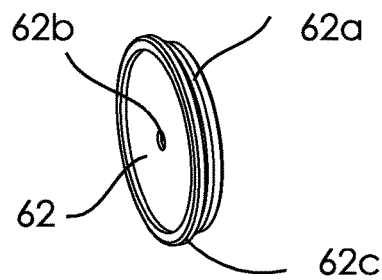
FIG. 96 illustrates the isometric view of container bottom snap.

FIG. 96 illustrates the isometric view of container bottom snap. Illustrated in this view are Container bottom snap cap 62, Snap ring 62a, Air exchange vent 62b, and Cap flange 62c.

Figure 97:
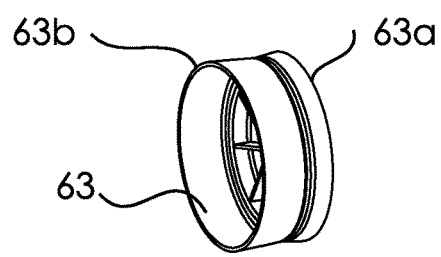
FIG. 97 illustrates the isometric view of container piston.

FIG. 97 illustrates the isometric view of container piston. Illustrated in this view are Container piston 63, Upper compression edge 63a, and Lower compression edge 63b.

Figure 98:
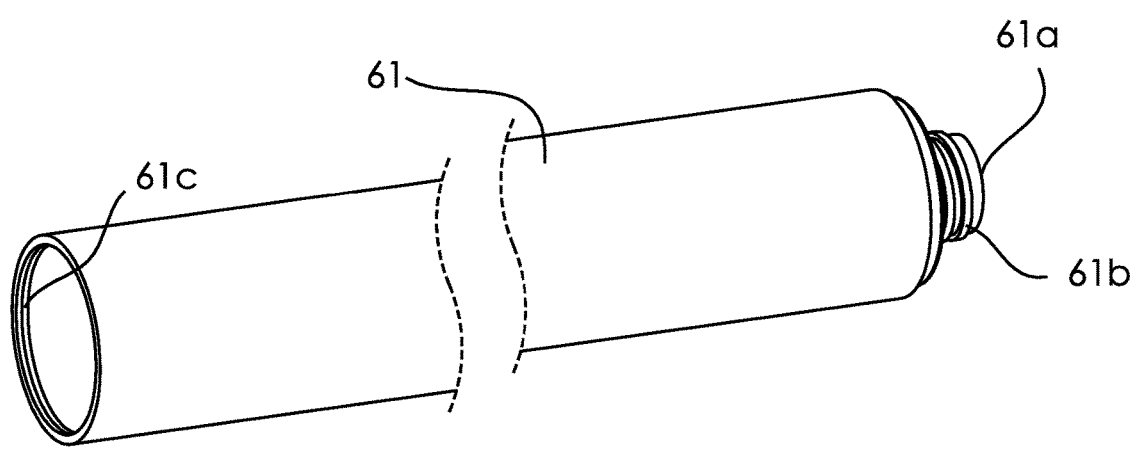
FIG. 98 illustrates the isometric view of container cylinder.

FIG. 98 illustrates the isometric view of container cylinder. Illustrated in this view are Container cylinder 61, Container neck 61a, Container neck thread 61b, and Bottom snap cap receptacle ring channel 61c.

Figure 99:
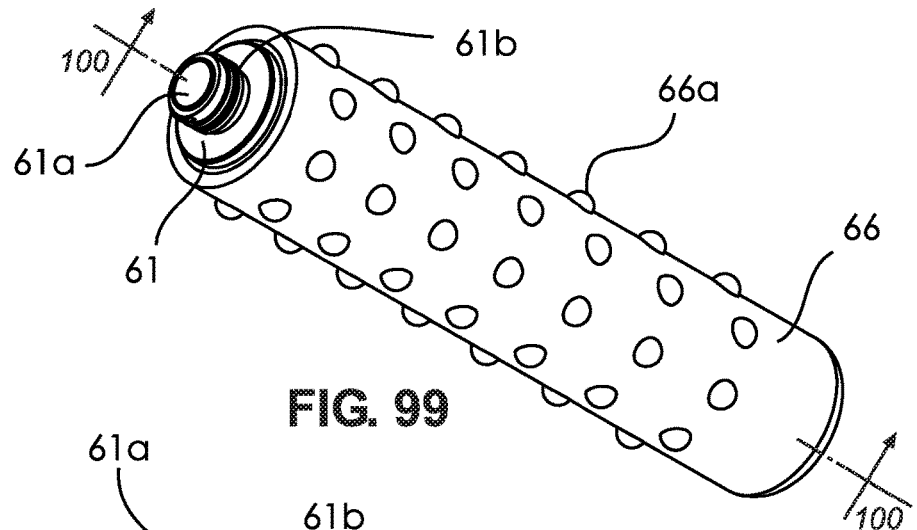
FIG. 99 illustrates the isometric view of over mold shaft container.

FIG. 99 illustrates the isometric view of over mold shaft container. Illustrated in this view are Container cylinder 61, Container neck 61a, Container neck thread 61b, Container over mold 66, and Container over mold bump 66a.

Figures 100, 101, 102, 103:
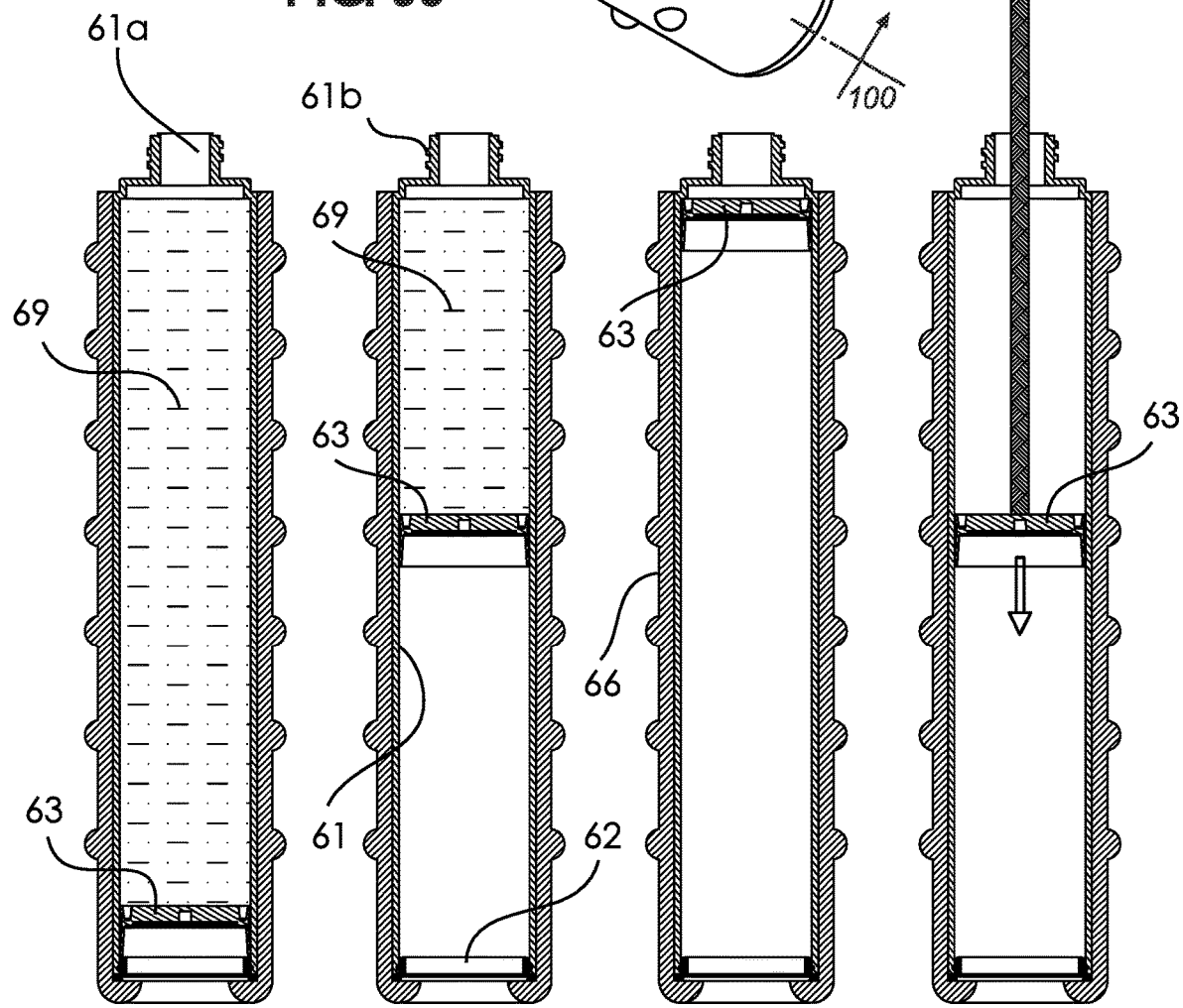
FIG. 100 illustrates a cross section view of over mold shaft container with max liquid volume.
FIG. 101 illustrates a cross section view of over mold shaft container with half liquid volume.
FIG. 102 illustrates a cross section view of over mold shaft container when empty.
FIG. 103 illustrates a cross section view of over mold shaft container refill prep.

FIG. 100 illustrates a cross section view of over mold shaft container with max liquid volume. Illustrated in this view are Container neck 61a, Container piston (at minimum height) 63, and Liquid content, volume example: 100 milliliters (100 ml) 69.

FIG. 101 illustrates a cross section view of over mold shaft container with half liquid volume. Illustrated in this view are Container cylinder 61, Container neck thread 61b, Container bottom snap cap 62, Container piston (medium height) 63, and Liquid content, volume example: 50 milliliters (50 ml) 69.

FIG. 102 illustrates a cross section view of over mold shaft container when empty. Illustrated in this view are Container piston (at maximum height) 63 and Container over mold 66.

FIG. 103 illustrates a cross section view of over mold shaft container refill prep. Illustrated in this view is Container piston 63 and Push down stick 70.

FIG. 104 illustrates an isometric view of double threads airless dildo container. Illustrated in this view are the Over molded glans protective cover 301, Over molded closure assembly 302, and Over molded container assembly 303.

FIG. 105 illustrates the exploded view of double threads airless dildo container. Illustrated in this view is the Over molded glans protective cover 301, Over molded closure assembly 302, and Over molded container assembly 303.

FIG. 106 illustrates the top view of double threads airless dildo container. Illustrated in this is the over molded glans, 71 material example: Self-Bonding Silopren LSR 47x9 LRS, (Liquid Rubber Silicone)

FIG. 107 illustrates a side view of double threads airless dildo container.

Illustrated in this view are the over molded glans, material example: Self-Bonding Silopren LSR 47x9 LRS, (Liquid Rubber Silicone) 71. Closure over mold, material example: Self-Bonding Silopren LSR 47x9 LRS, (Liquid Rubber Silicone) 76, Over mold knurl 76R, Container over mold (material example: Self-Bonding Silopren LSR 47x9 LRS, (Liquid Rubber Silicone) 77), and Container over mold bump 77a.

FIG. 108 illustrates a bottom view of double threads airless dildo container. Illustrated in this view are the Container bottom snap cap, material example: Eastman BPA-Free Tritan (clear) 62 and Air vent 62b.

FIG. 109 illustrates a cross-section view of FIG. 107. Illustrated in this drawing are Container bottom snap cap, material example: Eastman BPA-Free Tritan (clear) 62, Container piston, material example: FDA Polypropylene 63, Over molded glans, material example: Self-Bonding Silopren LSR 47x9 LRS, (Liquid Rubber Silicone) 71, Glans substrate, material example: Eastman BPA-Free Tritan (clear) 72, Nipple hole seal 72a, Nipple, material example: liquid silicone rubbers ELASTOSIL® LR 3040/45 (hardness of 45 Shore A) 73, one way valve housing 74, Closure substrate, material example: Eastman BPA-Free Tritan (clear 75. Closure over mold, material example: Self-Bonding Silopren LSR 47x9 LRS, (Liquid Rubber Silicone) 76, Container over mold, material example: Self-Bonding Silopren LSR 47x9 LRS, (Liquid Rubber Silicone) 77, Container over mold bump 77a, container substrate, material example: Eastman BPA-Free Tritan (clear) 78, Pre-fabricated spring check valve cartridge 125, Self-bonding area between Silopren LSR 47x9 LSR and Tritan MX711 copolyester Substrates 304.

Figure 110:
FIG. 110 illustrates a piston side view.

FIG. 110 illustrates a piston side view. Illustrates in this view is the container piston 63.

Figure 111:
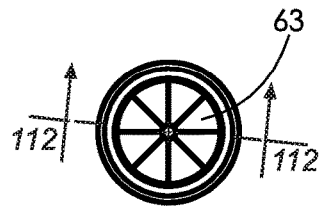
FIG. 111 illustrates a piston bottom view of Container piston.

FIG. 111 illustrates a piston bottom view of Container piston 63.

Figure 112:
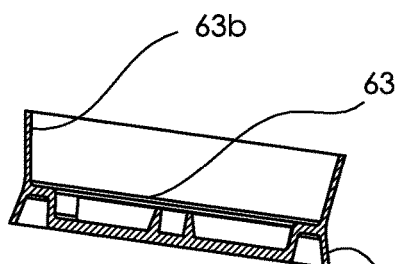
FIG. 112 illustrates a cross section of FIG. 111.

FIG. 112 illustrates a cross section of FIG. 111. Illustrated in this drawing are the container piston 63, Container piston top compression lip 63a, and Container piston bottom guide compression lip 63b.

Figure 113:
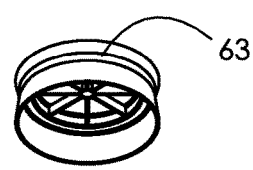
FIG. 113 illustrates the isometric bottom view of piston.

FIG. 113 illustrates the isometric bottom view of piston. Illustrated in this view is the Container piston 63.

Figure 114:
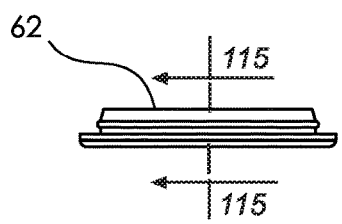
FIG. 114 illustrates a side view of bottom snap cap.

FIG. 114 illustrates a side view of bottom snap cap. Illustrated in this view are Container bottom snap cap 62 and Container piston 63.

Figure 115:
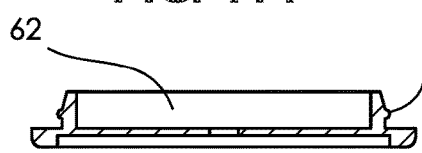
FIG. 115 illustrates a cross section of FIG. 114.

FIG. 115 illustrates a cross section of FIG. 114. Illustrated in this view are Container bottom snap cap 62 and Air vent 62b.

Figure 116:
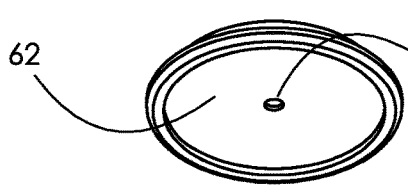
FIG. 116 illustrates the isometric bottom view of bottom snap CAP.

FIG. 116 illustrates the isometric bottom view of bottom snap CAP. Illustrated in this view is Container bottom snap cap 62 and Air vent 62b.

Figure 117:
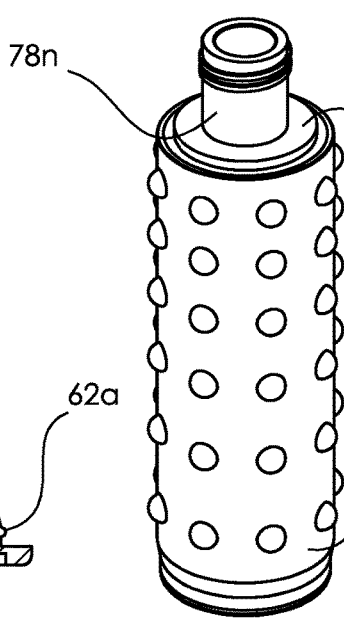
FIG. 117 isometric side view of container sub-assembly.

FIG. 117 isometric side view of container sub-assembly. Illustrated in this drawing are container over mold 77, container substrate 78, and container neck 78n.

Figure 118:
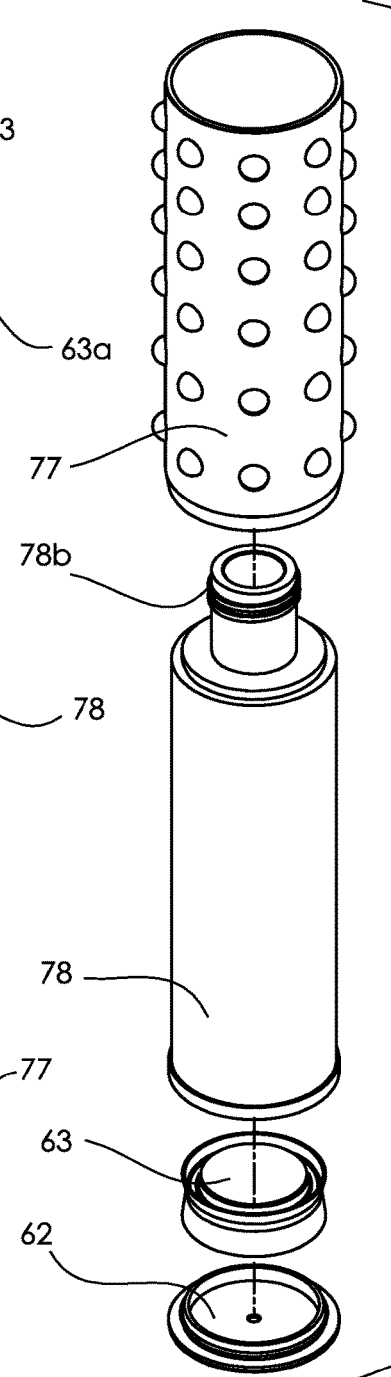
FIG. 118 illustrates an exploded view of container sub-assembly.

FIG. 118 illustrates an exploded view of container sub-assembly. Illustrated in this view are Container bottom snap cap 62, Container piston 63, Container over mold 77, container substrate 78 and container neck thread 78b.

FIGS. 119 to 129 illustrate a container with nipple 73. The nipple 73 with threaded is cylindrical shaped and can house a one way valve housing 306. Nipple 73 can be hard or soft. Inside the valve housing 306 is placed spring valve 125 and retainer washer 59 to form a valve/nipple assembly. The threaded portion 73b is attached to complementary threads present inside of closure cap 75. The top of nipple 73 extends out of closure cap 75 and is accessible from outside of the container. Closure cap 75 also acts as an adapter and can be thread ably attached to glans 301, which can be made from soft part 71 and hard part 72.

FIG. 119 illustrates an isometric side view of container closure sub-assembly. Illustrated in this view are Nipple 73 and Closure substrate 75, Closure cap receptacle thread 75c, and Closure over mold 76

FIG. 120 illustrates a side view of container closure sub-assembly. Illustrated in this view are Nipple 73, Closure cap receptacle thread 75c, and Closure over mold 76.

FIG. 121 illustrates a cross section of FIG. 120. Illustrated in this drawing are Nipple 73, Nipple hole 73a, Nipple retaining flange 73b, Valve cradle 74, Valve cradle seal flange 74b, and Closure cap receptacle thread 75c, Closure container receptacle thread 75d, Closure over mold 76, Self-bonding area between Silopren LSR 47x9 LSR and Tritan MX711 copolyester Substrates 304.

FIG. 122 illustrates an isometric bottom view of container closure sub-assembly. Illustrated in this view are Nipple 73, Closure container receptacle thread 75d, and Closure over mold 76.

FIG. 123 illustrates an exploded view of cradle valve sub-assembly Illustrated in this view are Press in retainer washer 59, Valve cradle 74, Valve cradle hole 74a, Valve cradle seal flange 74b.

FIG. 124 illustrates an exploded view of closure sub-assembly. Illustrated in this view are Nipple 73, Nipple hole 73a, Nipple retaining flange 73b, Closure substrate 75, Closure cap receptacle thread 75c, and Closure over mold 76.

Figure 125:
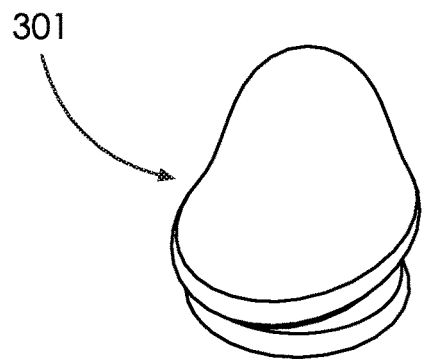
FIG. 125 illustrates an isometric top view of glans protective cover.

FIG. 125 illustrates an isometric top view of glans protective cover. Illustrated in this view are the Over molded glans protective cover 301.

Figure 126:
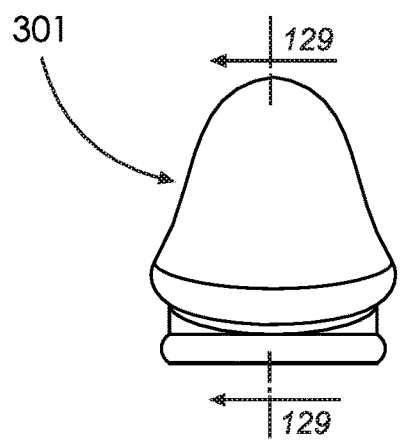
FIG. 126 illustrates a side view of glans protective cover.

FIG. 126 illustrates a side view of glans protective cover. Illustrates in this view is the over molded glans protective cover 301.

Figure 127:
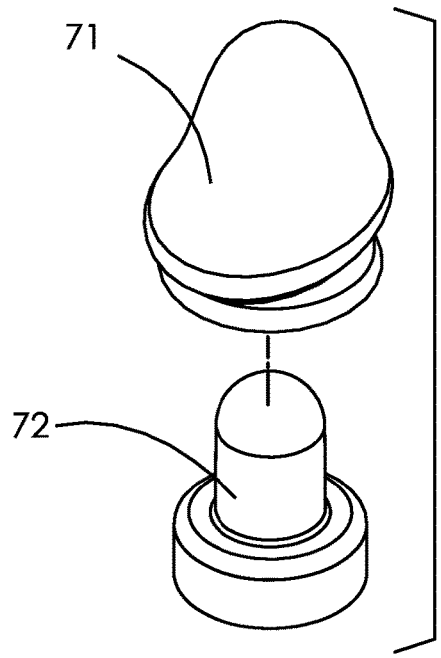
FIG. 127 illustrates an exploded view of glans protective cover.

FIG. 127 illustrates an exploded view of glans protective cover. Illustrated in this view are the over molded glans 71 and Glans substrate 72.

Figure 128:
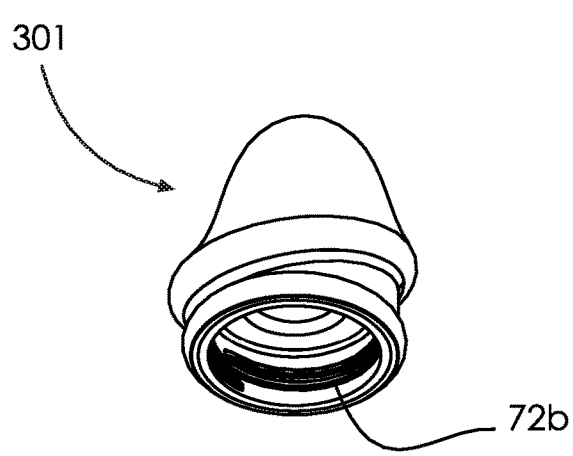
FIG. 128 illustrates an isometric bottom view of glans protective cover.

FIG. 128 illustrates an isometric bottom view of glans protective cover. Illustrated in this view is the Closure receptacle thread 72b, and Over molded glans protective cover 301.

Figure 129:
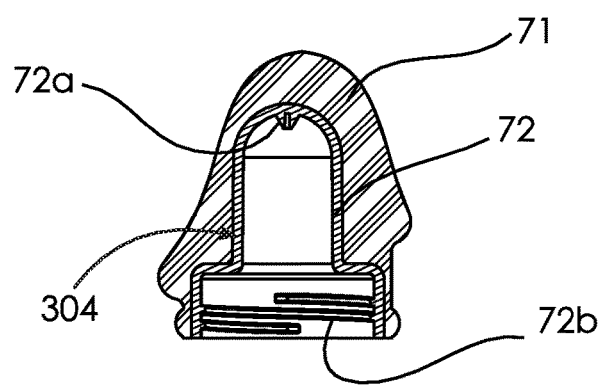
FIG. 129 illustrates a cross section of FIG. 126.

FIG. 129 illustrates a cross section of FIG. 126. Illustrated in this drawing are Over molded glans 71, Glans substrate 72, Nipple hole seal 72a, Closure receptacle thread 72b, Self-bonding area between Silopren 304, LSR 47x9 LSR and Tritan MX711 copolyester Substrates.

Figures 130, 131:
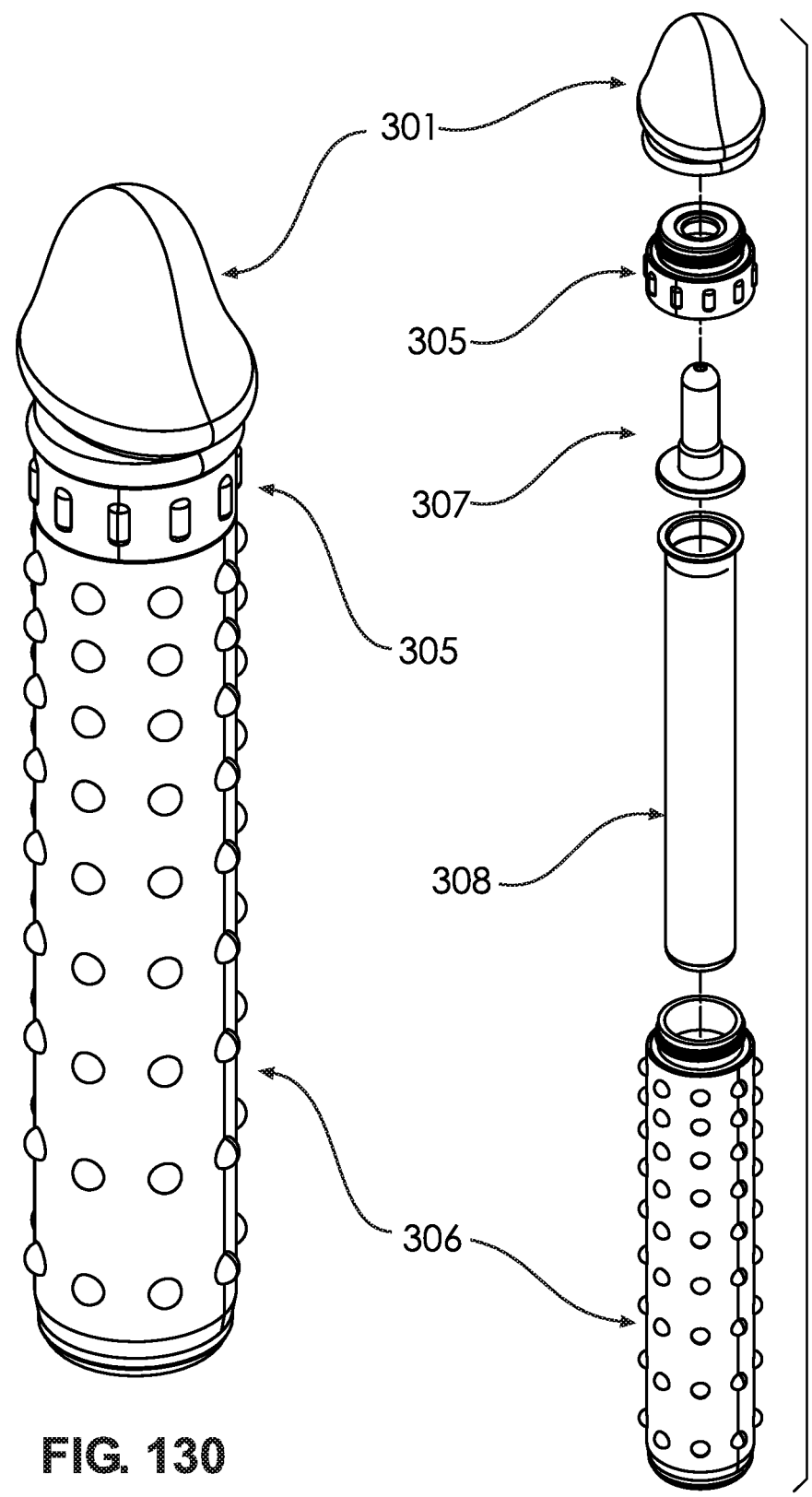
FIG. 130 illustrates an isometric view of double threads with liner dildo container.
FIG. 131 illustrates an exploded view of view of double threads with liner dildo container.

FIG. 130 illustrated an isometric view of double threads with liner dildo container. Illustrated in this drawing are over molded glans protective cover 301, ring shaped cap 305 and over molded container assembly 306.

FIG. 131 illustrates an exploded view of view of double threads with liner dildo container. Illustrated in this figure are over molded glans protective cover 301, ring shaped cap 305, over molded container assembly 306, nipple 307, and flanged pre-sterilized collapsible liner 308.

FIG. 132 illustrates a side view of double threads with liner dildo container. Illustrated in this view are over molded glans protective cover 301, ring shaped cap 305, and over molded container assembly 306.

FIG. 133 illustrates a top view of view of double threads with liner dildo container. Illustrated in this view are over molded glans 71 which can be made from a material, such as Self-Bonding Silopren LSR 47x9 LRS, (Liquid Rubber Silicone).

FIG. 134 illustrates a bottom view of view of double threads with liner dildo container. Illustrated in this view are container bottle bottom 83 (made from material such as Eastman BPA-Free Tritan (clear)), and container bottle air vent 83c.

FIG. 135 illustrates a cross-section view of FIG. 132. Illustrated in this view are liner flange 32a (made from a material such as Polyethylene terephthalate (PET)), Liner flexible film 32b (made from material such as FDA low-density polyethylene (LDPE)), Check valve cartridge housing 54, Over molded glans 71 (made from a material such as Self-Bonding Silopren LSR 47x9 LRS, (Liquid Rubber Silicone), Glans substrate 72, material example: Eastman BPA-Free Tritan (clear), Nipple hole seal 72a, Closure over mold 76, material example: Self-Bonding Silopren LSR 47x9 LRS, (Liquid Rubber Silicone), Container over mold, material example: Self-Bonding Silopren LSR 47x9 LRS, (Liquid Rubber Silicone) 77, Nipple with valve cavity 80, material example: liquid silicone rubbers ELASTOSIL® LR 3040/45 (hardness of 45 Shore A), Closure substrate 82, material example: Eastman BPA-Free Tritan (clear), Container bottle 83, material example: Eastman BPA-Free Tritan (clear).

FIG. 136 illustrates a piston side view of flanged pre-sterilized collapsible liner 308.

FIG. 137 illustrates a piston bottom view. Illustrated in the figure liner flange 32a, (a material such as Polyethylene terephthalate (PET)) and liner flexible film 32b, material example: FDA low-density polyethylene (LDPE).

FIG. 138 illustrates a partial section of FIG. 137 cross section. Illustrated in this figure are liner flange 32a, (made from a material such as Polyethylene terephthalate (PET)), Liner flexible film 32b, made from a material such as FDA low-density polyethylene (LDPE).

FIG. 139 illustrates a side view of overmolded container. Illustrated is the over molded container assembly 306.

FIG. 140 illustrates a cross section of FIG. 139. Illustrated in this view are Container bottom snap cap 62 and air vent 62b.

FIG. 141 illustrates an isometric exploded view of nipple valve assembly 54. Illustrated in this view are check valve cartridge housing 54, nipple with valve cavity 80, material example: liquid silicone rubbers ELASTOSIL® LR 3040/45 (hardness of 45 Shore A), Spacer SS flat washer (shim) 84, and Pre-fabricated spring check valve cartridge 125.

FIG. 142 illustrates a side view of the nipple sub-assembly

FIG. 143 illustrates a cross section of view of FIG. 142. Illustrated in this view are check valve cartridge housing 54, nipple with valve cavity 80, material example: liquid silicone rubbers ELASTOSIL® LR 3040/45 (hardness of 45 Shore A), Spacer SS flat washer (shim) 84, and container substrate 78.

Figure 144:
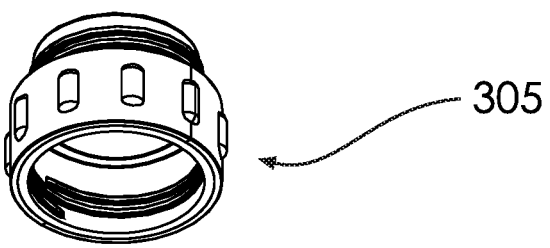
FIG. 144 illustrates an isometric bottom view of the ring shaped cap.

FIG. 144 illustrates an isometric bottom view of over molded closure. Illustrated in this figure is the ring shaped cap 305.

Figure 145:
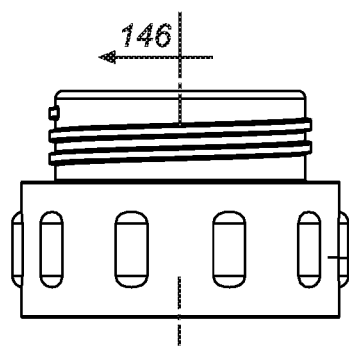
FIG. 145 illustrates a side view of overmolded closure.

FIG. 145 illustrates a side view of overmolded closure. Illustrated in this figure is the Closure over mold 76, material example: Self-Bonding Silopren LSR 47x9 LRS, (Liquid Rubber Silicone).

Figure 146:
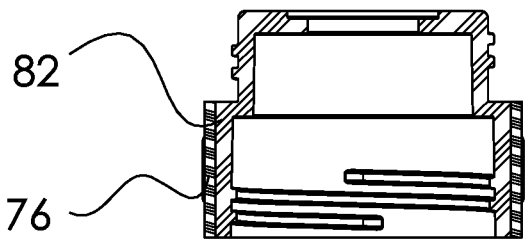
FIG. 146 illustrates a cross section of FIG. 145.

FIG. 146 illustrates a cross section of FIG. 145. Illustrated in this view is the Closure over mold 76, material example: Self-Bonding Silopren LSR 47x9 LRS, (Liquid Rubber Silicone, a Closure substrate 82, material example: Eastman BPA-Free Tritan (clear).

Figure 147:
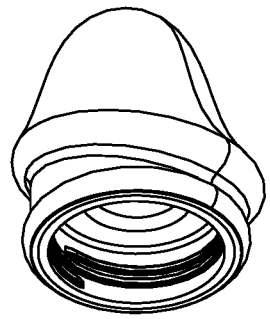
FIG. 147 illustrates an isometric bottom view of over molded glans protective cover.

FIG. 147 illustrates an isometric bottom view of over molded glans protective cover 301.

Figure 148:
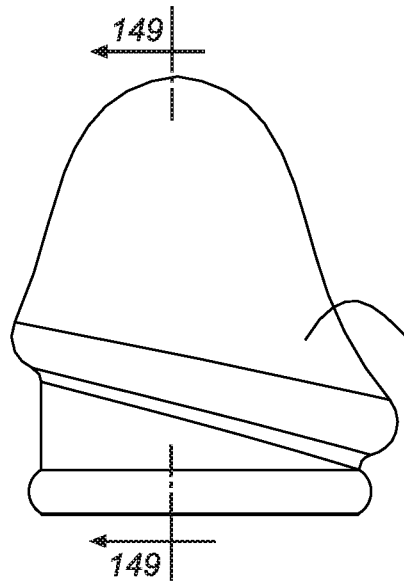
FIG. 148 illustrates a side view of over molded glans protective cover 71.

FIG. 148 illustrates a side view of over molded glans protective cover 71, which can be made from Self-Bonding Silopren LSR 47x9 LRS, (Liquid Rubber Silicone).

Figure 149:
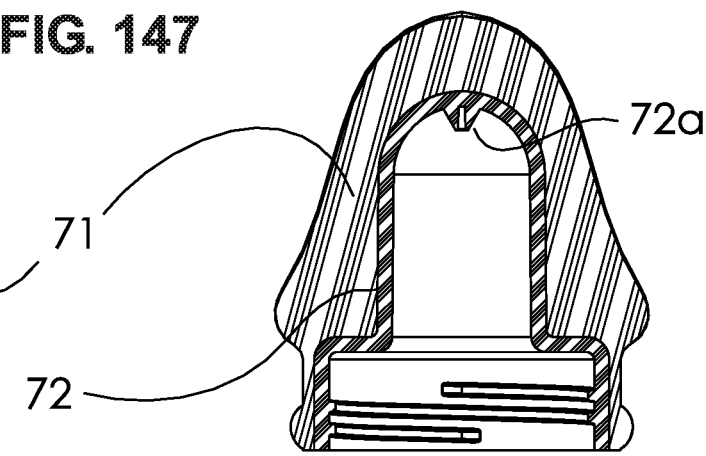
FIG. 149 illustrates a cross section of FIG. 148.

FIG. 149 illustrates a cross section of FIG. 148. Illustrated are Over molded glans 71, material example: Self-Bonding Silopren LSR 47x9 LRS, (Liquid Rubber Silicone), Glans substrate, material example: Eastman BPA-Free Tritan (clear), 72, and Nipple hole seal 72a.

Figure 150:
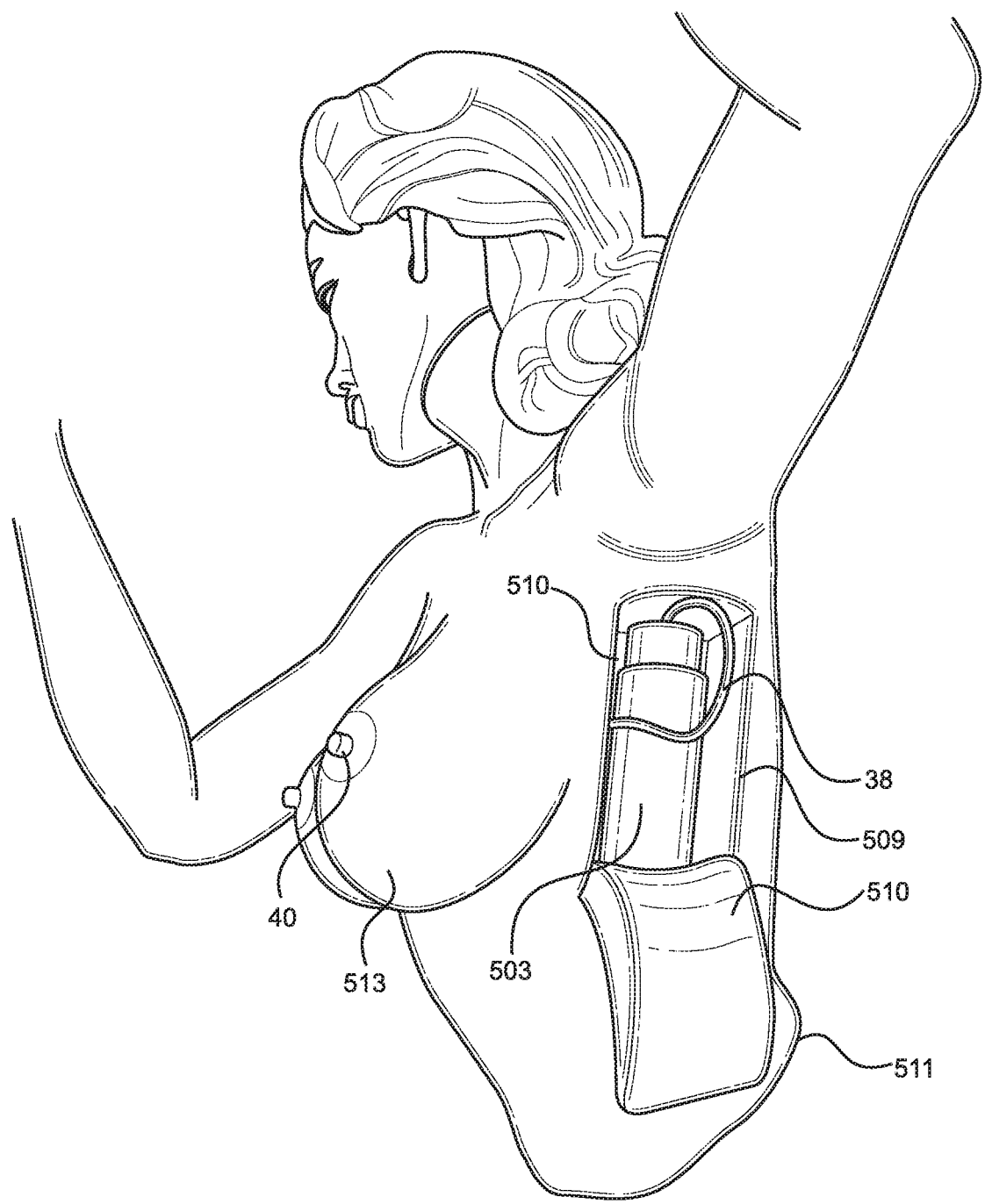
FIG. 150 illustrates a human mannequin torso with a container placed in an upright position under the arms in the torso and on the side of the torso.

FIG. 150 illustrates a mannequin 511 where a bottle 503, is placed under the arm of the mannequin 511 in cavity 509, formed by cutting out a portion 510, in the side torso 511 below/around the arm pits. The bottle 503 is placed upward. An outer portion 510, of the mannequin 511 can form a cover 510 for closing the cavity 509. Tubing 38 from the bottle 503, can travel to the breast 513, and can come out of the nipple 40 or other portions of the breasts 513. Tubing 38 can be attached to the nipple mount 40 which can be attached to the mannequin 511. One or both sides of the mannequin 511 can have a bottle 503. Two bottles can be connected separately to each nipple mount. The container for the mannequin 511 can use a liner system, such as that illustrated in FIG. 154.

Figure 151:
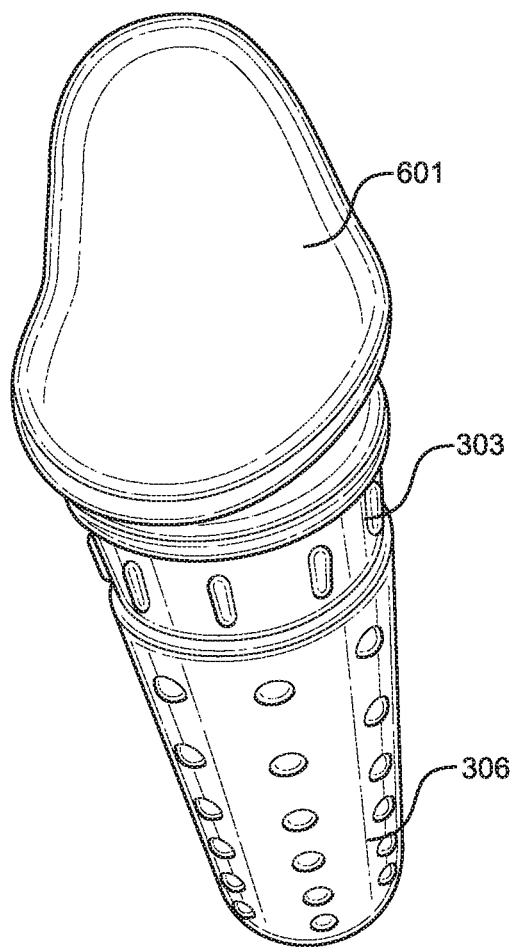

FIG. 151 illustrates the container 306, with the snap on cap 601 in the shape of glans 601. The cap 601 lacks a hole on top and stops mixture between the bodily fluids and fluids in the container when the container is used as a sex toy (dildo). The container has two configurations, as a dildo as illustrated in this figure, and as a drink container with the cap 601 removed. A ring-shaped cap 305 can be attached to the container 306, and the cap 601 snaps on the container 306.

Figure 152:
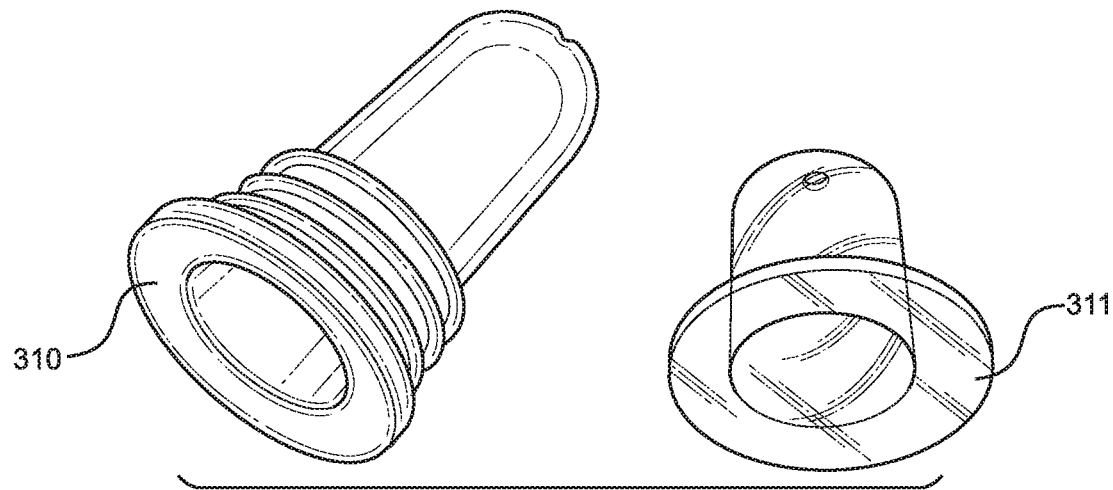
FIG. 152 illustrates a nipples made from rubber (soft material) and a valve housing (shown on the right side) that is placed inside the nipple.

FIG. 152 illustrates a nipple 310, and a valve housing 311 that is configured to be placed inside of the nipple 310. The nipple 310 can be made from a soft material such as rubber. The valve housing can be a rigid material. The nipple 310 and the valve housing 311 can both have a disc shaped base (flange) and a cylindrical protruding portion that ends with an opening at the top. The valve housing 311 fits inside nipple 310 in a concentric manner and the openings line-up. The valve housing 311 is made from a rigid plastic. The nipple 310, made from a rubber does not hold its shape under such circumstance.

Figure 153:
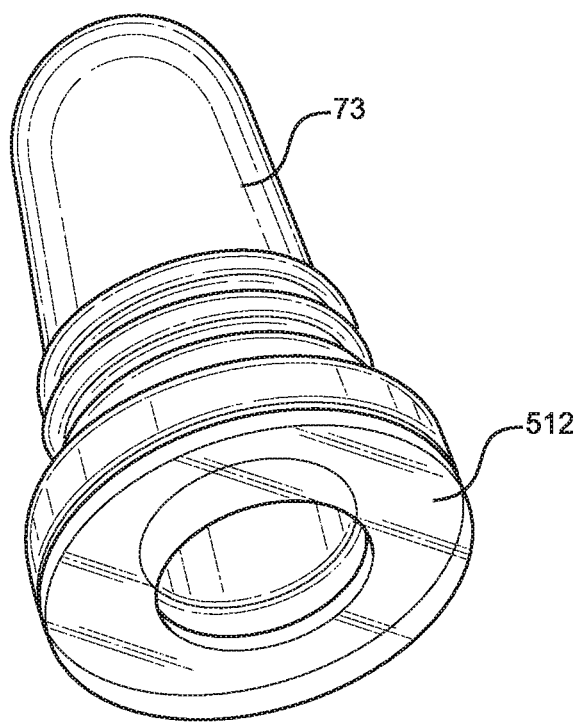
FIG. 153 illustrates the nipples with the valve housing placed therein in a concentric fashion.

FIG. 153 illustrates the valve housing 311 placed inside of the nipple 310.

Figure 154:
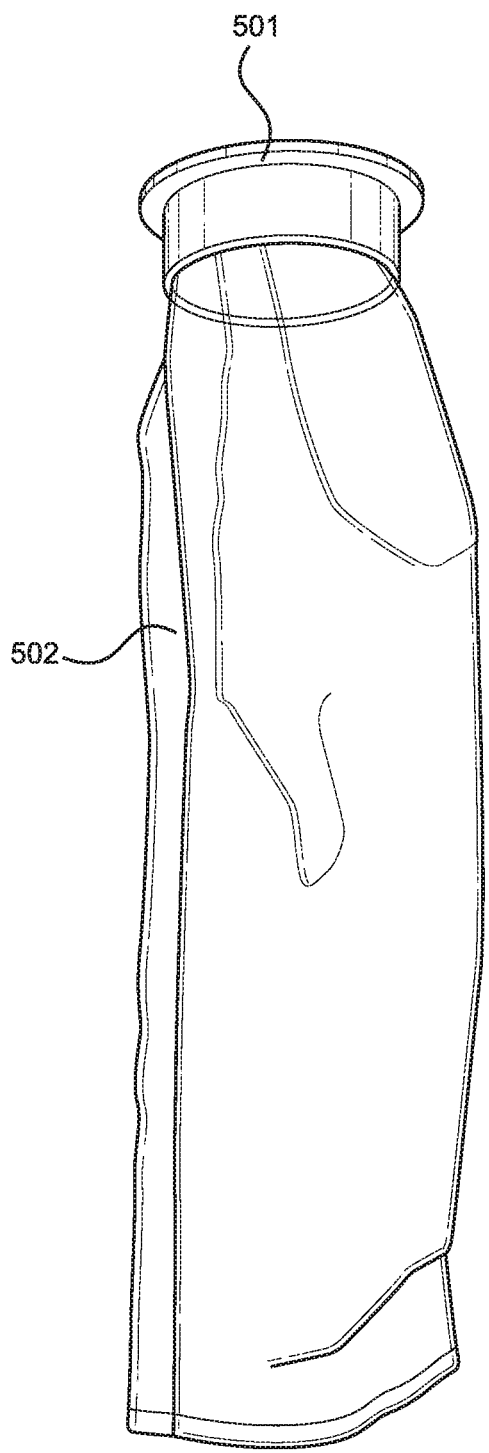
FIG. 154 illustrates a liner bag attached to a hard top in form of a ring.

FIG. 154 illustrates a bag 502, with a ring shaped cap 501 attached thereto. The bag 502 can be used with bottle 503 in a mannequin. The ring 501 can be placed on top of a container opening, with the liner inside of the container for accepting liquid. A tubing 38 (FIG. 155) can be attached to the container and is in fluid communication with a nipple.

Figure 155:
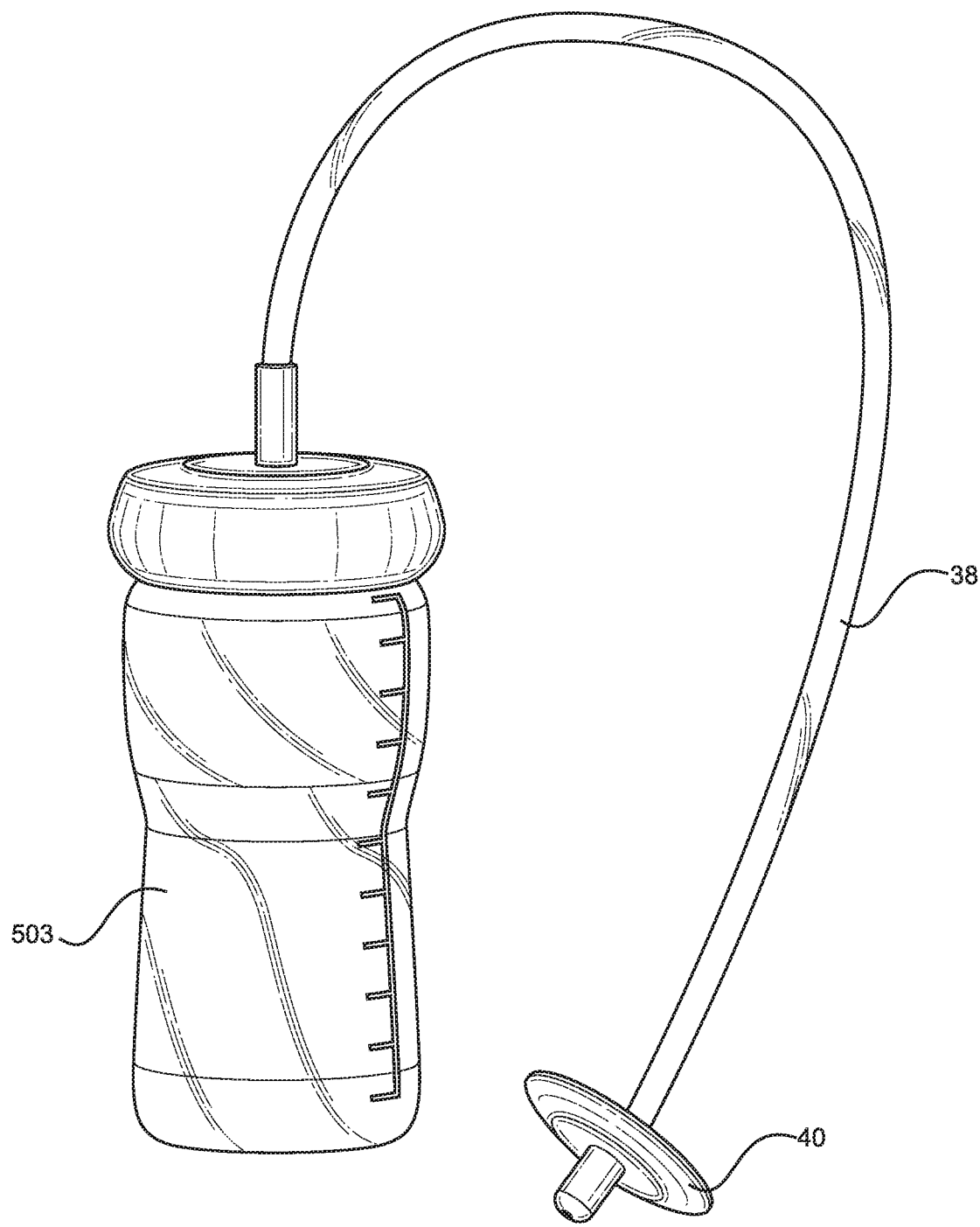
FIG. 155 illustrates a bottle with in fluid communication with a nipple on a nipple mount through tubing.

FIG. 155 illustrates a bottle 503, with tubing 38 inside in fluid communication with a nipple mount 40 through tubing 38. This system is configured to be placed inside of a mannequin 511. The container 503 can be placed in an upright position, for example on the sides of the torso. A container with a piston 602 can also be used.

Figure 156:
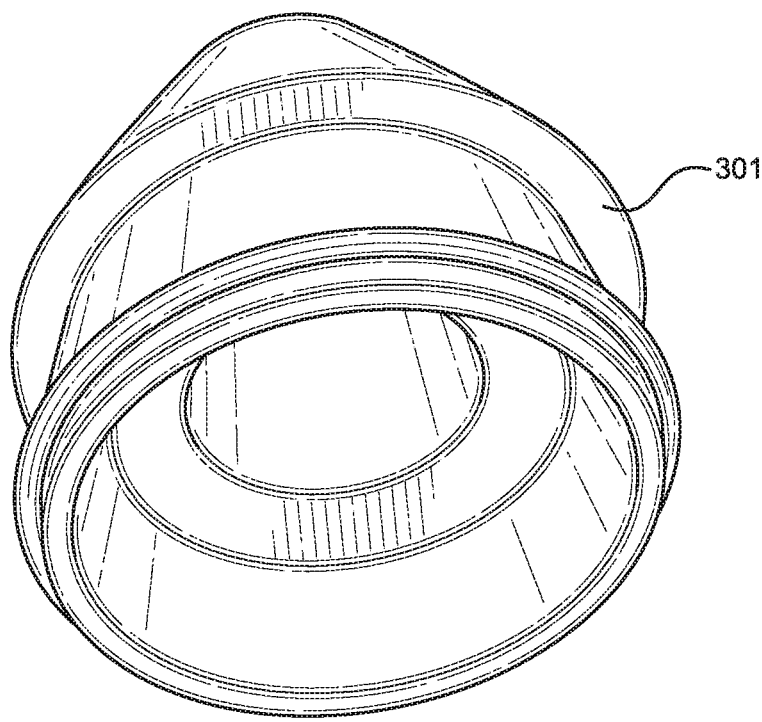
FIG. 156 illustrates a cap without an opening in the shape of glans that is snapped on the container.

FIG. 156 illustrates a cover 301 in the shape of Over molded glans protective cover 301 that is snapped on the container. The cover 301 is placed over the nipple and lacks an opening to allow liquid leave. When the cover 301 is placed, it seals the reservoir inside of the container (such as container 603) and fluid from the container does not mix with fluid from the body. The cap 301 lacks an opening for movement of liquid.

Figure 157:
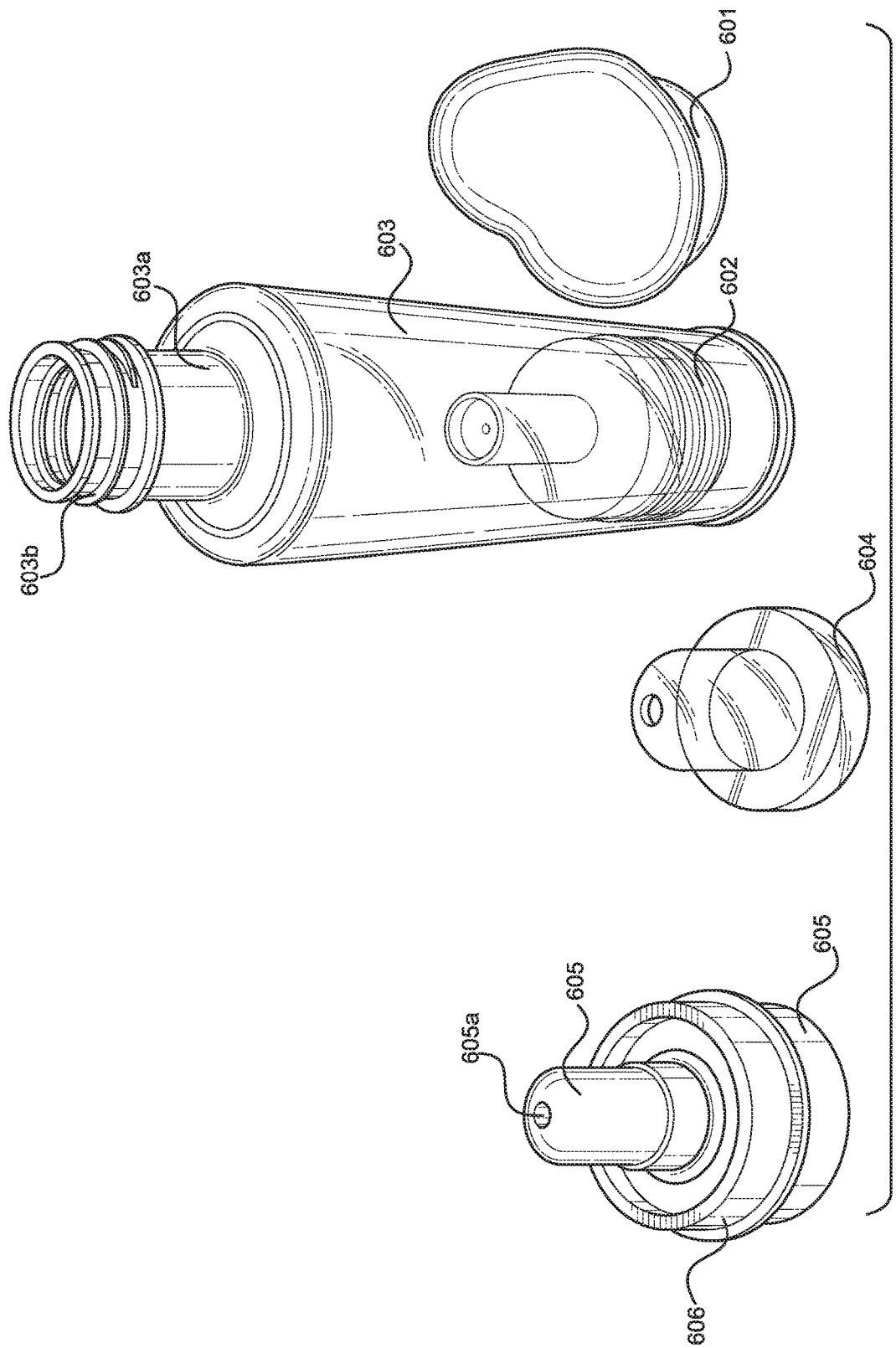
FIG. 157 illustrates the different components of a container, including a piston, a glans shaped cap, a valve housing, a nipple, and a ring-shaped cap. The nipple and the ring shaped cap are illustrated as an assembly.

FIG. 157 illustrates the different components of a container 603, with a movable piston 602 inside the container 603. Illustrated in this figure is a cylindrical container 603. Also illustrated is the assembly of the nipple 605 and a ring-shaped cap 606. The nipple 605 goes through the opening of the ring shaped cap 606, which has opening 605a on top. Ring shaped cap 606 can have threading on the inside, and be plain on the outside. FIG. 157 also illustrates the valve housing 604, which is placed inside of nipple 605. The use of cap 601 allows blocking mixture of body and container liquids for sanitary purposes because the container is multi-use and can be used both as a dildo and a drink container. The container can be re-used each time as a dildo by either cleaning or replacing the glans cap entirely. The glans cap can be disposable.

Rigid refers to its ordinary meaning of appearing stiff and unyielding. Rigid container keep their shape regardless of whether there is liquid inside or not (remains cylindrical as liquid leaves). The rigid containers are not squeezable since their shape remains the same as liquid leaves the container. A rigid object moves less than 1 mm when subject to a force of one pound with a circle having a radius of one centimeter. A soft object moves more than 1 mm. Example of soft materials are silicone and rubber.

Figure 158:
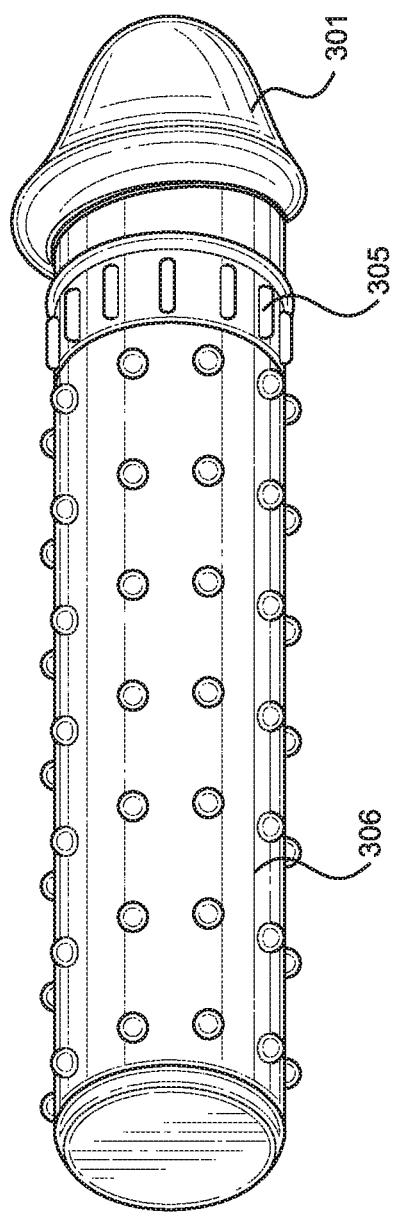
FIG. 158 illustrates a container for holding liquid in shape of a dildo.

FIG. 158 illustrates an isometric view of double threads with liner dildo container. Illustrated in this drawing are glans protective cover (cap) 301, ring-shaped cap 305 and container 306.

Figure 159:
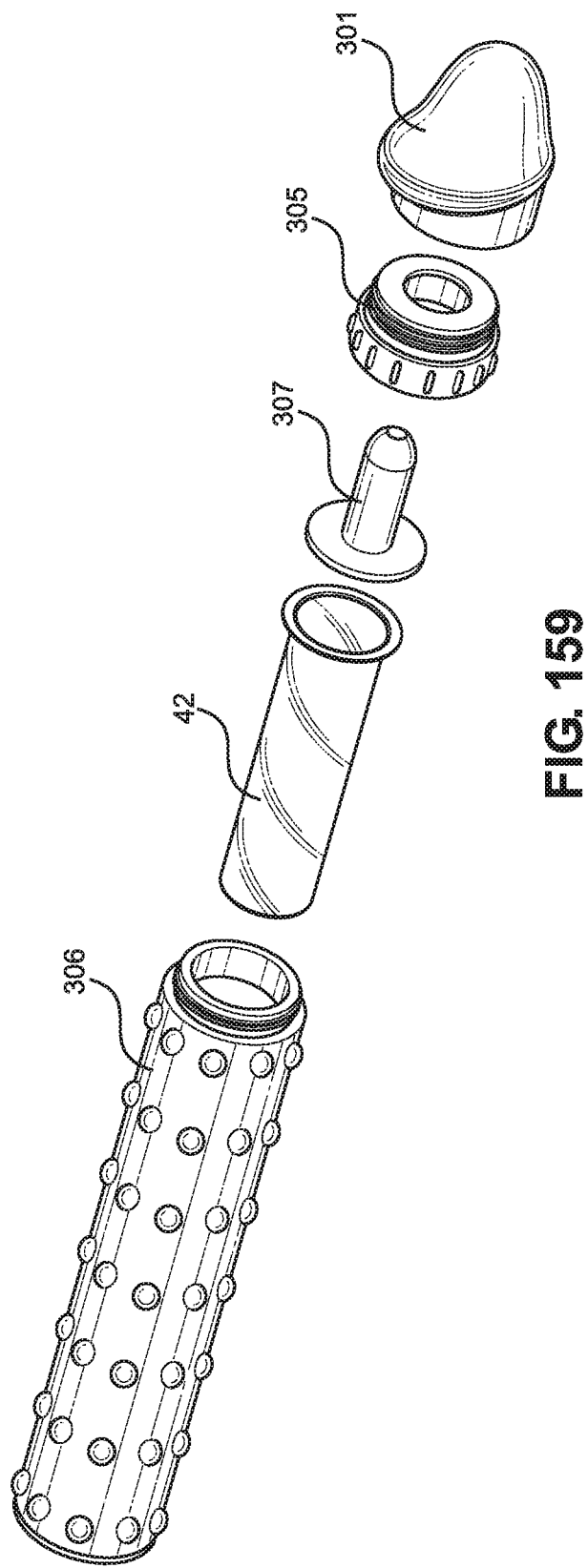
FIG. 159 illustrates components of the container of FIG. 158.

FIG. 159 illustrates an exploded view of double threaded (with liner) dildo container of FIG. 158. Illustrated in this figure are glans protective cover (cap) 301, ring-shaped cap 305, container 306, nipple 307, flanged collapsible liner 308.

FIG. 160 illustrates a cross-section view of FIG. 159. Illustrated in this view are liner flange 32a (made from a material such as Polyethylene terephthalate (PET)), liner flexible film 32b (made from material such as FDA low-density polyethylene (LDPE)), check/one way valve cartridge housing 54, Over molded glans 71 (made from a material such as Self-Bonding Silopren LSR 47x9 LRS, (Liquid Rubber Silicone), glans substrate 72 (made for example from Eastman BPA-Free Tritan (clear)), Nipple hole seal 72a, closure over mold 76 (material example: Self-Bonding Silopren LSR 47x9 LRS (Liquid Rubber Silicone)), container over mold, (made for example from Self-Bonding Silopren LSR 47x9 LRS, (Liquid Rubber Silicone)) 77, nipple with valve cavity 80 (made for example from silicone rubbers ELASTOSIL® LR 3040/45 (hardness of 45 Shore A)), material example: Eastman BPA-Free Tritan (clear), and Container bottle 83 (made for example from Eastman BPA-Free Tritan (clear)).

Figure 161:
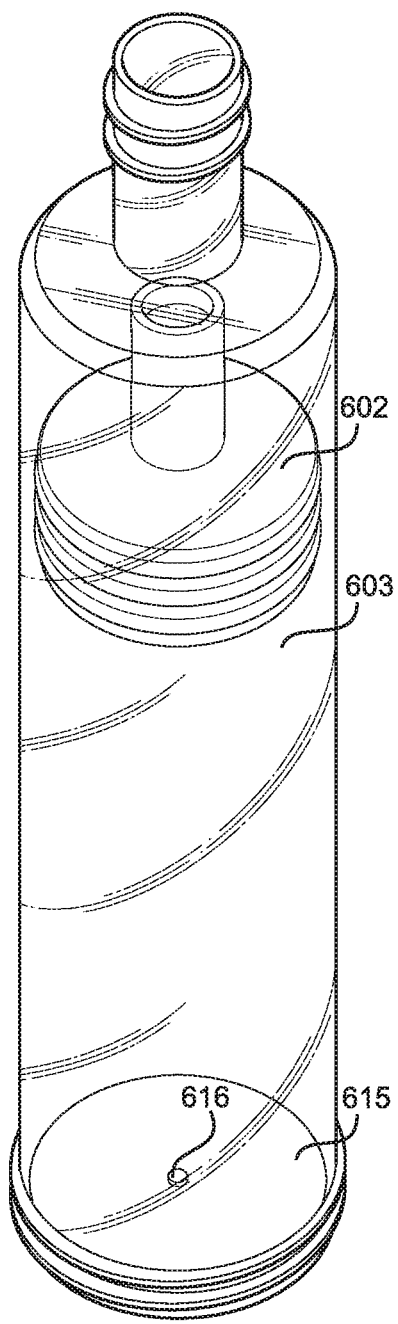
FIG. 161 illustrates a container with a piston in a first position.
Figure 162:
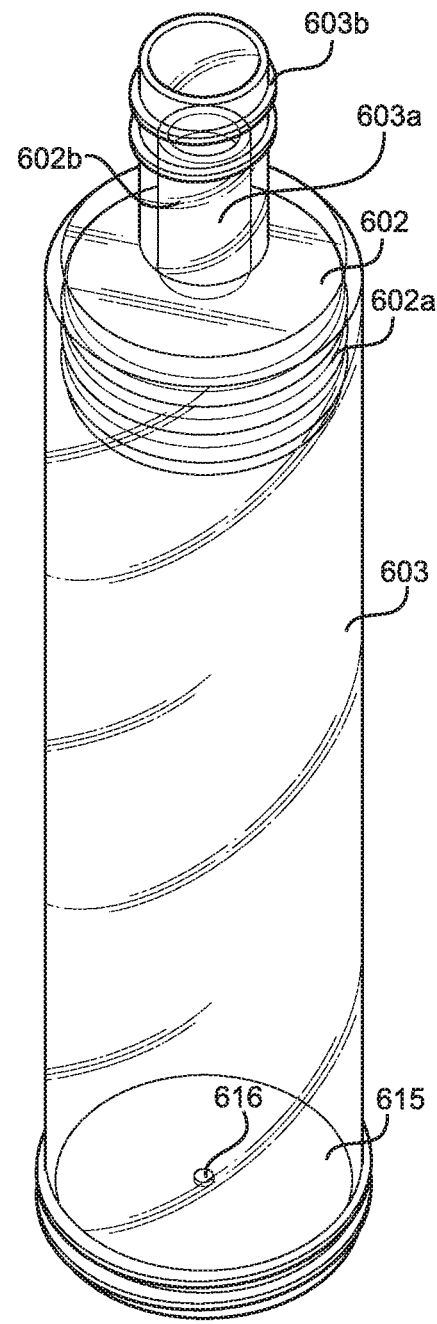
FIG. 162 illustrates a container with a piston in a second position.

FIGS. 161 and 162 illustrate a container 603 with a piston 602 system. The container/bottle/housing 603 is made from a rigid plastic that does not shrink as liquid leaves the container. The top of the bottle can have a shoulder (such as a flat portion with 0.5 cm 2 cm in horizontal direction) and a neck portion (a channel—such as with 0.5 cm to 3 cm height) with an opening that is smaller in diameter than the rest of the bottle. The piston 602, inside the container, defines the barrier between air and liquid. The piston 602 can have a cylindrical body that fits inside of the bottle 402. The base 602a of the piston 602 can have a height of about 0.5 cm to about 2 cm. There can be 1, 2, 3, or 4 bands around the base 602a to make a seal. A portion 602b of the piston can protrude upwards, and go inside the neck 603a of the container. The bottom of the bottle/container 603, can have an opening 616 for movement of air inside and outside of the bottle. In addition, the bottom of the container can have a removable cylindrical cap 615 with threading, to allow for washing the bottle by removing the cap. A silicone or other sleeve can be placed on the bottle 603.

Figure 163:
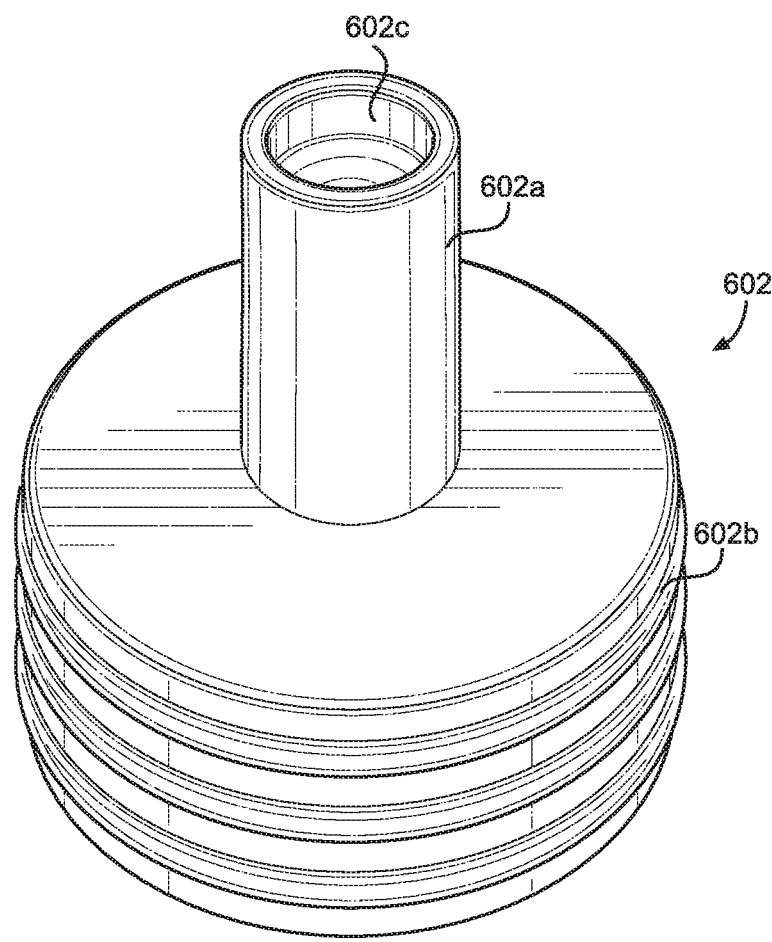
FIG. 163 illustrates a piston.

FIG. 163 illustrates the protruding portion 602a, that extends upward and is configured to fit inside the neck of the container 603 in FIGS. 161-162. The top portion 602a, can be an approximate cylinder that is smaller in diameter than the base 602b and is configured to fit inside of the neck of the container. The top of the approximate cylinder can have a circular recess 602c to allow for pushing down the piston, such as with a rod. The shape of the piston 602 avoids the piston 602 flipping over when pushed down.

Figure 164:
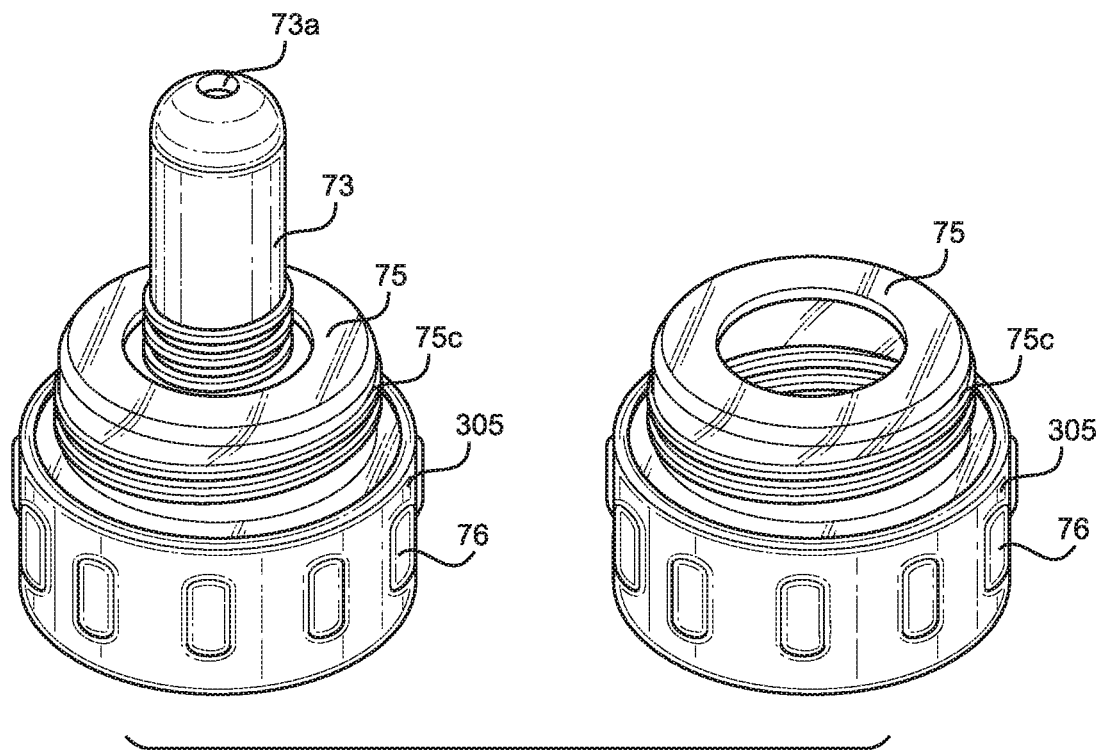
FIG. 164 illustrates a ring-shaped cap with and without removable placement of a nipple.
Figure 165:
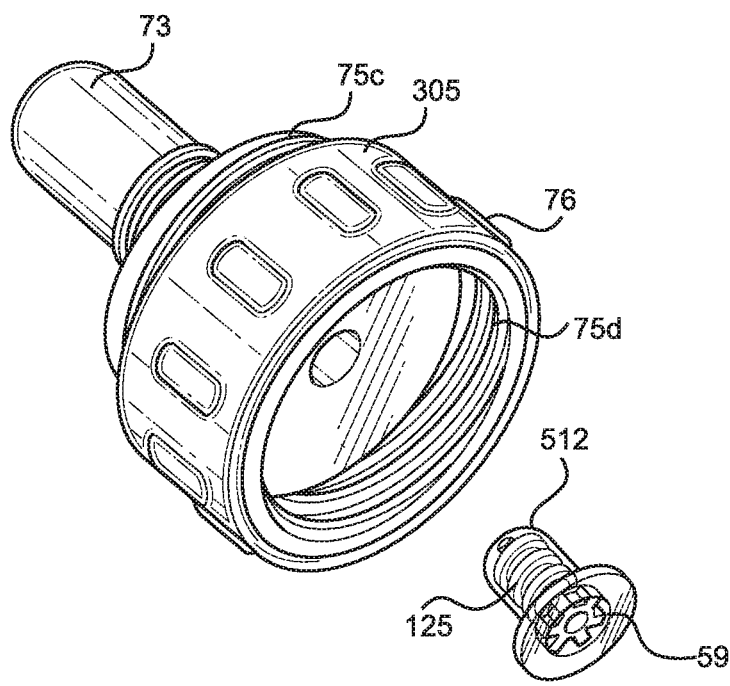
FIG. 165 illustrates placement of a valve housing with a one way valve inside of a nipple.

FIG. 164 illustrates a first cap (ring-shaped cap) 305 with a nipple 73. The first cap 305 can have threads on both the outside 75c, and inside 75d as illustrated in FIG. 164. The nipple 73 can be removably attached to the ring-shaped cap 75 and extends over the top of the cap 73. A valve housing 512, containing a one-way valve 125, (such as one having a spring that holds a member back) can be placed inside of the nipple 73. The valve is actuated by sucking. An optional second cap 301, can be threadably attached to the first cap 305. The second cap 301 can be threadably attached to a third cap, which can have a member inside of it to seal the nipple. Alternatively, cap 601 with no opening can be snapped on. FIG. 165 illustrates placement of the valve housing 512 inside of the nipple 73. A one way valve 125 (secured with washer 59) is placed inside of the housing 512.

Figure 166:
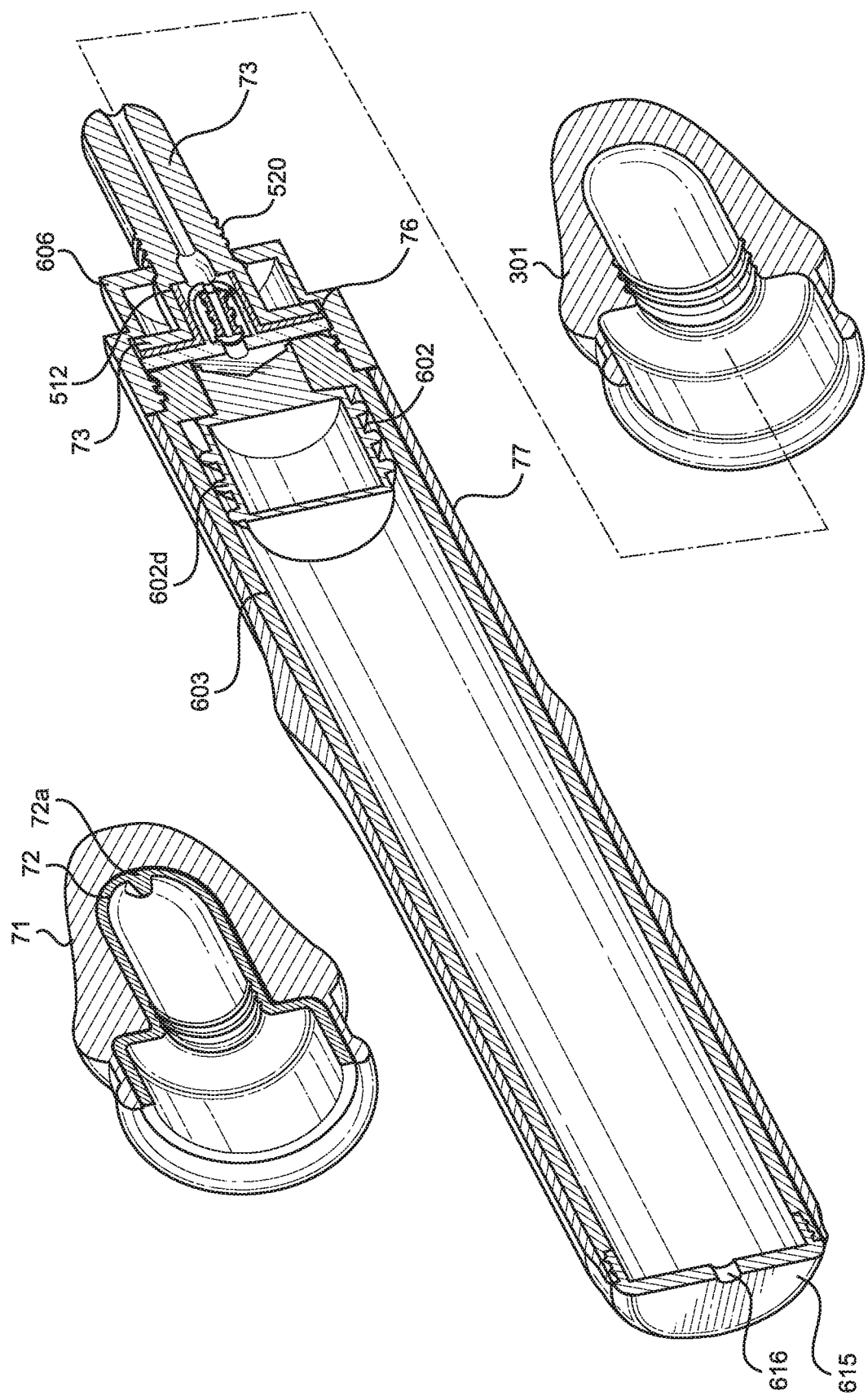
FIG. 166 illustrates a cross-section of a container with a piston system.

FIG. 166 illustrates a cross-section of a container 603 the piston 602. The piston is movably attached to inside of the housing of the container and moves in a vertical fashion. Bands 602d on the piston 602 create a movable seal. The bands 602d can be 0.5 mm to 3 mm (such as 1 mm to 2 mm) in height and/or in horizontal direction, when measured through the center in a vertical or horizontal line. As illustrated, the piston 602 has three bands 602*d* in this embodiment. The piston 602 has a protruding portion 602*a* that fits into the neck of the bottle, minimizing left over liquid in the bottle. The valve housing 512 containing a one way valve cartridge inside is placed inside of the nipple. The nipple is made from a rubber, and the rigid housing is placed inside the nipple 73 on top of the bottle 603. The flange portion of the nipple 73 can sit on top of the neck of the container 603. A ring-shaped cap 606 can be placed on the flange portion of the nipple 73 and threaded to the threading on the bottle 603. When a user sucks on the nipple 73, the one way valve opens, the piston 602 moves up and liquid from inside of the housing leaves through the opening of the nipple 73. Air moves to under the piston 603 from opening 616 on the bottom of the housing, through a threaded cap 615. In a first embodiment, without a glans cap 71/301, the container/bottle can be used in any setting, particularly one where a user is unable to drink from a container that has to be held in vertical orientation. The user, for example an elderly person, a baby/infant, or a hospital patient can drink from the container from any angle without spilling the liquid content (and without a straw). In another embodiment, the glans shaped cap 71/301 is placed on the container to provide for a dildo. The glans shaped cap can be made from a soft material such as silicone and can make contact and be held in place by the fins 520 of the nipple 73 and/or snap on the outside of the ring-shaped cap 606. When the glans shaped cap 71/301 is placed, the sides of the cap and container are flush with each other.

Figure 167:
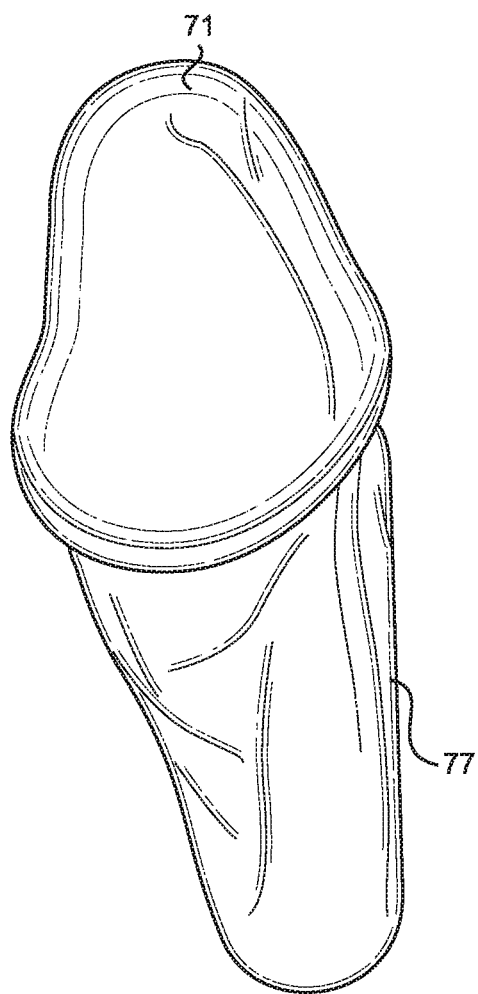
FIG. 167 illustrates veins on the outside of the cylinder resembling the veins of a phallus.

FIG. 167 illustrates phallus shaped body with faux veins/blood vessels that resemble that of a shaft of a penis.

FIG. 168 illustrates cap 701. Cap 701 has two concentric portions. The inner concentric portion has threading for attaching to the threading of the bottle. The outer concentric portion lacks threading, and forms a uniform cylindrical surface when attached to bottle 603. The nipple 73 and valve housing 512 (not visible) can have the arrangement illustrated in FIG. 166.

FIG. 169 illustrates a piston 602 bottle 603 for threadably attaching to the inner threading (on the inside) of the inside concentric portion of the cap. After attaching the cap 701, a cylindrical container with a uniform surface (without depression or a step) is obtained. The uniform surface makes the container suitable for use as an adult toy. Cap 705, which lacks an opening, can be placed on top of cap 701. Cap 705 can have threading to be attached to the outside threading of cap 701. Instead of cap 701, a user can use a glans shaped cap with internal threading, like cap 301 of FIG. 159 which is configured to be attached to outer threading of a cap. For sanitary purposes, the glans shaped cap 301 can lack an opening.

The piston design allows for minimal liquid to be left after each use. In one embodiment, less than 10% or less than 5% by volume of the liquid in relation to the entire capacity of the container is left after a user drinks from a full container.

REFERENCES 1. body soft cover (over mold)
1*a*. mounting suction cup
1*b*. body housing soft shell air exchange hole
2. body housing hard shell (over mold)
2*a*. body housing hard shell air exchange hole
2*b*. body housing hard shell threaded receptacle for cap
3. body housing cap hard shell (over mold)
3*a*. body housing cap snap ring
3*b*. body housing cap snap deflection slot
4. cap (glans) soft cover (over mold)
4*a*. cap (glans) soft cover liquid access hole
5. cap hard shell (over mold)
5*b*. Cap threaded receptacle, reusable base
5*c*. Cap threaded receptacle, disposable liquid container
6. liquid container spout
6*a*. flexible container film separator
6*d*. spout liquid flow side access slot
6*s*. separator puncture-proof spherical tip
6*t*. threading
6*w*. spout liquid flow front/back access slot
7. flexible liquid container
7*a*. flexible container welded seam
8. short flexible liquid container
8*a*. flexible container welded seam
9. liquid container spout
9*a*. flexible container film separator (short)
10. valve
12. cap (nipple) soft cover (over mold)
12*a*. cap (nipple) soft cover liquid access hole
14. valve seal o-ring (inside of housing)
15. valve housing seal o-ring (outside of housing)
17. valve spring
18. valve spring retainer cap
19. valve housing
20. valve retainer ring
21. liquid container shipping cap (throw away)
24. nipple protective cap
26. bottom container
27. threaded closure
28. threaded closure plug
29. shaft, material example: polypropylene (pp)
29*d*. Shaft, silicone over-mold
30. Glans, material example: ULTEM (PEI)
30*a*. cap valve assembly receptacle
30*c*. cap liquid outlet
30*d*. Glans, silicone over-mold
30*g*. Cap liquid outlet
31. bottom cap, material example: polypropylene (pp)
31*a*. bottom cap shaft thread
31*b*. bottom cap knurl
31*c*. bottom cap air vent
32*a*. Liner Flange, material example: Polyethylene terephthalate (PET)
32*b*. Liner flexible film, material example: FDA low-density polyethylene (LDPE)
33. valve assembly chassis
33*h*. valve assembly chassis liquid flow hole
33*i*. valve assembly liquid inlet
33*g*. chassis o-ring groove
33*v*. umbrella valve mounting hole
34. o-ring sealer
35. umbrella valve (elastic)
35*k*. umbrella mounting keeper (elastic)
35*s*. valve stem (elastic)
36. Plug
37. closure adapter, material example: polypropylene (pp)
37*a*. valve assembly
37*b*. closure adapter barbed nozzle
37*c*. tube keeper barb
37*d*. closure adapter, liquid outlet
37*e*. closure adapter mounting thread
38. flexible tubing connection
39. flexible tubing barbed fitting
39*a*. tube keeper barb
39*b*. tube end stop
40. mannequin breast nipple (areola+nipple shown)

40a. mannequin breast nipple connector receptacle
40b. mannequin breast nipple liquid outlet
41. baby bottle container
42. flexible liner
42a. flexible liner flange
43. one way valve chassis
43a. valve chassis nipple retainer ring
44. baby bottle nipple
44a. nipple valve chassis receptacle
44b. nipple valve chassis retainer ring
44c. nipple
44d. liquid outlet
44e. baby bottle nipple flange
45. baby bottle closure
46. silicone seal gasket
47. bottom cap, material example: ULTEM (pei)
47a. air intake hole
47d. bottom cap, silicone over-mold
48. air intake umbrella valve
48b. air intake umbrella valve stem
48k. umbrella valve stem keeper
49. stretchable protective cover material example: medical grade silicone
49b. stretchable protective cover skirt relaxed under sized for firm mounting grip
50. Externally threaded flanged shaft
50a. Flange
50b. External bottom cap thread
50c. External top cap thread
51. Bottom cap-spring valve housing
51a. Bottom cap grip knurl
51c. Air inlet
51d. Air Outlet
52. Bottom cap seal O-ring
53. Liner closure seal Silicone washer
54. Check valve cartridge housing
55. Spring valve seal O-ring (2 pcs)
56. Valve plunger
57. Valve seat O-ring
58. Valve compression spring
59. Press in retainer washer
60. Flow direction
61. Container cylinder, material example: FDA Polycarbonate
61a. Container neck
61b. Container neck thread
61c. Bottom snap cap receptacle ring channel
62. Container bottom snap cap, material example: Eastman BPA-Free Tritan (clear)
62a. Snap ring
62b. Air vent
62c. Cap flange
63. Container piston, material example: FDA Polypropylene
63a. Container piston top compression lip
63b. Container piston bottom guide compression lip
64. Glans closure, material example: FDA Polypropylene
64b. Glans closure thread
65. Glans over mold, material example: 40 Durometer FDA RTV Silicone
65a. Glans suction hole
65b. Glans rib
65c. Glans rib Barb
66. Container over mold, material example: 40 Durometer FDA RTV Silicone
66a. Container over mold bump
67. Container closure seal washer
69. Liquid content
70. Push down stick
71. Over molded glans, material example: Self-Bonding Silopren LSR 47x9 LRS, (Liquid Rubber Silicone)
72. Glans substrate, material example: Eastman BPA-Free Tritan (clear)
72a. Nipple hole seal
72b. Closure receptacle thread
73. Nipple, material example: liquid silicone rubbers ELASTOSIL® LR 3040/45 (hardness of 45 Shore A)
73a. Nipple hole
73b. Nipple retaining flange
74. Glans closure thread
74a. Valve cradle hole
74b. Valve cradle seal flange
75. Closure substrate, material example: Eastman BPA-Free Tritan (clear
75c. Closure cap receptacle thread
75d. Closure container receptacle thread
76. Closure over mold, material example: Self-Bonding Silopren LSR 47x9 LRS, (Liquid Rubber Silicone)
76a. Over mold knurl
77. Container over mold, material example: Self-Bonding Silopren LSR 47x9 LRS, (Liquid Rubber Silicone)
77a. Container over mold bump
78. container substrate
78b. container neck thread
78n. container neck
80. Nipple with valve cavity, material example: liquid silicone rubbers ELASTOSIL LR 3040/45 (hardness of 45 Shore A)
82. Closure substrate, material example: Eastman BPA-Free Tritan (clear)
83. container bottle, material example: Eastman BPA-Free Tritan (clear)
84. Spacer SS flat washer (shim)
100. cap body split line
101. liquid flow direction
102. air-less liquid
103. cap/liquid container engagement threads
104. cap/body over molds engagement threads
110. mannequin
110a. mannequin breast
110b. mannequin breast threaded insert receptacle (mounting tbd)
110h. liquid container replacement access hole
111. one-way valve assembly
112. liner cup
115. umbrella valve seat normally closed
116. umbrella valve seat opened via user mouth suction
117. tubing maintenance loop
118. full capacity airless liner
119. collapsed empty airless liner
120. Air intake
121. Air intake umbrella valve seat normally closed
122. Air intake umbrella valve seat opened by vacuum generated via user mouth suction of liquid
123. Glans/spring valve sub-assembly
124. bottom cap/spring valve sub-assembly
125. Pre-fabricated spring check valve cartridge
301. Over molded glans protective cover
302. Over molded closure assembly
303. Over molded container assembly
304. Self-bonding area
305. Ring shaped cap
306. Over molded container assembly
308. Flanged pre-sterilized collapsible liner

What is claimed is:

1. A dildo for drinking a liquid comprising:
   a) a cylindrical body for holding the liquid and an opening at the top, wherein shape of the body remains cylindrical and does not change as liquid enters or leaves the body;
   b) a piston movably attached to inside of the body, the piston defining a barrier between air and the liquid, with the liquid on top of the piston:
   c) a ring shaped cap with an opening attached to the top of the body;
   d) a nipple with an opening placed in proximity to the top of the body in fluid communication with the body, the nipple having a base portion and a nipple portion with an opening, the nipple portion going through the opening of the ring-shaped cap;
   e) a glans shaped cap made from silicone, placed removably over the nipple, the glans shaped cap lacking an opening for flow of the liquid; and
   f) a one way valve in fluid communication with the body and the nipple, the one way valve placed in flow of the liquid between the nipple opening and the body;
   wherein the container is configured to be used as dildo with the glans shaped can and a drink container for drinking a fluid inside of the container with the glans shaped cap removed;
   wherein when a person sucks on the nipple, the one-way valve opens, and liquid leaves the body and to the person's mouth through the opening of the nipple.

2. The dildo of claim 1, wherein the body is phallus shaped.

3. The dido of claim 1, wherein the glans shaped cap has a member that comes downward to seal the nipple opening.

4. The dildo of claim 1, wherein the first portion of the nipple is a disc shaped base and the second portion of the nipple is a protruding portion on top of the base, wherein the one way valve is placed inside of the second protruding portion of the nipple.

5. The dildo of claim 4, wherein the one way valve has a cylindrical body that is configures to fit inside of the protruding portion of the nipple.

6. The dildo of claim 1, wherein the one way valve body has a spring inside and a member configured to move from force of suction by a person.

7. The dildo of claim 6, wherein the member that is configured to move is placed on top of the valve body faces the nipple opening.

8. The dildo of claim 1, wherein the ring shaped cap has two concentric circles, with an inner circle having threading for attaching to the body, and the outer circle being configured to form a uniform cylindrical surface with the body.

9. The dildo of claim 8, wherein the ring shaped cap has additional threading located above the concentric circles, the additional threading configures for attachment to another cap.

10. The dildo of claim 1, further comprising a removable cap on a bottom of the body having an opening configured to allow movement of air inside of the body.

11. The dildo of claim 1, wherein the body has a neck portion.

12. The dildo of claim 11, wherein the piston has a base portion and a protruding portion, the protruding portion configured to fit inside the neck portion of the body.

13. The dildo of claim 12, wherein a top of the protruding portion has a recess configured to receive a rod for pushing the piston down.

14. The dildo of claim 1, wherein the piston comprises one or more bands that seal the liquid.

15. A multi-use dildo configured to function as both an adult toy and for drinking a liquid comprising:
   a) a cylindrical body for holding the liquid and an opening at the top, wherein shape of the body remains cylindrical and does not change as liquid enters or leaves the body;
   b) a piston movably attached to inside of the body, the piston defining a barrier between air and the liquid, with the liquid on top of the piston:
   c) a ring shaped cap with an opening attached to the top of the body;
   d) a nipple with an opening placed in proximity to the top of the body in fluid communication with the body, the nipple having a base portion and a nipple portion with an opening, the nipple portion going through the opening of the ring-shaped cap;
   e) a one way valve in fluid communication with the body and the nipple, the one way valve placed in flow of the liquid between the nipple opening and the body; the one way valve placed inside of the nipple; and
   f) a glans shaped cap lacking an opening for flow of the liquid, wherein the glans shaped cap is removably placed on the nipple;
   wherein when a person sucks on the nipple, the one way valve opens, and liquid leaves the body and to the person's mouth through the opening of the nipple; and
   wherein the dildo is configured to be used as dildo with the cap on and a drink container with the cap removed.

16. The multi-use dildo of claim 15, wherein the body has a neck portion, the piston has a base portion and a protruding portion on top, the protruding portion of the piston configured to fit inside of the neck portion.

17. The multi-use dildo of claim 15, wherein the piston has one or more bands for sealing the liquid.

18. A mannequin comprising at least a torso of a human body, the mannequin further comprising:
   a) the dildo of claim 1,
   b) a recess on a side of the torso of the mannequin;
   c) tubing from the dildo to one or more of breasts of the mannequin; and
   d) a nipple mount having a nipple in fluid communication with the dildo and attached to the tubing, the nipple mount placed on one of the breasts of the mannequin.

* * * * *